(12) United States Patent
Cronk et al.

(10) Patent No.: US 11,831,955 B2
(45) Date of Patent: *Nov. 28, 2023

(54) APPARATUS AND METHODS FOR CONTENT MANAGEMENT AND ACCOUNT LINKING ACROSS MULTIPLE CONTENT DELIVERY NETWORKS

(71) Applicant: Time Warner Cable Enterprises LLC, St. Louis, MO (US)

(72) Inventors: Gary Cronk, Colts Neck, NJ (US); Jonathan Putsch, Westminster, CO (US); James Boutilier, Denver, CO (US); Paul L. Miller, Rochester, NY (US); Michael Dillon, Aldie, VA (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 173 days.

This patent is subject to a terminal disclaimer.

(21) Appl. No.: 17/170,514

(22) Filed: Feb. 8, 2021

(65) Prior Publication Data

US 2021/0243501 A1 Aug. 5, 2021

Related U.S. Application Data

(63) Continuation of application No. 15/905,704, filed on Feb. 26, 2018, now Pat. No. 10,917,694, which is a (Continued)

(51) Int. Cl.
*H04L 9/30* (2006.01)
*G06F 21/10* (2013.01)
(Continued)

(52) U.S. Cl.
CPC ....... *H04N 21/47202* (2013.01); *G06F 21/10* (2013.01); *H04L 9/30* (2013.01); (Continued)

(58) Field of Classification Search
CPC .......... G06F 21/10; H04L 9/30; H04L 63/102
See application file for complete search history.

(56) References Cited

U.S. PATENT DOCUMENTS 4,484,120 A 11/1984 Olex et al.
4,687,457 A 8/1987 Milner
(Continued)

FOREIGN PATENT DOCUMENTS

CN 102226740 A 10/2011
EP 1139198 A2 10/2001
(Continued)

OTHER PUBLICATIONS

5C Digital Transmission Content Protection White Paper, Hitachi, Ltd., et al., dated Jul. 14, 1998, 15 pages.
(Continued)

*Primary Examiner* — Jason Chiang
(74) *Attorney, Agent, or Firm* — Patent Beach PC

(57) ABSTRACT

Methods and apparatus for providing protected content to subscribers of a managed (e.g., MSO) network via a content source accessible via an internetwork such as the Internet. In one embodiment, a user accesses a service provider portal (e.g., website), and requests content. The service provider determines whether the requesting user is permitted to access the content, and what rights or restrictions are associated with the user. This includes authenticating the user as a subscriber of the MSO, and determining the subscriber's subscription level. In another embodiment, a user's account with the MSO and service provider may be federated, thus a given user will have MSO-specific information regarding its identity (such as login information, GUID, etc.) and is able to perform a single sign on to request and receive content.

20 Claims, 18 Drawing Sheets

Related U.S. Application Data continuation of application No. 12/834,801, filed on Jul. 12, 2010, now Pat. No. 9,906,838.

(51) Int. Cl.
  *H04L 9/40* (2022.01)
  *H04N 21/472* (2011.01)
  *H04N 21/258* (2011.01)
  *H04N 21/658* (2011.01)

(52) U.S. Cl.
  CPC ..... *H04L 63/102* (2013.01); *H04N 21/25875* (2013.01); *H04N 21/6581* (2013.01)

(56) References Cited

U.S. PATENT DOCUMENTS

| | | |
|---|---|---|
| 4,820,233 A | 4/1989 | Weiner |
| 4,853,771 A | 8/1989 | Witriol et al. |
| 4,889,027 A | 12/1989 | Yokoi |
| 5,042,807 A | 8/1991 | Sasakawa et al. |
| 5,046,022 A | 9/1991 | Conway et al. |
| 5,063,603 A | 11/1991 | Burt |
| 5,079,491 A | 1/1992 | Nose et al. |
| 5,083,803 A | 1/1992 | Blake et al. |
| 5,092,343 A | 3/1992 | Spitzer et al. |
| 5,245,672 A | 9/1993 | Wilson et al. |
| 5,355,435 A | 10/1994 | Deyong et al. |
| 5,369,497 A | 11/1994 | Allen et al. |
| 5,369,707 A | 11/1994 | Follendore |
| 5,378,188 A | 1/1995 | Clark |
| 5,388,186 A | 2/1995 | Bose |
| 5,408,588 A | 4/1995 | Ulug |
| 5,410,344 A | 4/1995 | Graves et al. |
| 5,467,428 A | 11/1995 | Ulug |
| 5,528,284 A | 6/1996 | Iwami et al. |
| 5,534,911 A | 7/1996 | Levitan |
| 5,557,319 A | 9/1996 | Gurusami et al. |
| 5,577,209 A | 11/1996 | Boyle et al. |
| 5,628,284 A | 5/1997 | Sheen et al. |
| 5,638,359 A | 6/1997 | Peltola et al. |
| 5,652,594 A | 7/1997 | Costas |
| 5,673,367 A | 9/1997 | Buckley |
| 5,673,387 A | 9/1997 | Chen et al. |
| 5,708,961 A | 1/1998 | Hylton et al. |
| 5,715,403 A | 2/1998 | Stefik |
| 5,745,837 A | 4/1998 | Fuhrmann |
| 5,758,257 A | 5/1998 | Herz et al. |
| 5,787,172 A | 7/1998 | Arnold |
| 5,818,438 A | 10/1998 | Howe et al. |
| 5,822,530 A | 10/1998 | Brown |
| 5,828,832 A | 10/1998 | Holden et al. |
| 5,838,921 A | 11/1998 | Speeter |
| 5,870,474 A | 2/1999 | Wasilewski et al. |
| 5,875,108 A | 2/1999 | Hoffberg et al. |
| 5,897,635 A | 4/1999 | Torres et al. |
| 5,937,143 A | 8/1999 | Watanabe et al. |
| 5,940,738 A | 8/1999 | Rao |
| 5,999,535 A | 12/1999 | Wang et al. |
| 6,009,103 A | 12/1999 | Woundy |
| 6,009,418 A | 12/1999 | Cooper |
| 6,014,653 A | 1/2000 | Thaler |
| 6,061,088 A | 5/2000 | Khosravi et al. |
| 6,125,397 A | 9/2000 | Yoshimura et al. |
| 6,148,400 A | 11/2000 | Arnold |
| 6,154,844 A | 11/2000 | Touboul et al. |
| 6,157,719 A | 12/2000 | Wasilewski et al. |
| 6,167,432 A | 12/2000 | Jiang |
| 6,167,521 A | 12/2000 | Smith et al. |
| 6,181,697 B1 | 1/2001 | Nurenberg et al. |
| 6,212,636 B1 | 4/2001 | Boyle et al. |
| 6,219,710 B1 | 4/2001 | Gray et al. |
| 6,233,341 B1 | 5/2001 | Riggins |
| 6,233,389 B1 | 5/2001 | Barton et al. |
| 6,233,687 B1 | 5/2001 | White |
| 6,253,058 B1 | 6/2001 | Murasaki et al. |
| 6,256,393 B1 | 7/2001 | Safadi et al. |
| 6,259,701 B1 | 7/2001 | Shur et al. |
| 6,259,988 B1 | 7/2001 | Galkowski et al. |
| 6,266,421 B1 | 7/2001 | Domyo et al. |
| 6,286,049 B1 | 9/2001 | Rajakarunanayake et al. |
| 6,317,884 B1 | 11/2001 | Eames et al. |
| 6,338,013 B1 | 1/2002 | Ruffner |
| 6,345,038 B1 | 2/2002 | Selinger |
| 6,359,601 B1 | 3/2002 | Maguire, Jr. |
| 6,363,369 B1 | 3/2002 | Liaw et al. |
| 6,389,538 B1 | 5/2002 | Gruse et al. |
| 6,396,531 B1 | 5/2002 | Gerszberg et al. |
| 6,429,291 B1 | 8/2002 | Turley et al. |
| 6,435,936 B1 | 8/2002 | Rehkemper et al. |
| 6,456,716 B1 | 9/2002 | Arnold |
| 6,458,157 B1 | 10/2002 | Suaning |
| 6,473,793 B1 | 10/2002 | Dillon et al. |
| 6,519,062 B1 | 2/2003 | Yoo |
| 6,523,696 B1 | 2/2003 | Saito et al. |
| 6,545,705 B1 | 4/2003 | Sigel et al. |
| 6,545,708 B1 | 4/2003 | Tamayama et al. |
| 6,546,016 B1 | 4/2003 | Gerszberg et al. |
| 6,546,291 B2 | 4/2003 | Merfeld et al. |
| 6,547,631 B1 | 4/2003 | Randall |
| 6,560,511 B1 | 5/2003 | Yokoo et al. |
| 6,564,381 B1 | 5/2003 | Hodge et al. |
| 6,565,407 B1 | 5/2003 | Woolington et al. |
| 6,570,608 B1 | 5/2003 | Tserng |
| 6,581,046 B1 | 6/2003 | Ahissar |
| 6,601,171 B1 | 7/2003 | Carter et al. |
| 6,615,108 B1 | 9/2003 | Peless et al. |
| 6,633,232 B2 | 10/2003 | Trajkovic et al. |
| 6,640,145 B2 | 10/2003 | Hoffberg et al. |
| 6,642,938 B1 | 11/2003 | Gilboy |
| 6,642,939 B1 | 11/2003 | Vallone et al. |
| 6,643,262 B1 | 11/2003 | Larsson et al. |
| 6,643,627 B2 | 11/2003 | Liaw et al. |
| 6,657,991 B1 | 12/2003 | Akgun et al. |
| 6,672,961 B1 | 1/2004 | Uzun |
| 6,682,392 B2 | 1/2004 | Chan |
| 6,694,145 B2 | 2/2004 | Riikonen et al. |
| 6,697,711 B2 | 2/2004 | Yokono et al. |
| 6,711,742 B1 | 3/2004 | Kishi et al. |
| 6,718,552 B1 | 4/2004 | Goode |
| 6,742,116 B1 | 5/2004 | Matsui et al. |
| 6,748,395 B1 | 6/2004 | Picker et al. |
| 6,754,904 B1 | 6/2004 | Cooper et al. |
| 6,757,906 B1 | 6/2004 | Look et al. |
| 6,758,746 B1 | 7/2004 | Hunter et al. |
| 6,760,645 B2 | 7/2004 | Kaplan et al. |
| 6,760,768 B2 | 7/2004 | Holden et al. |
| 6,774,908 B2 | 8/2004 | Bates et al. |
| 6,774,926 B1 | 8/2004 | Ellis et al. |
| 6,782,475 B1 | 8/2004 | Sumner |
| 6,782,550 B1 | 8/2004 | Cao |
| 6,785,810 B1 | 8/2004 | Lirov et al. |
| 6,788,676 B2 | 9/2004 | Partanen et al. |
| 6,807,573 B2 | 10/2004 | Saito et al. |
| 6,813,505 B2 | 11/2004 | Walley et al. |
| 6,847,778 B1 | 1/2005 | Vallone et al. |
| 6,859,535 B1 | 2/2005 | Tatebayashi et al. |
| 6,865,746 B1 | 3/2005 | Herrington et al. |
| 6,898,708 B2 | 5/2005 | Hori et al. |
| 6,909,726 B1 | 6/2005 | Sheeran |
| 6,910,064 B1 | 6/2005 | Astarabadi et al. |
| 6,918,131 B1 | 7/2005 | Rautila et al. |
| 6,925,257 B2 | 8/2005 | Yoo |
| 6,931,018 B1 | 8/2005 | Fisher |
| 6,934,964 B1 | 8/2005 | Schaffer et al. |
| 6,944,150 B1 | 9/2005 | McConnell et al. |
| 6,948,183 B1 | 9/2005 | Peterka |
| 6,954,632 B2 | 10/2005 | Kobayashi |
| 6,957,261 B2 | 10/2005 | Lortz |
| 6,957,328 B2 | 10/2005 | Goodman et al. |
| 6,973,489 B1 | 12/2005 | Levy |
| 6,973,576 B2 | 12/2005 | Giobbi |
| 6,975,730 B1 | 12/2005 | Kuroiwa et al. |
| 6,978,474 B1 | 12/2005 | Sheppard et al. |
| 6,985,355 B2 | 1/2006 | Allirot |

(56) References Cited

U.S. PATENT DOCUMENTS

| | | | |
|---|---|---|---|
| 6,996,544 B2 | 2/2006 | Sellars et al. |
| 7,003,670 B2 | 2/2006 | Heaven et al. |
| 7,006,881 B1 | 2/2006 | Hoffberg et al. |
| 7,007,170 B2 | 2/2006 | Morten |
| 7,009,972 B2 | 3/2006 | Maher et al. |
| 7,013,290 B2 | 3/2006 | Ananian |
| 7,016,963 B1 | 3/2006 | Judd et al. |
| 7,017,189 B1 | 3/2006 | Demello et al. |
| 7,020,652 B2 | 3/2006 | Matz et al. |
| 7,023,833 B1 | 4/2006 | Aiello et al. |
| 7,027,460 B2 | 4/2006 | Iyer et al. |
| 7,039,048 B1 | 5/2006 | Monta et al. |
| 7,051,352 B1 | 5/2006 | Schaffer |
| 7,054,443 B1 | 5/2006 | Jakubowski et al. |
| 7,054,850 B2 | 5/2006 | Matsugu |
| 7,054,902 B2 | 5/2006 | Toporek et al. |
| 7,055,031 B2 | 5/2006 | Platt |
| 7,055,040 B2 | 5/2006 | Klemba et al. |
| 7,055,165 B2 | 5/2006 | Connelly |
| 7,065,216 B1 | 6/2006 | Benaloh et al. |
| 7,068,639 B1 | 6/2006 | Varma et al. |
| 7,069,449 B2 | 6/2006 | Weaver et al. |
| 7,069,578 B1 | 6/2006 | Prus et al. |
| 7,072,950 B2 | 7/2006 | Toft |
| 7,073,199 B1 | 7/2006 | Raley |
| 7,092,397 B1 | 8/2006 | Chandran et al. |
| 7,096,483 B2 | 8/2006 | Johnson |
| 7,099,308 B2 | 8/2006 | Merrill et al. |
| 7,100,183 B2 | 8/2006 | Kunkel et al. |
| 7,103,181 B2 | 9/2006 | Ananth |
| 7,103,905 B2 | 9/2006 | Novak |
| 7,106,382 B2 | 9/2006 | Shiotsu |
| 7,107,326 B1 | 9/2006 | Fijolek et al. |
| 7,136,866 B2 | 11/2006 | Springer et al. |
| 7,146,627 B1 | 12/2006 | Ismail et al. |
| 7,149,772 B1 | 12/2006 | Kalavade |
| 7,154,901 B2 | 12/2006 | Chava et al. |
| 7,154,912 B2 | 12/2006 | Chong et al. |
| 7,164,971 B2 | 1/2007 | Ferla et al. |
| 7,165,268 B1 | 1/2007 | Moore et al. |
| 7,167,895 B1 | 1/2007 | Connelly |
| 7,171,567 B1 * | 1/2007 | Bayer ..................... H04L 63/06 380/255 |
| 7,174,126 B2 | 2/2007 | McElhatten et al. |
| 7,174,127 B2 | 2/2007 | Otten et al. |
| 7,174,371 B2 | 2/2007 | Elo et al. |
| 7,174,385 B2 | 2/2007 | Li |
| 7,185,355 B1 | 2/2007 | Ellis et al. |
| 7,194,756 B2 | 3/2007 | Addington et al. |
| 7,206,775 B2 | 4/2007 | Kaiser et al. |
| 7,207,055 B1 | 4/2007 | Hendricks et al. |
| 7,209,458 B2 | 4/2007 | Ahvonen et al. |
| 7,213,036 B2 | 5/2007 | Apparao et al. |
| 7,225,333 B2 | 5/2007 | Peinado et al. |
| 7,228,427 B2 | 6/2007 | Fransdonk |
| 7,228,556 B2 | 6/2007 | Beach et al. |
| 7,235,013 B2 | 6/2007 | Kobayashi |
| 7,237,112 B1 | 6/2007 | Ishiguro et al. |
| 7,242,960 B2 | 7/2007 | Van et al. |
| 7,242,988 B1 | 7/2007 | Hoffberg et al. |
| 7,248,694 B2 | 7/2007 | Husemann et al. |
| 7,254,608 B2 | 8/2007 | Yeager et al. |
| 7,257,106 B2 | 8/2007 | Chen et al. |
| 7,257,227 B2 | 8/2007 | Chen et al. |
| 7,260,823 B2 | 8/2007 | Schlack et al. |
| 7,266,555 B1 * | 9/2007 | Coates .................. G06F 16/192 707/831 |
| 7,266,726 B1 | 9/2007 | Ladd et al. |
| 7,289,534 B1 | 10/2007 | Bailey et al. |
| 7,293,276 B2 | 11/2007 | Phillips et al. |
| 7,299,502 B2 | 11/2007 | Schmeling et al. |
| 7,305,460 B2 | 12/2007 | Park |
| 7,312,391 B2 | 12/2007 | Kaiser et al. |
| 7,313,611 B1 | 12/2007 | Jacobs et al. |
| 7,324,531 B2 | 1/2008 | Cho |
| 7,325,043 B1 | 1/2008 | Rosenberg et al. |
| 7,325,073 B2 | 1/2008 | Shao et al. |
| 7,330,483 B1 | 2/2008 | Peters, Jr. et al. |
| 7,330,510 B2 | 2/2008 | Castillo et al. |
| 7,330,967 B1 | 2/2008 | Pujare et al. |
| 7,333,483 B2 | 2/2008 | Zhao et al. |
| 7,336,787 B2 | 2/2008 | Unger et al. |
| 7,337,458 B2 | 2/2008 | Michelitsch et al. |
| 7,340,762 B2 | 3/2008 | Kim |
| 7,343,398 B1 * | 3/2008 | Lownsbrough ....... H04L 63/166 709/229 |
| 7,353,543 B2 | 4/2008 | Ohmori et al. |
| 7,359,375 B2 | 4/2008 | Lipsanen et al. |
| 7,363,643 B2 | 4/2008 | Drake et al. |
| 7,373,506 B2 | 5/2008 | Asano et al. |
| 7,376,386 B2 | 5/2008 | Phillips et al. |
| 7,376,976 B2 | 5/2008 | Fierstein et al. |
| 7,382,786 B2 | 6/2008 | Chen et al. |
| 7,395,251 B2 | 7/2008 | Linsker |
| 7,397,825 B2 | 7/2008 | Woodward et al. |
| 7,404,082 B2 | 7/2008 | Medvinsky et al. |
| 7,406,515 B1 | 7/2008 | Joyce et al. |
| 7,409,546 B2 | 8/2008 | Platt |
| 7,418,320 B1 | 8/2008 | Bodin et al. |
| 7,426,501 B2 | 9/2008 | Nugent |
| 7,426,920 B1 | 9/2008 | Petersen |
| 7,444,655 B2 | 10/2008 | Sardera |
| 7,457,520 B2 | 11/2008 | Rosetti et al. |
| 7,472,280 B2 | 12/2008 | Giobbi |
| 7,486,869 B2 | 2/2009 | Alexander et al. |
| 7,487,363 B2 | 2/2009 | Alve et al. |
| 7,487,523 B1 | 2/2009 | Hendricks |
| 7,506,367 B1 | 3/2009 | Ishibashi |
| 7,532,712 B2 | 5/2009 | Gonder et al. |
| 7,548,562 B2 | 6/2009 | Ward et al. |
| 7,565,203 B2 | 7/2009 | Greenberg et al. |
| 7,567,983 B2 | 7/2009 | Pickelsimer et al. |
| 7,571,452 B2 | 8/2009 | Gutta |
| 7,592,912 B2 | 9/2009 | Hasek et al. |
| 7,602,820 B2 | 10/2009 | Helms et al. |
| 7,603,469 B2 | 10/2009 | Fletcher et al. |
| 7,609,637 B2 | 10/2009 | Doshi et al. |
| 7,624,337 B2 | 11/2009 | Sull et al. |
| 7,650,319 B2 | 1/2010 | Hoffberg et al. |
| 7,672,920 B2 | 3/2010 | Ito et al. |
| 7,673,004 B1 | 3/2010 | Sherstinsky et al. |
| 7,690,020 B2 | 3/2010 | Lebar |
| 7,707,644 B2 | 4/2010 | Choi et al. |
| 7,721,314 B2 | 5/2010 | Sincaglia et al. |
| 7,725,553 B2 | 5/2010 | Rang et al. |
| 7,730,321 B2 | 6/2010 | Gasparini et al. |
| 7,742,074 B2 | 6/2010 | Minatogawa |
| 7,742,625 B2 | 6/2010 | Pilu |
| 7,752,617 B2 | 7/2010 | Blinick et al. |
| 7,757,101 B2 | 7/2010 | Nonaka et al. |
| 7,765,029 B2 | 7/2010 | Fleischer et al. |
| 7,770,200 B2 | 8/2010 | Brooks et al. |
| 7,783,891 B2 | 8/2010 | Perlin et al. |
| 7,805,127 B2 * | 9/2010 | Andreasen .......... H04L 12/1403 455/406 |
| 7,809,197 B2 | 10/2010 | Fedorovskaya et al. |
| 7,809,942 B2 | 10/2010 | Baran et al. |
| 7,849,030 B2 | 12/2010 | Ellingsworth |
| 7,865,440 B2 | 1/2011 | Jaquette |
| 7,870,245 B2 | 1/2011 | Butler |
| 7,870,599 B2 | 1/2011 | Pemmaraju |
| 7,893,171 B2 | 2/2011 | Le et al. |
| 7,895,445 B1 * | 2/2011 | Albanese ............. H04L 9/0841 713/172 |
| 7,900,052 B2 | 3/2011 | Jonas et al. |
| 7,908,626 B2 | 3/2011 | Williamson et al. |
| 7,916,755 B2 | 3/2011 | Hasek et al. |
| 7,925,592 B1 | 4/2011 | Issa et al. |
| 7,930,558 B2 | 4/2011 | Hori |
| 7,936,775 B2 | 5/2011 | Iwamura |
| 7,937,164 B2 | 5/2011 | Samardzija et al. |
| 7,945,349 B2 | 5/2011 | Svensson et al. |
| 7,954,131 B2 | 5/2011 | Cholas et al. |
| 7,970,492 B2 | 6/2011 | Matsushima et al. |

(56) References Cited

U.S. PATENT DOCUMENTS

| | | |
|---|---|---|
| 7,983,418 B2 | 7/2011 | Oyama et al. |
| 8,015,130 B2 | 9/2011 | Matsugu et al. |
| 8,015,785 B2 | 9/2011 | Walker et al. |
| 8,024,762 B2 | 9/2011 | Britt |
| 8,042,054 B2 | 10/2011 | White et al. |
| 8,095,610 B2 | 1/2012 | Gould et al. |
| 8,103,546 B1 * | 1/2012 | Des Jardins ..... H04N 21/26233 |
| | | 725/35 |
| 8,145,355 B2 | 3/2012 | Danko |
| 8,145,492 B2 | 3/2012 | Fujita |
| 8,154,436 B2 | 4/2012 | Szajnowski |
| 8,166,126 B2 | 4/2012 | Bristow et al. |
| 8,166,508 B2 | 4/2012 | Mitsuji et al. |
| 8,170,065 B2 | 5/2012 | Hasek et al. |
| 8,181,262 B2 | 5/2012 | Cooper et al. |
| 8,219,134 B2 | 7/2012 | Maharajh et al. |
| 8,234,387 B2 | 7/2012 | Bradley et al. |
| 8,249,497 B2 | 8/2012 | Ingrassia et al. |
| 8,280,982 B2 | 10/2012 | La et al. |
| 8,281,352 B2 | 10/2012 | Brooks et al. |
| 8,281,997 B2 | 10/2012 | Moran et al. |
| 8,302,111 B2 | 10/2012 | Ladd et al. |
| 8,315,305 B2 | 11/2012 | Petre et al. |
| 8,332,370 B2 | 12/2012 | Gattegno et al. |
| 8,332,657 B1 | 12/2012 | Eskicioglu et al. |
| 8,341,242 B2 | 12/2012 | Dillon et al. |
| 8,346,692 B2 | 1/2013 | Rouat et al. |
| 8,347,341 B2 | 1/2013 | Markley et al. |
| 8,396,249 B1 | 3/2013 | Khosla et al. |
| 8,396,282 B1 | 3/2013 | Huber et al. |
| 8,429,702 B2 | 4/2013 | Yasrebi et al. |
| 8,467,623 B2 | 6/2013 | Izhikevich et al. |
| 8,467,823 B2 | 6/2013 | Seki et al. |
| 8,472,627 B2 | 6/2013 | Denning et al. |
| 8,484,511 B2 | 7/2013 | Engel et al. |
| 8,494,677 B2 | 7/2013 | Mizutani |
| 8,515,160 B1 | 8/2013 | Khosla et al. |
| 8,516,529 B2 | 8/2013 | Lajoie et al. |
| 8,520,850 B2 | 8/2013 | Helms et al. |
| 8,527,094 B2 | 9/2013 | Kumar et al. |
| 8,538,757 B2 | 9/2013 | Patch |
| 8,542,872 B2 | 9/2013 | Gornick et al. |
| 8,571,261 B2 | 10/2013 | Gagvani et al. |
| 8,583,758 B2 | 11/2013 | Casey et al. |
| 8,600,166 B2 | 12/2013 | Adhikari |
| 8,640,166 B1 * | 1/2014 | Craner ............... H04N 21/4826 |
| | | 725/38 |
| 8,712,939 B2 | 4/2014 | Szatmary et al. |
| 8,712,941 B2 | 4/2014 | Izhikevich et al. |
| 8,719,199 B2 | 5/2014 | Izhikevich et al. |
| 8,725,658 B2 | 5/2014 | Izhikevich et al. |
| 8,725,662 B2 | 5/2014 | Izhikevich et al. |
| 8,731,295 B2 | 5/2014 | Schepelmann et al. |
| 8,732,854 B2 | 5/2014 | Cholas et al. |
| 8,738,607 B2 | 5/2014 | Dettinger et al. |
| 8,750,490 B2 | 6/2014 | Murtagh et al. |
| 8,750,909 B2 | 6/2014 | Fan et al. |
| 8,756,183 B1 | 6/2014 | Daily et al. |
| 8,761,402 B2 | 6/2014 | Mcavoy et al. |
| 8,775,341 B1 | 7/2014 | Commons |
| 8,793,205 B1 | 7/2014 | Fisher et al. |
| 8,805,270 B2 | 8/2014 | Maharajh et al. |
| 8,812,419 B1 | 8/2014 | Teller et al. |
| 8,843,622 B1 | 9/2014 | Graham et al. |
| 8,880,222 B2 | 11/2014 | Kawamoto et al. |
| 8,943,008 B2 | 1/2015 | Ponulak et al. |
| 8,949,919 B2 | 2/2015 | Cholas et al. |
| 8,954,193 B2 | 2/2015 | Sandin et al. |
| 8,972,315 B2 | 3/2015 | Szatmary et al. |
| 8,977,582 B2 | 3/2015 | Richert |
| 8,983,216 B2 | 3/2015 | Izhikevich et al. |
| 8,990,133 B1 | 3/2015 | Ponulak et al. |
| 8,995,815 B2 | 3/2015 | Maharajh et al. |
| 8,996,177 B2 | 3/2015 | Coenen |
| 9,002,511 B1 | 4/2015 | Hickerson et al. |
| 9,002,828 B2 * | 4/2015 | Fiatal .................... G06F 16/148 |
| | | 707/723 |
| 9,043,952 B2 | 6/2015 | Sandin et al. |
| 9,083,513 B2 | 7/2015 | Helms et al. |
| 9,111,441 B2 | 8/2015 | Yano et al. |
| 9,124,551 B2 | 9/2015 | Lu et al. |
| 9,124,608 B2 | 9/2015 | Jin et al. |
| 9,124,650 B2 | 9/2015 | Maharajh et al. |
| 9,164,596 B1 | 10/2015 | Lee et al. |
| 9,210,313 B1 * | 12/2015 | Svendsen ............... H04N 7/183 |
| 9,215,235 B1 | 12/2015 | Jacobsen et al. |
| 9,215,423 B2 | 12/2015 | Kimble et al. |
| 9,258,608 B2 | 2/2016 | Dillon et al. |
| 9,300,919 B2 | 3/2016 | Cholas et al. |
| 9,706,160 B2 | 7/2017 | Marsh et al. |
| 9,716,530 B2 | 7/2017 | Imes et al. |
| 9,733,804 B2 | 8/2017 | Scott et al. |
| 9,766,709 B2 | 9/2017 | Holz et al. |
| 9,817,521 B2 | 11/2017 | Li et al. |
| 9,906,838 B2 | 2/2018 | Cronk et al. |
| 11,132,705 B1 * | 9/2021 | Des Jardins ........ G06Q 30/0244 |
| 2001/0004768 A1 | 6/2001 | Hodge et al. |
| 2001/0014946 A1 | 8/2001 | Ichinoi et al. |
| 2001/0019614 A1 | 9/2001 | Madoukh et al. |
| 2001/0029581 A1 | 10/2001 | Knauft |
| 2001/0043613 A1 | 11/2001 | Wibowo et al. |
| 2001/0045809 A1 | 11/2001 | Mukai |
| 2001/0050945 A1 | 12/2001 | Lindsey |
| 2001/0053223 A1 | 12/2001 | Ishibashi et al. |
| 2001/0053226 A1 | 12/2001 | Akins et al. |
| 2001/0056541 A1 | 12/2001 | Matsuzaki et al. |
| 2002/0002688 A1 | 1/2002 | Gregg et al. |
| 2002/0013772 A1 | 1/2002 | Peinado |
| 2002/0024943 A1 | 2/2002 | Karaul et al. |
| 2002/0026575 A1 | 2/2002 | Wheeler et al. |
| 2002/0027883 A1 | 3/2002 | Belaiche |
| 2002/0032754 A1 | 3/2002 | Logston et al. |
| 2002/0038294 A1 | 3/2002 | Matsugu |
| 2002/0042921 A1 | 4/2002 | Ellis |
| 2002/0048367 A1 | 4/2002 | Maillard |
| 2002/0053076 A1 | 5/2002 | Landesmann |
| 2002/0056125 A1 | 5/2002 | Hodge et al. |
| 2002/0059218 A1 | 5/2002 | August et al. |
| 2002/0059619 A1 | 5/2002 | Lebar |
| 2002/0062440 A1 | 5/2002 | Akama |
| 2002/0066033 A1 | 5/2002 | Dobbins et al. |
| 2002/0072293 A1 | 6/2002 | Beyo et al. |
| 2002/0077984 A1 | 6/2002 | Ireton |
| 2002/0081937 A1 | 6/2002 | Yamada et al. |
| 2002/0083451 A1 | 6/2002 | Gill et al. |
| 2002/0087995 A1 | 7/2002 | Pedlow et al. |
| 2002/0095689 A1 | 7/2002 | Novak |
| 2002/0123931 A1 | 9/2002 | Splaver et al. |
| 2002/0126654 A1 | 9/2002 | Preston et al. |
| 2002/0129358 A1 | 9/2002 | Buehl et al. |
| 2002/0131511 A1 | 9/2002 | Zenoni |
| 2002/0144067 A1 | 10/2002 | Jeong |
| 2002/0144267 A1 | 10/2002 | Gutta et al. |
| 2002/0147771 A1 | 10/2002 | Traversat et al. |
| 2002/0152091 A1 | 10/2002 | Nagaoka et al. |
| 2002/0152299 A1 | 10/2002 | Traversat et al. |
| 2002/0152393 A1 | 10/2002 | Thoma et al. |
| 2002/0156556 A1 | 10/2002 | Ruffner |
| 2002/0158599 A1 | 10/2002 | Fujita et al. |
| 2002/0178444 A1 | 11/2002 | Trajkovic et al. |
| 2002/0183895 A1 | 12/2002 | Kaplan et al. |
| 2002/0183985 A1 | 12/2002 | Hori et al. |
| 2002/0184154 A1 | 12/2002 | Hori et al. |
| 2002/0188744 A1 | 12/2002 | Mani |
| 2002/0188869 A1 | 12/2002 | Patrick |
| 2002/0194595 A1 | 12/2002 | Miller et al. |
| 2002/0198854 A1 | 12/2002 | Berenji et al. |
| 2002/0199105 A1 | 12/2002 | Ishiguro et al. |
| 2003/0005453 A1 | 1/2003 | Rodriguez et al. |
| 2003/0009681 A1 | 1/2003 | Harada et al. |
| 2003/0012190 A1 | 1/2003 | Kaku et al. |
| 2003/0021421 A1 | 1/2003 | Yokota et al. |
| 2003/0028451 A1 | 2/2003 | Ananian |
| 2003/0041336 A1 | 2/2003 | Del et al. |

(56) References Cited

U.S. PATENT DOCUMENTS

| | | |
|---|---|---|
| 2003/0046560 A1 | 3/2003 | Inomata et al. |
| 2003/0048380 A1 | 3/2003 | Tamura |
| 2003/0050903 A1 | 3/2003 | Liaw et al. |
| 2003/0056217 A1 | 3/2003 | Brooks |
| 2003/0065623 A1 | 4/2003 | Corneil et al. |
| 2003/0069965 A1 | 4/2003 | Ma et al. |
| 2003/0074571 A1 | 4/2003 | Fujiwara et al. |
| 2003/0084003 A1 | 5/2003 | Pinkas et al. |
| 2003/0093794 A1 | 5/2003 | Thomas et al. |
| 2003/0097340 A1 | 5/2003 | Okamoto et al. |
| 2003/0097574 A1 | 5/2003 | Upton |
| 2003/0115267 A1* | 6/2003 | Hinton .................... G06F 21/41 709/204 |
| 2003/0135628 A1 | 7/2003 | Fletcher et al. |
| 2003/0140227 A1 | 7/2003 | Asano et al. |
| 2003/0163443 A1 | 8/2003 | Wang |
| 2003/0163739 A1 | 8/2003 | Armington et al. |
| 2003/0165241 A1 | 9/2003 | Fransdonk |
| 2003/0166401 A1 | 9/2003 | Combes et al. |
| 2003/0174838 A1 | 9/2003 | Bremer |
| 2003/0187799 A1 | 10/2003 | Sellars et al. |
| 2003/0200548 A1 | 10/2003 | Baran et al. |
| 2003/0205763 A1 | 11/2003 | Park et al. |
| 2003/0208763 A1 | 11/2003 | McElhatten et al. |
| 2003/0208767 A1 | 11/2003 | Williamson et al. |
| 2003/0217137 A1 | 11/2003 | Roese et al. |
| 2003/0217365 A1 | 11/2003 | Caputo |
| 2003/0220100 A1 | 11/2003 | McElhatten et al. |
| 2003/0222987 A1 | 12/2003 | Karazuba |
| 2003/0232568 A1 | 12/2003 | Engel et al. |
| 2004/0016638 A1 | 1/2004 | Laconti et al. |
| 2004/0024688 A1 | 2/2004 | Bi et al. |
| 2004/0034677 A1 | 2/2004 | Davey et al. |
| 2004/0034877 A1 | 2/2004 | Nogues |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0052377 A1 | 3/2004 | Mattox et al. |
| 2004/0056625 A1 | 3/2004 | Sano et al. |
| 2004/0078602 A1 | 4/2004 | Rothbarth et al. |
| 2004/0088558 A1 | 5/2004 | Candelore |
| 2004/0100563 A1 | 5/2004 | Sablak et al. |
| 2004/0102862 A1 | 5/2004 | Kato et al. |
| 2004/0109569 A1 | 6/2004 | Ellison et al. |
| 2004/0117254 A1 | 6/2004 | Nemirofsky et al. |
| 2004/0117836 A1 | 6/2004 | Karaoguz et al. |
| 2004/0123129 A1 | 6/2004 | Ginter et al. |
| 2004/0128499 A1 | 7/2004 | Peterka et al. |
| 2004/0133923 A1 | 7/2004 | Watson et al. |
| 2004/0136439 A1 | 7/2004 | Dewberry et al. |
| 2004/0137918 A1 | 7/2004 | Varonen et al. |
| 2004/0153211 A1 | 8/2004 | Kamoto et al. |
| 2004/0158358 A1 | 8/2004 | Anezaki et al. |
| 2004/0162638 A1 | 8/2004 | Solomon |
| 2004/0166832 A1 | 8/2004 | Portman et al. |
| 2004/0174900 A1 | 9/2004 | Volpi et al. |
| 2004/0177369 A1 | 9/2004 | Akins |
| 2004/0181800 A1 | 9/2004 | Rakib et al. |
| 2004/0184616 A1 | 9/2004 | Morten |
| 2004/0190721 A1 | 9/2004 | Barrett et al. |
| 2004/0193609 A1 | 9/2004 | Phan et al. |
| 2004/0193680 A1 | 9/2004 | Gibbs et al. |
| 2004/0204792 A1 | 10/2004 | Taylor et al. |
| 2004/0212148 A1 | 10/2004 | Losey et al. |
| 2004/0220082 A1 | 11/2004 | Surmeier et al. |
| 2004/0224425 A1 | 11/2004 | Gjerde et al. |
| 2004/0225416 A1 | 11/2004 | Kubota et al. |
| 2004/0230994 A1 | 11/2004 | Urdang et al. |
| 2004/0237100 A1 | 11/2004 | Pinder et al. |
| 2004/0244138 A1 | 12/2004 | Taylor et al. |
| 2004/0250273 A1 | 12/2004 | Swix et al. |
| 2004/0260798 A1 | 12/2004 | Addington et al. |
| 2004/0261093 A1 | 12/2004 | Rebaud et al. |
| 2004/0268386 A1 | 12/2004 | Logan et al. |
| 2005/0005287 A1 | 1/2005 | Claussen |
| 2005/0010331 A1 | 1/2005 | Taylor et al. |
| 2005/0012830 A1 | 1/2005 | Pilu |
| 2005/0015351 A1 | 1/2005 | Nugent |
| 2005/0015810 A1 | 1/2005 | Gould et al. |
| 2005/0021985 A1 | 1/2005 | Ono et al. |
| 2005/0022227 A1 | 1/2005 | Shen et al. |
| 2005/0022751 A1 | 2/2005 | Nelson |
| 2005/0034171 A1 | 2/2005 | Benya |
| 2005/0036649 A1 | 2/2005 | Yokono et al. |
| 2005/0039212 A1 | 2/2005 | Baran et al. |
| 2005/0044223 A1 | 2/2005 | Meyerson |
| 2005/0047647 A1 | 3/2005 | Rutishauser et al. |
| 2005/0049749 A1 | 3/2005 | Watanabe et al. |
| 2005/0049886 A1 | 3/2005 | Grannan et al. |
| 2005/0055220 A1 | 3/2005 | Lee et al. |
| 2005/0055729 A1 | 3/2005 | Atad et al. |
| 2005/0065651 A1 | 3/2005 | Ayers et al. |
| 2005/0065888 A1 | 3/2005 | Benaloh |
| 2005/0066353 A1 | 3/2005 | Fransdonk |
| 2005/0071047 A1 | 3/2005 | Okabayashi et al. |
| 2005/0083921 A1 | 4/2005 | McDermott, III et al. |
| 2005/0086334 A1 | 4/2005 | Aaltonen et al. |
| 2005/0086683 A1 | 4/2005 | Meyerson |
| 2005/0091173 A1 | 4/2005 | Alve |
| 2005/0097006 A1 | 5/2005 | Nyako |
| 2005/0108763 A1 | 5/2005 | Baran et al. |
| 2005/0114686 A1 | 5/2005 | Ball et al. |
| 2005/0114701 A1 | 5/2005 | Atkins et al. |
| 2005/0114900 A1 | 5/2005 | Ladd et al. |
| 2005/0130585 A1 | 6/2005 | Gnuschke et al. |
| 2005/0138193 A1 | 6/2005 | Encarnacion et al. |
| 2005/0138357 A1 | 6/2005 | Swenson et al. |
| 2005/0149227 A1 | 7/2005 | Peters et al. |
| 2005/0157731 A1 | 7/2005 | Peters |
| 2005/0165899 A1 | 7/2005 | Mazzola |
| 2005/0169468 A1 | 8/2005 | Fahrny et al. |
| 2005/0172127 A1 | 8/2005 | Hartung et al. |
| 2005/0177740 A1 | 8/2005 | Athaide et al. |
| 2005/0177741 A1 | 8/2005 | Chen et al. |
| 2005/0177855 A1 | 8/2005 | Maynard et al. |
| 2005/0182931 A1 | 8/2005 | Robert et al. |
| 2005/0188210 A1 | 8/2005 | Perlin et al. |
| 2005/0188415 A1 | 8/2005 | Riley |
| 2005/0190912 A1 | 9/2005 | Hopkins et al. |
| 2005/0195975 A1 | 9/2005 | Kawakita |
| 2005/0198693 A1 | 9/2005 | Choi et al. |
| 2005/0209749 A1 | 9/2005 | Ito et al. |
| 2005/0210500 A1 | 9/2005 | Stone |
| 2005/0223097 A1 | 10/2005 | Ramsayer et al. |
| 2005/0228725 A1 | 10/2005 | Rao et al. |
| 2005/0268107 A1 | 12/2005 | Harris et al. |
| 2005/0273629 A1 | 12/2005 | Abrams et al. |
| 2005/0278259 A1 | 12/2005 | Gunaseelan et al. |
| 2005/0283450 A1 | 12/2005 | Matsugu et al. |
| 2005/0289616 A1 | 12/2005 | Horiuchi et al. |
| 2005/0289618 A1 | 12/2005 | Hardin |
| 2006/0002551 A1 | 1/2006 | Brown et al. |
| 2006/0004662 A1 | 1/2006 | Nadalin et al. |
| 2006/0008144 A1 | 1/2006 | Prasad et al. |
| 2006/0008256 A1 | 1/2006 | Khedouri et al. |
| 2006/0015352 A1 | 1/2006 | Wynn et al. |
| 2006/0020786 A1 | 1/2006 | Helms et al. |
| 2006/0020950 A1 | 1/2006 | Ladd et al. |
| 2006/0021004 A1* | 1/2006 | Moran .................... H04L 63/08 726/2 |
| 2006/0021019 A1* | 1/2006 | Hinton ................ H04L 63/0815 726/10 |
| 2006/0036750 A1 | 2/2006 | Ladd et al. |
| 2006/0041903 A1 | 2/2006 | Kahn et al. |
| 2006/0041905 A1 | 2/2006 | Wasilewski |
| 2006/0041915 A1 | 2/2006 | Dimitrova et al. |
| 2006/0047801 A1 | 3/2006 | Haag et al. |
| 2006/0048216 A1* | 3/2006 | Hinton ................ H04L 63/0815 726/8 |
| 2006/0053463 A1 | 3/2006 | Choi |
| 2006/0064583 A1 | 3/2006 | Birnbaum et al. |
| 2006/0069448 A1 | 3/2006 | Yasui |
| 2006/0080171 A1* | 4/2006 | Jardins ............... G06Q 30/0272 705/28 |

(56) References Cited

U.S. PATENT DOCUMENTS

| | | |
|---|---|---|
| 2006/0088030 A1 | 4/2006 | Beeson et al. |
| 2006/0094001 A1 | 5/2006 | Torre et al. |
| 2006/0095940 A1 | 5/2006 | Yearwood |
| 2006/0117379 A1 | 6/2006 | Bennett et al. |
| 2006/0130099 A1 | 6/2006 | Rooyen |
| 2006/0130101 A1 | 6/2006 | Wessel |
| 2006/0130107 A1 | 6/2006 | Gonder et al. |
| 2006/0130113 A1 | 6/2006 | Carlucci et al. |
| 2006/0136964 A1 | 6/2006 | Diez et al. |
| 2006/0136968 A1 | 6/2006 | Han et al. |
| 2006/0136990 A1* | 6/2006 | Hinton ............... H04L 63/0815 726/2 |
| 2006/0137005 A1 | 6/2006 | Park |
| 2006/0137015 A1 | 6/2006 | Fahrny et al. |
| 2006/0145647 A1 | 7/2006 | Kitatsuji et al. |
| 2006/0148362 A1 | 7/2006 | Bridges |
| 2006/0149850 A1 | 7/2006 | Bowman |
| 2006/0156392 A1 | 7/2006 | Baugher et al. |
| 2006/0160543 A1* | 7/2006 | Mashinsky ........... H04W 16/10 455/452.2 |
| 2006/0161218 A1 | 7/2006 | Danilov |
| 2006/0161635 A1* | 7/2006 | Lamkin ................ G06F 16/16 709/217 |
| 2006/0168219 A1 | 7/2006 | Ahluwalia et al. |
| 2006/0171423 A1 | 8/2006 | Helms et al. |
| 2006/0179138 A1 | 8/2006 | Van et al. |
| 2006/0184972 A1 | 8/2006 | Rafey et al. |
| 2006/0187900 A1 | 8/2006 | Akbar |
| 2006/0190990 A1 | 8/2006 | Gruper et al. |
| 2006/0200856 A1 | 9/2006 | Salowey et al. |
| 2006/0206712 A1 | 9/2006 | Dillaway et al. |
| 2006/0209799 A1 | 9/2006 | Gallagher et al. |
| 2006/0212400 A1 | 9/2006 | Kamperman et al. |
| 2006/0218604 A1 | 9/2006 | Riedl et al. |
| 2006/0218647 A1 | 9/2006 | Hars et al. |
| 2006/0221246 A1 | 10/2006 | Yoo |
| 2006/0236131 A1 | 10/2006 | Vauclair |
| 2006/0238656 A1 | 10/2006 | Chen et al. |
| 2006/0248553 A1 | 11/2006 | Mikkelson et al. |
| 2006/0259927 A1 | 11/2006 | Acharya et al. |
| 2006/0272031 A1* | 11/2006 | Ache ..................... G06F 21/105 348/E7.071 |
| 2006/0291506 A1 | 12/2006 | Cain |
| 2007/0003130 A1 | 1/2007 | Goerick et al. |
| 2007/0008405 A1 | 1/2007 | Benosman et al. |
| 2007/0011335 A1 | 1/2007 | Burns et al. |
| 2007/0019645 A1 | 1/2007 | Menon |
| 2007/0022068 A1 | 1/2007 | Linsker |
| 2007/0022459 A1 | 1/2007 | Gaebel, Jr. et al. |
| 2007/0022469 A1 | 1/2007 | Cooper et al. |
| 2007/0025271 A1 | 2/2007 | Niedrich et al. |
| 2007/0025372 A1 | 2/2007 | Brenes et al. |
| 2007/0033531 A1 | 2/2007 | Marsh |
| 2007/0037475 A1 | 2/2007 | Spear |
| 2007/0046791 A1 | 3/2007 | Wang et al. |
| 2007/0049245 A1 | 3/2007 | Lipman |
| 2007/0053513 A1 | 3/2007 | Hoffberg et al. |
| 2007/0061023 A1 | 3/2007 | Hoffberg et al. |
| 2007/0067851 A1 | 3/2007 | Fernando et al. |
| 2007/0073704 A1 | 3/2007 | Bowden et al. |
| 2007/0076728 A1 | 4/2007 | Rieger et al. |
| 2007/0079381 A1 | 4/2007 | Hartung et al. |
| 2007/0081537 A1 | 4/2007 | Wheelock |
| 2007/0094691 A1 | 4/2007 | Gazdzinski |
| 2007/0098178 A1 | 5/2007 | Raikar |
| 2007/0104456 A1 | 5/2007 | Craner |
| 2007/0118848 A1 | 5/2007 | Schwesinger et al. |
| 2007/0121578 A1 | 5/2007 | Annadata et al. |
| 2007/0121678 A1 | 5/2007 | Brooks et al. |
| 2007/0124488 A1 | 5/2007 | Baum et al. |
| 2007/0124602 A1 | 5/2007 | Wald et al. |
| 2007/0124769 A1 | 5/2007 | Casey et al. |
| 2007/0124781 A1 | 5/2007 | Casey et al. |
| 2007/0150920 A1 | 6/2007 | Lee et al. |
| 2007/0153820 A1 | 7/2007 | Gould |
| 2007/0154041 A1 | 7/2007 | Beauchamp |
| 2007/0157234 A1 | 7/2007 | Walker |
| 2007/0157262 A1 | 7/2007 | Ramaswamy et al. |
| 2007/0157295 A1 | 7/2007 | Mangalore et al. |
| 2007/0168466 A1* | 7/2007 | Tooley ................. H04L 67/61 709/218 |
| 2007/0169144 A1* | 7/2007 | Chen ............... H04N 21/25891 348/E7.071 |
| 2007/0174888 A1 | 7/2007 | Rubinstein |
| 2007/0176643 A1 | 8/2007 | Nugent |
| 2007/0180230 A1 | 8/2007 | Cortez |
| 2007/0192615 A1 | 8/2007 | Varghese et al. |
| 2007/0199019 A1* | 8/2007 | Angiolillo ......... H04N 21/6334 348/E7.071 |
| 2007/0204300 A1* | 8/2007 | Markley ......... H04N 21/25833 348/E7.071 |
| 2007/0204314 A1 | 8/2007 | Hasek et al. |
| 2007/0206799 A1 | 9/2007 | Wingert et al. |
| 2007/0208678 A1 | 9/2007 | Matsugu |
| 2007/0209054 A1 | 9/2007 | Cassanova |
| 2007/0209059 A1 | 9/2007 | Moore et al. |
| 2007/0217436 A1 | 9/2007 | Markley et al. |
| 2007/0219910 A1 | 9/2007 | Martinez |
| 2007/0220024 A1 | 9/2007 | Putterman et al. |
| 2007/0220553 A1 | 9/2007 | Branam et al. |
| 2007/0226365 A1 | 9/2007 | Hildreth et al. |
| 2007/0239315 A1 | 10/2007 | Sato et al. |
| 2007/0244610 A1 | 10/2007 | Ozick et al. |
| 2007/0245376 A1 | 10/2007 | Svendsen |
| 2007/0250872 A1 | 10/2007 | Dua |
| 2007/0250880 A1 | 10/2007 | Hainline |
| 2007/0250912 A1 | 10/2007 | Rassool et al. |
| 2007/0258329 A1 | 11/2007 | Winey |
| 2007/0261116 A1 | 11/2007 | Prafullchandra et al. |
| 2007/0276690 A1 | 11/2007 | Ohtani et al. |
| 2007/0276925 A1 | 11/2007 | La et al. |
| 2007/0276926 A1* | 11/2007 | LaJoie ................. H04N 21/812 709/219 |
| 2007/0280298 A1 | 12/2007 | Hearn et al. |
| 2007/0288637 A1 | 12/2007 | Layton et al. |
| 2007/0288715 A1 | 12/2007 | Boswell et al. |
| 2007/0290885 A1 | 12/2007 | Tanabe et al. |
| 2007/0294178 A1 | 12/2007 | Pinder et al. |
| 2007/0294717 A1 | 12/2007 | Hill et al. |
| 2007/0294738 A1 | 12/2007 | Kuo et al. |
| 2007/0299728 A1 | 12/2007 | Nemirofsky et al. |
| 2008/0008321 A1 | 1/2008 | Gagnon et al. |
| 2008/0008371 A1 | 1/2008 | Woods et al. |
| 2008/0009345 A1 | 1/2008 | Bailey et al. |
| 2008/0021836 A1* | 1/2008 | Lao ..................... G11B 20/0071 705/54 |
| 2008/0022012 A1 | 1/2008 | Wang |
| 2008/0039974 A1 | 2/2008 | Sandin et al. |
| 2008/0059804 A1 | 3/2008 | Shah et al. |
| 2008/0066112 A1 | 3/2008 | Bailey et al. |
| 2008/0085048 A1 | 4/2008 | Venetsky et al. |
| 2008/0086241 A1 | 4/2008 | Phillips et al. |
| 2008/0086750 A1 | 4/2008 | Yasrebi et al. |
| 2008/0091805 A1 | 4/2008 | Malaby et al. |
| 2008/0091807 A1 | 4/2008 | Strub et al. |
| 2008/0092163 A1 | 4/2008 | Song et al. |
| 2008/0092181 A1 | 4/2008 | Britt |
| 2008/0098212 A1* | 4/2008 | Helms ................. G06F 21/6209 713/155 |
| 2008/0098450 A1 | 4/2008 | Wu et al. |
| 2008/0982412 | 4/2008 | Helms et al. |
| 2008/0100482 A1 | 5/2008 | Lazar |
| 2008/0103976 A1 | 5/2008 | Read et al. |
| 2008/0103977 A1 | 5/2008 | Khosravy et al. |
| 2008/0112405 A1 | 5/2008 | Cholas et al. |
| 2008/0117920 A1 | 5/2008 | Tucker |
| 2008/0123862 A1 | 5/2008 | Rowley |
| 2008/0133551 A1 | 6/2008 | Wensley et al. |
| 2008/0137541 A1 | 6/2008 | Agarwal et al. |
| 2008/0141353 A1 | 6/2008 | Brown |
| 2008/0148362 A1 | 6/2008 | Gilder et al. |
| 2008/0154626 A1 | 6/2008 | Gounares et al. |
| 2008/0155059 A1 | 6/2008 | Hardin et al. |
| 2008/0162353 A1 | 7/2008 | Tom et al. |

(56) References Cited

U.S. PATENT DOCUMENTS

| | | |
|---|---|---|
| 2008/0165460 A1 | 7/2008 | Whitby-Strevens |
| 2008/0170530 A1 | 7/2008 | Connors et al. |
| 2008/0170551 A1 | 7/2008 | Zaks |
| 2008/0177998 A1 | 7/2008 | Apsangi et al. |
| 2008/0192820 A1 | 8/2008 | Brooks et al. |
| 2008/0201282 A1 | 8/2008 | Garcia et al. |
| 2008/0201386 A1 | 8/2008 | Maharajh et al. |
| 2008/0201748 A1 | 8/2008 | Hasek et al. |
| 2008/0212945 A1 | 9/2008 | Khedouri et al. |
| 2008/0222684 A1 | 9/2008 | Mukraj et al. |
| 2008/0235746 A1 | 9/2008 | Peters et al. |
| 2008/0243385 A1* | 10/2008 | Yamamoto ............ G08B 7/064 705/1.1 |
| 2008/0256510 A1 | 10/2008 | Auerbach |
| 2008/0270307 A1 | 10/2008 | Olson et al. |
| 2008/0273591 A1 | 11/2008 | Brooks et al. |
| 2008/0276304 A1* | 11/2008 | Maffione ............... H04L 63/101 726/4 |
| 2008/0279534 A1 | 11/2008 | Buttars |
| 2008/0281971 A1 | 11/2008 | Leppanen et al. |
| 2008/0282299 A1 | 11/2008 | Koat et al. |
| 2008/0288618 A1 | 11/2008 | Vardi et al. |
| 2008/0294074 A1 | 11/2008 | Tong et al. |
| 2008/0297669 A1 | 12/2008 | Zalewski et al. |
| 2008/0306903 A1 | 12/2008 | Larson et al. |
| 2008/0320523 A1 | 12/2008 | Morris et al. |
| 2009/0006256 A1* | 1/2009 | Lazovsky ............... G06F 21/10 705/26.1 |
| 2009/0007234 A1 | 1/2009 | Birger et al. |
| 2009/0013356 A1 | 1/2009 | Doerr et al. |
| 2009/0014402 A1 | 1/2009 | Wolf et al. |
| 2009/0018696 A1 | 1/2009 | Goerick et al. |
| 2009/0025075 A1 | 1/2009 | Chow et al. |
| 2009/0030802 A1 | 1/2009 | Plotnick et al. |
| 2009/0031335 A1 | 1/2009 | Hendricks et al. |
| 2009/0031371 A1 | 1/2009 | Munsell et al. |
| 2009/0031384 A1* | 1/2009 | Brooks ............... H04N 21/2402 725/127 |
| 2009/0043722 A1 | 2/2009 | Nugent |
| 2009/0064221 A1 | 3/2009 | Stevens |
| 2009/0066790 A1 | 3/2009 | Hammadou |
| 2009/0083279 A1 | 3/2009 | Hasek |
| 2009/0083811 A1 | 3/2009 | Dolce et al. |
| 2009/0083813 A1 | 3/2009 | Dolce et al. |
| 2009/0086643 A1 | 4/2009 | Kotrla et al. |
| 2009/0086722 A1 | 4/2009 | Kaji |
| 2009/0089438 A1* | 4/2009 | Agarwal ............... H04L 61/4511 709/228 |
| 2009/0098861 A1 | 4/2009 | Kalliola et al. |
| 2009/0100459 A1 | 4/2009 | Riedl et al. |
| 2009/0100493 A1 | 4/2009 | Jones et al. |
| 2009/0102983 A1 | 4/2009 | Malone et al. |
| 2009/0113472 A1 | 4/2009 | Sheth et al. |
| 2009/0118890 A1 | 5/2009 | Lin et al. |
| 2009/0133048 A1 | 5/2009 | Gibbs et al. |
| 2009/0133090 A1 | 5/2009 | Busse |
| 2009/0141696 A1 | 6/2009 | Chou et al. |
| 2009/0141939 A1 | 6/2009 | Chambers et al. |
| 2009/0144362 A1* | 6/2009 | Richmond ............ H04L 51/214 709/203 |
| 2009/0150400 A1* | 6/2009 | Abu-Hakima .......... H04L 67/55 |
| 2009/0150917 A1 | 6/2009 | Huffman et al. |
| 2009/0151006 A1 | 6/2009 | Saeki et al. |
| 2009/0153499 A1 | 6/2009 | Kim et al. |
| 2009/0156204 A1* | 6/2009 | Kim .................. H04L 63/0884 455/432.1 |
| 2009/0158311 A1 | 6/2009 | Hon et al. |
| 2009/0161981 A1 | 6/2009 | Allen |
| 2009/0165105 A1* | 6/2009 | Chaudhry ............ H04L 63/166 726/14 |
| 2009/0168995 A1* | 7/2009 | Banga ................. G06F 16/958 707/999.01 |
| 2009/0172776 A1 | 7/2009 | Makagon et al. |
| 2009/0175218 A1 | 7/2009 | Song et al. |
| 2009/0177794 A1* | 7/2009 | Alexander ............ G06F 16/435 709/237 |
| 2009/0182815 A1 | 7/2009 | Czechowski, III et al. |
| 2009/0185576 A1 | 7/2009 | Kisel et al. |
| 2009/0187939 A1 | 7/2009 | Lajoie |
| 2009/0193466 A1* | 7/2009 | Ehreth ............. H04N 21/47202 725/110 |
| 2009/0193486 A1 | 7/2009 | Patel et al. |
| 2009/0201917 A1 | 8/2009 | Maes et al. |
| 2009/0203387 A1* | 8/2009 | Wold .................... H04L 67/52 705/14.1 |
| 2009/0210899 A1 | 8/2009 | Lawrence-Apfelbaum et al. |
| 2009/0210912 A1 | 8/2009 | Cholas et al. |
| 2009/0220216 A1 | 9/2009 | Marsh et al. |
| 2009/0225760 A1 | 9/2009 | Foti |
| 2009/0235308 A1 | 9/2009 | Ehlers et al. |
| 2009/0282241 A1 | 11/2009 | Prafullchandra et al. |
| 2009/0282449 A1 | 11/2009 | Lee |
| 2009/0287624 A1 | 11/2009 | Rouat et al. |
| 2009/0290711 A1 | 11/2009 | Bloom et al. |
| 2009/0292922 A1 | 11/2009 | Park |
| 2009/0293101 A1 | 11/2009 | Carter et al. |
| 2009/0296621 A1 | 12/2009 | Park et al. |
| 2009/0310862 A1 | 12/2009 | Tu et al. |
| 2009/0313116 A1* | 12/2009 | Ashbaugh .......... G06Q 30/0255 705/14.47 |
| 2010/0012568 A1 | 1/2010 | Fujisawa et al. |
| 2010/0017627 A1 | 1/2010 | Princen et al. |
| 2010/0027560 A1 | 2/2010 | Yang et al. |
| 2010/0030578 A1 | 2/2010 | Siddique et al. |
| 2010/0031299 A1 | 2/2010 | Harrang et al. |
| 2010/0031366 A1* | 2/2010 | Knight .................... H04W 4/24 709/219 |
| 2010/0036457 A1 | 2/2010 | Sarpeshkar et al. |
| 2010/0042478 A1 | 2/2010 | Reisman |
| 2010/0043030 A1 | 2/2010 | White |
| 2010/0081375 A1 | 4/2010 | Rosenblatt et al. |
| 2010/0081958 A1 | 4/2010 | She |
| 2010/0082983 A1 | 4/2010 | Shah et al. |
| 2010/0083329 A1 | 4/2010 | Joyce et al. |
| 2010/0083362 A1 | 4/2010 | Francisco et al. |
| 2010/0086171 A1 | 4/2010 | Lapstun |
| 2010/0088236 A1 | 4/2010 | Karabulut et al. |
| 2010/0088292 A1 | 4/2010 | Tirpak et al. |
| 2010/0091286 A1 | 4/2010 | Dahlgren |
| 2010/0100240 A1 | 4/2010 | Wang et al. |
| 2010/0106846 A1 | 4/2010 | Noldus et al. |
| 2010/0115091 A1 | 5/2010 | Park et al. |
| 2010/0115113 A1 | 5/2010 | Short et al. |
| 2010/0119214 A1 | 5/2010 | Shimazaki et al. |
| 2010/0122274 A1 | 5/2010 | Gillies et al. |
| 2010/0122276 A1 | 5/2010 | Chen |
| 2010/0125658 A1 | 5/2010 | Strasters |
| 2010/0131973 A1 | 5/2010 | Dillon et al. |
| 2010/0138900 A1 | 6/2010 | Peterka et al. |
| 2010/0166320 A1 | 7/2010 | Paquier |
| 2010/0169153 A1* | 7/2010 | Hwacinski ......... G06Q 30/0202 705/14.58 |
| 2010/0169977 A1 | 7/2010 | Dasher et al. |
| 2010/0182136 A1 | 7/2010 | Pryor |
| 2010/0185855 A1 | 7/2010 | Margolus et al. |
| 2010/0198888 A1 | 8/2010 | Blomstedt et al. |
| 2010/0199299 A1 | 8/2010 | Chang et al. |
| 2010/0199312 A1 | 8/2010 | Chang et al. |
| 2010/0217613 A1 | 8/2010 | Kelly |
| 2010/0217837 A1 | 8/2010 | Ansari et al. |
| 2010/0218231 A1 | 8/2010 | Frink et al. |
| 2010/0219613 A1 | 9/2010 | Zaloom et al. |
| 2010/0228418 A1 | 9/2010 | Whitlow et al. |
| 2010/0250022 A1 | 9/2010 | Hines et al. |
| 2010/0250341 A1* | 9/2010 | Hauser ................... H04L 67/02 707/E17.042 |
| 2010/0251304 A1 | 9/2010 | Donoghue et al. |
| 2010/0251305 A1 | 9/2010 | Kimble et al. |
| 2010/0269144 A1 | 10/2010 | Forsman et al. |
| 2010/0280641 A1 | 11/2010 | Harkness et al. |
| 2010/0283853 A1 | 11/2010 | Acree |
| 2010/0286824 A1 | 11/2010 | Solomon |
| 2010/0287585 A1 | 11/2010 | Frondal et al. |

(56) References Cited

U.S. PATENT DOCUMENTS

| | | |
|---|---|---|
| 2010/0287609 A1 | 11/2010 | Gonzalez et al. |
| 2010/0289643 A1 | 11/2010 | Trundle et al. |
| 2010/0290710 A1 | 11/2010 | Gagvani et al. |
| 2010/0292835 A1 | 11/2010 | Sugiura et al. |
| 2010/0293049 A1* | 11/2010 | Maher ............ G06F 16/9535 705/14.69 |
| 2010/0310076 A1 | 12/2010 | Barzilai et al. |
| 2010/0313225 A1 | 12/2010 | Cholas et al. |
| 2010/0313226 A1 | 12/2010 | Cholas et al. |
| 2010/0316257 A1 | 12/2010 | Xu et al. |
| 2010/0325547 A1 | 12/2010 | Keng et al. |
| 2011/0015989 A1 | 1/2011 | Tidwell et al. |
| 2011/0016071 A1 | 1/2011 | Guillen et al. |
| 2011/0016479 A1 | 1/2011 | Tidwell et al. |
| 2011/0016482 A1 | 1/2011 | Tidwell et al. |
| 2011/0035072 A1 | 2/2011 | Jackson |
| 2011/0071841 A1 | 3/2011 | Fomenko et al. |
| 2011/0078717 A1 | 3/2011 | Drummond et al. |
| 2011/0078721 A1 | 3/2011 | Wang et al. |
| 2011/0090898 A1 | 4/2011 | Patel et al. |
| 2011/0093900 A1 | 4/2011 | Patel et al. |
| 2011/0099017 A1 | 4/2011 | Ure |
| 2011/0102600 A1 | 5/2011 | Todd |
| 2011/0103374 A1 | 5/2011 | Lajoie et al. |
| 2011/0107379 A1 | 5/2011 | Lajoie et al. |
| 2011/0107436 A1 | 5/2011 | Cholas et al. |
| 2011/0110515 A1 | 5/2011 | Tidwell et al. |
| 2011/0119214 A1 | 5/2011 | Breitwisch et al. |
| 2011/0119215 A1 | 5/2011 | Elmegreen et al. |
| 2011/0119637 A1* | 5/2011 | Tuli ............... G06F 16/64 715/863 |
| 2011/0119724 A1* | 5/2011 | Damola .......... H04L 65/102 725/110 |
| 2011/0126018 A1 | 5/2011 | Narsinh et al. |
| 2011/0134245 A1 | 6/2011 | Khizhnichenko |
| 2011/0138064 A1 | 6/2011 | Rieger et al. |
| 2011/0145049 A1 | 6/2011 | Hertel et al. |
| 2011/0164753 A1 | 7/2011 | Dubhashi et al. |
| 2011/0166932 A1 | 7/2011 | Smith et al. |
| 2011/0169977 A1 | 7/2011 | Masuda |
| 2011/0173053 A1 | 7/2011 | Aaltonen et al. |
| 2011/0173095 A1 | 7/2011 | Kassaei et al. |
| 2011/0178658 A1 | 7/2011 | Kotaba et al. |
| 2011/0178943 A1 | 7/2011 | Motahari et al. |
| 2011/0179196 A1 | 7/2011 | Friedman |
| 2011/0184556 A1 | 7/2011 | Seth et al. |
| 2011/0191801 A1 | 8/2011 | Vytheeswaran |
| 2011/0197070 A1 | 8/2011 | Mizrah |
| 2011/0208355 A1 | 8/2011 | Tsusaka |
| 2011/0213688 A1 | 9/2011 | Santos et al. |
| 2011/0219229 A1 | 9/2011 | Cholas et al. |
| 2011/0222832 A1 | 9/2011 | Aizawa |
| 2011/0228742 A1 | 9/2011 | Honkasalo et al. |
| 2011/0235698 A1 | 9/2011 | Petre et al. |
| 2011/0245974 A1 | 10/2011 | Kawamoto et al. |
| 2011/0252236 A1 | 10/2011 | De et al. |
| 2011/0252243 A1 | 10/2011 | Brouwer et al. |
| 2011/0265116 A1 | 10/2011 | Stern et al. |
| 2011/0276881 A1 | 11/2011 | Keng et al. |
| 2012/0005527 A1 | 1/2012 | Engel et al. |
| 2012/0008786 A1 | 1/2012 | Cronk et al. |
| 2012/0011090 A1 | 1/2012 | Tang et al. |
| 2012/0011567 A1 | 1/2012 | Cronk et al. |
| 2012/0023535 A1 | 1/2012 | Brooks |
| 2012/0030363 A1 | 2/2012 | Conrad |
| 2012/0030714 A1 | 2/2012 | Sweatt, III et al. |
| 2012/0063736 A1 | 3/2012 | Simmons et al. |
| 2012/0079866 A1 | 4/2012 | Kuwayama et al. |
| 2012/0081552 A1 | 4/2012 | Sablak et al. |
| 2012/0083982 A1 | 4/2012 | Bonefas et al. |
| 2012/0089699 A1 | 4/2012 | Cholas |
| 2012/0093402 A1 | 4/2012 | Staelin et al. |
| 2012/0098933 A1 | 4/2012 | Robinson et al. |
| 2012/0109866 A1 | 5/2012 | Modha |
| 2012/0109886 A1 | 5/2012 | Ko |
| 2012/0117012 A1 | 5/2012 | Szatmary et al. |
| 2012/0124606 A1 | 5/2012 | Tidwell et al. |
| 2012/0131629 A1 | 5/2012 | Shrum, Jr. et al. |
| 2012/0143495 A1 | 6/2012 | Dantu |
| 2012/0144416 A1 | 6/2012 | Wetzer et al. |
| 2012/0159603 A1 | 6/2012 | Queck |
| 2012/0167173 A1 | 6/2012 | Nadalin et al. |
| 2012/0171927 A1 | 7/2012 | Yu |
| 2012/0173021 A1 | 7/2012 | Tsusaka |
| 2012/0185092 A1 | 7/2012 | Ku |
| 2012/0185899 A1 | 7/2012 | Riedl et al. |
| 2012/0209428 A1 | 8/2012 | Mizutani |
| 2012/0209432 A1 | 8/2012 | Fleischer et al. |
| 2012/0211923 A1 | 8/2012 | Garner et al. |
| 2012/0256941 A1 | 10/2012 | Ballestad et al. |
| 2012/0260346 A1 | 10/2012 | Carey et al. |
| 2012/0265370 A1 | 10/2012 | Kim et al. |
| 2012/0291062 A1 | 11/2012 | Pearson et al. |
| 2012/0295662 A1 | 11/2012 | Haubrich |
| 2012/0303091 A1 | 11/2012 | Izhikevich |
| 2012/0308076 A1 | 12/2012 | Piekniewski et al. |
| 2012/0308136 A1 | 12/2012 | Izhikevich |
| 2012/0310386 A1 | 12/2012 | To et al. |
| 2012/0330872 A1 | 12/2012 | Esser et al. |
| 2013/0014140 A1 | 1/2013 | Ye et al. |
| 2013/0014171 A1 | 1/2013 | Sansom et al. |
| 2013/0024888 A1 | 1/2013 | Sivertsen |
| 2013/0046716 A1 | 2/2013 | Chan et al. |
| 2013/0046849 A1 | 2/2013 | Wolf et al. |
| 2013/0073484 A1 | 3/2013 | Izhikevich et al. |
| 2013/0073491 A1 | 3/2013 | Izhikevich et al. |
| 2013/0073492 A1 | 3/2013 | Izhikevich et al. |
| 2013/0073495 A1 | 3/2013 | Izhikevich et al. |
| 2013/0073496 A1 | 3/2013 | Szatmary et al. |
| 2013/0073498 A1 | 3/2013 | Izhikevich et al. |
| 2013/0073499 A1 | 3/2013 | Izhikevich et al. |
| 2013/0073500 A1 | 3/2013 | Szatmary et al. |
| 2013/0077597 A1 | 3/2013 | Nukala et al. |
| 2013/0077831 A1 | 3/2013 | Momozono et al. |
| 2013/0097647 A1 | 4/2013 | Brooks et al. |
| 2013/0103626 A1 | 4/2013 | Hunzinger |
| 2013/0116827 A1 | 5/2013 | Inazumi |
| 2013/0117212 A1 | 5/2013 | Hunzinger et al. |
| 2013/0117692 A1 | 5/2013 | Padmanabhan et al. |
| 2013/0125223 A1* | 5/2013 | Sorotokin .......... H04L 9/3213 713/168 |
| 2013/0151448 A1 | 6/2013 | Ponulak |
| 2013/0151449 A1 | 6/2013 | Ponulak |
| 2013/0151450 A1 | 6/2013 | Ponulak |
| 2013/0176423 A1 | 7/2013 | Rischmuller et al. |
| 2013/0184860 A1 | 7/2013 | Ota et al. |
| 2013/0191443 A1 | 7/2013 | Gan et al. |
| 2013/0201316 A1 | 8/2013 | Binder et al. |
| 2013/0204814 A1 | 8/2013 | Hunzinger et al. |
| 2013/0204820 A1 | 8/2013 | Hunzinger et al. |
| 2013/0216144 A1 | 8/2013 | Robinson et al. |
| 2013/0218821 A1 | 8/2013 | Szatmary et al. |
| 2013/0227284 A1 | 8/2013 | Pfeffer et al. |
| 2013/0245937 A1 | 9/2013 | Dibernardo et al. |
| 2013/0251278 A1 | 9/2013 | Izhikevich et al. |
| 2013/0272570 A1 | 10/2013 | Sheng et al. |
| 2013/0297542 A1 | 11/2013 | Piekniewski et al. |
| 2013/0300644 A1 | 11/2013 | Chen et al. |
| 2013/0309971 A1 | 11/2013 | Kiukkonen et al. |
| 2013/0310977 A1 | 11/2013 | Tsusaka et al. |
| 2013/0314502 A1 | 11/2013 | Urbach et al. |
| 2013/0318217 A1 | 11/2013 | Imes et al. |
| 2013/0318629 A1 | 11/2013 | Lajoie et al. |
| 2013/0325768 A1 | 12/2013 | Sinyavskiy et al. |
| 2013/0325773 A1 | 12/2013 | Sinyavskiy et al. |
| 2013/0325774 A1 | 12/2013 | Sinyavskiy et al. |
| 2013/0325775 A1 | 12/2013 | Sinyavskiy et al. |
| 2013/0325776 A1 | 12/2013 | Ponulak et al. |
| 2013/0325777 A1 | 12/2013 | Petre et al. |
| 2013/0326839 A1 | 12/2013 | Cho et al. |
| 2013/0347089 A1 | 12/2013 | Bailey et al. |
| 2014/0008496 A1 | 1/2014 | Ye et al. |
| 2014/0012788 A1 | 1/2014 | Piekniewski |
| 2014/0016858 A1 | 1/2014 | Richert |

(56) References Cited

U.S. PATENT DOCUMENTS

| | | |
|---|---|---|
| 2014/0032021 A1 | 1/2014 | Metzler et al. |
| 2014/0041042 A1 | 2/2014 | Wong et al. |
| 2014/0051485 A1 | 2/2014 | Wang et al. |
| 2014/0074855 A1 | 3/2014 | Zhao et al. |
| 2014/0078343 A1 | 3/2014 | Dai et al. |
| 2014/0079297 A1 | 3/2014 | Tadayon et al. |
| 2014/0081895 A1 | 3/2014 | Coenen et al. |
| 2014/0085507 A1 | 3/2014 | Pillman et al. |
| 2014/0085545 A1 | 3/2014 | Tu et al. |
| 2014/0086486 A1 | 3/2014 | Pillman et al. |
| 2014/0089232 A1 | 3/2014 | Buibas et al. |
| 2014/0104498 A1 | 4/2014 | Li et al. |
| 2014/0114477 A1 | 4/2014 | Sato et al. |
| 2014/0114867 A1 | 4/2014 | Volkmann et al. |
| 2014/0116469 A1 | 5/2014 | Kim et al. |
| 2014/0142729 A1 | 5/2014 | Lobb et al. |
| 2014/0175267 A1 | 6/2014 | Thiel et al. |
| 2014/0198838 A1 | 7/2014 | Andrysco et al. |
| 2014/0233923 A1 | 8/2014 | Bradley et al. |
| 2014/0240492 A1 | 8/2014 | Lee et al. |
| 2014/0247325 A1 | 9/2014 | Wu et al. |
| 2014/0276951 A1 | 9/2014 | Hourtash et al. |
| 2014/0277718 A1 | 9/2014 | Izhikevich et al. |
| 2014/0281489 A1 | 9/2014 | Peterka et al. |
| 2014/0281904 A1 | 9/2014 | Burckart et al. |
| 2014/0282750 A1 | 9/2014 | Civiletto |
| 2014/0283137 A1 | 9/2014 | Rebaud et al. |
| 2014/0320668 A1 | 10/2014 | Kalevo et al. |
| 2015/0006744 A1 | 1/2015 | Chatterjee et al. |
| 2015/0012943 A1 | 1/2015 | Mampaey |
| 2015/0015165 A1 | 1/2015 | Engelen et al. |
| 2015/0040176 A1 | 2/2015 | Hybertson et al. |
| 2015/0095932 A1 | 4/2015 | Ren |
| 2015/0143408 A1 | 5/2015 | Sallas |
| 2015/0157182 A1 | 6/2015 | Noh et al. |
| 2015/0168954 A1 | 6/2015 | Hickerson et al. |
| 2015/0234385 A1 | 8/2015 | Sandin et al. |
| 2015/0362919 A1 | 12/2015 | Bernstein et al. |
| 2016/0075015 A1 | 3/2016 | Izhikevich et al. |
| 2016/0134912 A1* | 5/2016 | Dillon ............ H04N 21/2541 725/25 |
| 2016/0165650 A1 | 6/2016 | Kim et al. |
| 2016/0165651 A1 | 6/2016 | Pathuri et al. |
| 2016/0179096 A1 | 6/2016 | Bradlow et al. |
| 2016/0243701 A1 | 8/2016 | Gildert et al. |
| 2016/0301525 A1 | 10/2016 | Canard et al. |
| 2016/0337464 A1 | 11/2016 | Eriksson et al. |
| 2017/0048336 A1 | 2/2017 | Novo et al. |
| 2017/0230702 A1 | 8/2017 | Sarosi et al. |
| 2018/0054774 A1 | 2/2018 | Cohn et al. |

FOREIGN PATENT DOCUMENTS

| | | |
|---|---|---|
| EP | 1821459 A1 | 8/2007 |
| EP | 2081361 A1 | 7/2009 |
| EP | 2113860 A1 | 11/2009 |
| GB | 2381709 A | 5/2003 |
| JP | H0487423 A | 3/1992 |
| JP | H08263440 A | 10/1996 |
| JP | 2000156676 A | 6/2000 |
| JP | 2000332746 A | 11/2000 |
| JP | 2001243707 A | 9/2001 |
| JP | 2001274786 A | 10/2001 |
| JP | 2001274788 A | 10/2001 |
| JP | 2001275090 A | 10/2001 |
| JP | 2001285821 A | 10/2001 |
| JP | 2002163396 A | 6/2002 |
| JP | 2002352094 A | 12/2002 |
| JP | 2003058657 A | 2/2003 |
| JP | 2003162600 A | 6/2003 |
| JP | 2003233690 A | 8/2003 |
| JP | 2003248508 A | 9/2003 |
| JP | 2003296484 A | 10/2003 |
| JP | 2003348508 A | 12/2003 |
| JP | 2004030111 A | 1/2004 |
| JP | 2004072721 A | 3/2004 |
| JP | 2004120736 A | 4/2004 |
| JP | 2004120738 A | 4/2004 |
| JP | 2004303111 A | 10/2004 |
| JP | 2005506627 A | 3/2005 |
| JP | 2005519365 A | 6/2005 |
| JP | 2005519501 A | 6/2005 |
| JP | 2005339093 A | 12/2005 |
| JP | 2006185473 A | 7/2006 |
| JP | 2006311267 A | 11/2006 |
| JP | 2007020144 A | 1/2007 |
| JP | 2007534030 A | 11/2007 |
| JP | 2007336553 A | 12/2007 |
| JP | 2008005047 A | 1/2008 |
| JP | 2008015936 A | 1/2008 |
| JP | 2008021293 A | 1/2008 |
| JP | 2008507905 A | 3/2008 |
| JP | 2008167018 A | 7/2008 |
| JP | 2008186272 A | 8/2008 |
| JP | 2008206039 A | 9/2008 |
| JP | 2008539631 A | 11/2008 |
| JP | 2009071786 A | 4/2009 |
| JP | 2009515238 A | 4/2009 |
| JP | 2009176060 A | 8/2009 |
| JP | 2009211632 A | 9/2009 |
| JP | 2010502109 A | 1/2010 |
| JP | 2010079902 A | 4/2010 |
| JP | 2012505436 A | 3/2012 |
| JP | 2012523614 A | 10/2012 |
| RU | 2108612 C1 | 4/1998 |
| WO | WO-0103410 A1 | 1/2001 |
| WO | WO-0110125 A1 | 2/2001 |
| WO | WO-0137479 A1 | 5/2001 |
| WO | WO-0169842 A1 | 9/2001 |
| WO | WO-0177778 A2 | 10/2001 |
| WO | WO-0213032 A1 | 2/2002 |
| WO | WO-0221841 A1 | 3/2002 |
| WO | WO-0242966 A1 | 5/2002 |
| WO | WO-02080556 A1 | 10/2002 |
| WO | WO-03038704 A1 | 5/2003 |
| WO | WO-03087799 A1 | 10/2003 |
| WO | WO-03093944 A2 | 11/2003 |
| WO | WO-2004027622 A2 | 4/2004 |
| WO | WO-2005015422 A1 | 2/2005 |
| WO | WO-2005031524 A2 | 4/2005 |
| WO | WO-2006020141 A2 | 2/2006 |
| WO | WO-2007060451 A2 | 5/2007 |
| WO | WO-2008070062 A2 | 6/2008 |
| WO | WO-2008080556 A1 | 7/2008 |
| WO | WO-2008083335 A2 | 7/2008 |
| WO | WO-2009020476 A2 | 2/2009 |
| WO | WO-2010136961 A1 | 12/2010 |
| WO | WO-2012021245 A1 | 2/2012 |
| WO | WO-2012114140 A1 | 8/2012 |

OTHER PUBLICATIONS

Abbott L. F. and Nelson S.B. (2000), "Synaptic plasticity: taming the beast", Nature Neuroscience, 3, 1178-1183.

ALCATEL: "Delivering True Triple Play—Common Capabilities for the Delivery of Composite Services", Internet Citation, Jun. 2006 (Jun. 2006), XP002418653, Retrieved from the Internet: URL:http://www.alcatel-lucent.com/tripleplay [retrieved on Feb. 6, 2007].

Asensio et al., "Robot Learning Control Based on Neural Network Prediction" ASME 8th Annual Dynamic Systems and Control Conference joint with the JSME 11th Motion and Vibration Conference 2012 [Retrieved on: Jun. 24, 2014]. Retrieved fro internet:http://msc.berkeley.edu/wjchen/publications/DSC12.sub.--8726.sub.--FI-.pdf<http: />.

Baluja S., et al., "Expectation-based Selective Attention for Visual Monitoring and Control of a Robot Vehicle," Robotics and Autonomous Systems, 1997, pp. 329-344.

Bohte, 'Spiking Nueral Networks' Doctorate at the University of Leiden, Holland, Mar. 5, 2003, pp. 1-133 [retrieved on Nov. 14, 2012]. Retrieved from the interne http://homepages.cwi.nl/~sbohte/publication/phdthesis.pdf<url: />.

(56) References Cited

OTHER PUBLICATIONS

Bouganis, Alexandros, et al.,"Training a Spiking Neural Network to Control a 4-DoF Robotic Arm based on Spike Timing-Dependent Plasticity", Proceedings of WCCI 2010 IEEE World Congress on Computational Intelligence, COB, Barcelona, Spain, Jul. 18-23, 2010, pp. 4104-4111.

Brette et al., Brian: a simple and flexible simulator for spiking neural networks, The Neuromorphic Engineer, Jul. 1, 2009, pp. 1-4, doi: 10.2417/1200906.1659.

Brette, et al., "Simulation of Networks of Spiking Neurons: A Review of Tools and Strategies", Received Nov. 29, 2006, Revised Apr. 2, 2007, Accepted Apr. 12, 2007, Springer Science, 50 pages.

Cantor, et al., Assertions and Protocols for the OASIS Security Assertion Markup Language (SAML) V2.0, OASIS Standard, Mar. 15, 2005. Document ID: saml-core-2.0-os (http://docs.oasis-open.org/security/saml/v2.0/saml-core-2.0-os.pdf).

Cantor, et al., Bindings for the OASIS Security Assertion Markup Language (SAML) V2.0, OASIS Standard, Mar. 2005, Document ID saml-bindings-2.0-os , (http://docs.oasis-open.org/security/saml/v2.0/saml-bindings-2.0-os.pdf).

Cessac et al. 'Overview of facts and issues about neural coding by spikes.' Journal of Physiology, Paris 104.1 (2010): 5.

Chistiakova, Marina, et al., "Heterosynaptic plasticity in the neocortex." Experimental brain research 199.3-4 (2009): 377-390.

Coupard, Pierre-Philippe, An Availabot-like computer-controlled push puppet for Linux, https://web.archive.org/web/20081106161941/http://myspace.voo.be/pcoupard/push_puppet_to_y/, 2008.

Cuntz et al., 'One Rule to Grow Them All: A General Theory of Neuronal Branching and Its Paractical Application' PLOS Computational Biology, 6 (8), Published Aug. 5, 2010.

Daniel Bush, "STDP, Rate-coded Hebbian Learning and Auto-Associative Network Models of the Hippocampus", Sep. 2008, University of Sussex, pp. 1-109.

Davison et al., PyNN: a common interface for neuronal network simulators, Frontiers in Neuroinformatics, Jan. 2009, pp. 1-10, vol. 2, Article 11.

DCAS Authorized< gwmw class="ginger-module-highlighter-mistake-type-3" id="gwmw-15487095474138963691403">Service Domain</gwmw>, Version 1.2, dated Nov. 4, 2008, 58 pages.

DCAS Authorized Service Domain, Version 1.2, Nov. 30, 2005, 56 pages.

DCAS Licensed Specification Abstracts, CableLabs Confidential Information, Jan. 12, 2006, 4 pages.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

DLNA (Digital Living Network Alliance) protocols described in DLNA Networked Device Interoperability Guidelines Expanded, Mar. 2006 and subsequent expanded version dated Oct. 2006.

Dorval et al. 'Probability distributions of the logarithm of inter-spike intervals yield accurate entropy estimates from small datasets.' Journal of neuroscience methods 173.1 (2008): 129.

DVB (Digital Video Broadcasting), DVB Document A045 Rev. 3, Jul. 2004, "Head-end Implementation of SimulCrypt," 289 pages.

DVB (Digital Video Broadcasting); DVB SimulCrypt; Part 1: "Head-end architecture and synchronization" Technical Specification—ETSI TS 101 197 V1.2.1 (Feb. 2002), 40 pages.

Federal Information Processing Standards Publication, US FIPS PUB 197, Nov. 26, 2001, "Advanced Encryption Standards (AES)," 47 pages.

Fidjeland, et al., "Accelerated Simulation of Spiking Neural Networks Using GPUs," WCCI 2010 IEEE World Congress on Computational Intelligence, Jul. 18-23, 2010—CCIB, Barcelona, Spain, pp. 536-543, [retrieved on Nov. 14, 2012]. Retrieved from the Internet: URL:http://www.doc.ic.ac.ukl-mpsha/IJCNN10b.pdf.

Fletcher, L., et al., "Correlating Driver Gaze with the Road Scene for Driver Assistance Systems," Robotics and Autonomous Systems, 2005, pp. 71-84.

Floreano et al., 'Neuroevolution: from architectures to learning' Evol. Intel. Jan. 2008 1:47-62, [retrieved Dec. 30, 2013] [retrieved online from URL:http://inforscienee.eptl.cb/record/112676/files/FloreanoDuerrMattiussi2008.pdf<http: />.

Florin L., et al., "Content Delivery and Management in Networked MPEG-4 System," 2000 10th European Signal Processing Conference, IEEE, Sep. 4, 2000 (Sep. 4, 2000), pp. 1-4, XP032755920, ISBN: 978-952-15-0443-3 [retrieved on Mar. 31, 2015].

Gewaltig et al.. 'NEST (Neural Simulation Tool)', Scholarpedia, 2007. pp. I-15. 2(4): 1430, doi: 1 0.4249/scholarpedia.1430.

Glackin, C. et al., Feature Extraction from Spectra-temporal Signals using Dynamic Synapses, recurrency, and lateral inhibition, Neural Networks (IJCNN), The 2010 International Joint Conference on DOI: 10.1109/IJCNN.2010.5596818 Publication Year: 2010, pp. 1-6.

Gleeson et al., NeuroML: A Language for Describing Data Driven Models of Neurons and Networks with a High Degree of Biological Detail, PLOS Computational Biology, Jun. 2010, pp. 1-19 vol. 6 Issue 6.

Gollisch et al., 'Rapid neural coding in the retina with relative spike latencies.' Science 319.5866 (2008): 1108-1111.

Goodman et al., Brian: a simulator for spiking neural networks in Python, Frontiers in Neuroinformatics, Nov. 2008, pp. 1-10, vol. 2, Article 5.

Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conffninf.2011.08.00098.

Graham, Lyle J., The Surf-Hippo Reference Manual Version 3.0 B, Mar. 2002, URL: http://www.neurophys.biomedicale.univparis5. fr/graham/surf-hippo-files/Surf-Hippo%20Reference%20Manual.pdf, pp. 1-128.

Hardware and Software Platform for Mobile Manipulation R&D, 2012, https://web.archive.org/web/20120128031010/http://www.willowgarage.com/pages/pr2/design.

Harmony Ultimate User Guide, Version 4, pp. 1-54 Oct. 31, 2013.

High-bandwidth Digital Content Protection System, Revision 1.091, dated Apr. 22, 2003, Digital Content< gwmw class="ginger-module-highlighter-mistake-type-3" id="gwmw-15487095483507149357216">Protection LLC</gwmw> Draft, 78 pages.

Huh et al., "Generalized Power Law for Curve Movements" 2011.

Huh et al., "Real-Time Motor Control Using Recurrent Neural Networks" IEEEE Apr. 2009.

Huh, "Rethinking Optimal Control of Human Movements" Thesis 2012.

Ishii K., et al., Designing Laser Gesture Interface for Robot Control, Springer Berlin Heidelberg, Proceedings, Part II 12th IFIP TC 13 International Conference, Uppsala, Sweden, Aug. 24-28, 2009, Proceedings, pp. 479-492.

Itti, Laurent, et al., "Computational Modelling of Visual Attention", Nature Reviews—Neuroscience 2.3 (2001): 194-203.

Izhikevich E.M. (2006) Polychronization: Computation With Spikes. Neural Computation, 18:245-282.

Izhikevich, E,M. (2007) Dynamical Systems in Neuroscience: The Geometry of Excitability and Bursting, The MIT Press, 2007.

Izhikevich E.M., "Neural Excitability, Spiking and Bursting", Neurosciences Institute, Received Jun. 9, 99, Revised Oct. 25, 1999, 1171-1266, 96 pages.

Izhikevich et al., 'Relating STDP to BCM', Neural Computation (2003) 15, 1511-1523.

Izhikevich, 'Simple Model of Spiking Neurons', IEEE Transactions on Neural Networks, vol. 14, No. 6, Nov. 2003, pp. 1569-1572.

Jain, Learning Trajectory Preferences for Manipulators via Iterative Improvement, 2013, Advances in Neural Information Processing Systems 26 (NIPS 2013).

Jin, et al., (2010) "Implementing Spike-Timing-Dependent Plasticity on SpiNNaker Neuromorphic Hardware", WCCI 2010, IEEE World Congress on Computational Intelligence.

Judd, T., et al., "Learning to Predict where Humans look," 12th International Conference on Computer Vision, 2009, 8 pages.

(56) References Cited

OTHER PUBLICATIONS

Karbowski et al., 'Multispikes and Synchronization in a Large Neural Network with Temporal Delays', Neural Computation 12. 1573-1606 (2000).

Kasabov, "Evolving Spiking Neural Networks for Spatio-and Spectro-Temporal Pattern Recognition", IEEE 6th International Conference Intelligent Systems 2012 [Retrieved on Jun. 24, 2014], Retrieved from the Internet: http://ncs.ethz.ch/projects/evospike/publications/evolving-spiking-neural-networks-for-spatio-and-spectro-temporal-pattern-recognition-plenary-talk-ieee-is/view.

Kazantsev, et al., "Active Spike Transmission in the Neuron Model With a Winding Threshold Maniford", 01/03112,205-211,7 pages.

Khotanzad. 'Classification of invariant image representations using a neural network' IEEE. Transactions on Acoustics, Speech, and Signal Processing, vol. 38, No. 6, Jun. 1990, pp. 1028-1038 [online], [retrieved on Dec. 10, 2013]. Retrieved from the Internet URL: http://www-ee.uta.edu/eeweb/IP/Courses/SPR/Reference/ Khotanzad.pdf.

Kienzle, W. et al., "How to find interesting locations in video: a spatiotemporal point detector learned from human eye movements." Joint Pattern Recognition Symposium. Springer Berlin Heidelberg (2007) 10 pp.

Kling-Petersen, PhD, "Sun and HPC: From Systems to PetaScale" Sun Microsystems, no date, 31 pages.

Knoblauch A., et al., "Memory Capacities for Synaptic and Structural Plasticity," Neural Computation, 2010, vol. 22 (2), pp. 289-341.

Laurent, 'Issue 1—nnql Refactor Nucleus into its own file—Neural Network Query Language' [retrieved on Nov. 12, 2013]. Retrieved from the Internet: URL:https://code.google.com/p/nnql/issues/detail?id=1.

Laurent, 'The Neural Network Query Language (NNQL) Reference' [retrieved on Nov. 12, 2013]. Retrieved from the Internet: URL: https://code.google.com/p/ nnql/issues/detail?id=1.

Lazar et al. 'A video time encoding machine', in Proceedings of the 15th IEEE International Conference on Image Processing ICIP '08 2008, pp. 717-720.

Lazar, et al., "Consistent recovery of sensory stimuli encoded with MIMO neural circuits," Computational intelligence and neuroscience, 2010, 13 pages.

Lazar, et al., 'Multichannel time encoding with integrate-and-fire neurons.' Neurocomputing 65 (2005): 401-407.

Leydesdorff L., et al., "Classification and Powerlaws: The Logarithmic Transformation, Journal of the American Society for Information Science and Technology (forthcoming)", 2006.

Markram, Henry, et al. "Regulation of synaptic efficacy by coincidence of postsynaptic APs and EPSPs." Science 275.5297 (1997): 213-215.

Martinez-Perez, et al., "Automatic Activity Estimation Based on Object Behavior Signature", 2010, 10 pages.

Marusic, et al., "Share it !—Content Transfer in Home-to-Home Networks." IEEE MELECON 2004, May 12-15, 2004, Dubrovnik, Croatia.

Masquelier, Timothee, 'Relative spike time coding and STOP-based orientation selectivity in the early visual system in natural continuous and saccadic vision: a computational model.' Journal of computational neuroscience 32.3 (2012): 425-441.

Matsugu, et al., "Convolutional Spiking Neural Network for Robust Object Detection with Population Code Using Structured Pulse Packets", 2004, 39-55, 17 pages.

Media Server; 1 Device Template Version 1.01 Jun. 25, 2002.

Medin I.C., et al., Modeling Cerebellar Granular layer Excitability and Combinatorial Computation with Spikes, Bio-Inspired Computing: Theories and Applications (BIC-TA), 2010 IEEE Fifth International Conference on DOI: 10.1 109/BICTA.201 0.5645274, Publication Year: 2010, pp. 1495-1503.

Meinhardt, et al., "Pattern formation by local self-activation and lateral inhibition." Bioessays 22.8 (2000): 753-760.

Mircea Badescu and Constantinos Mavroidis, Novel Smart Connector for Modular Robotics, Aug. 7, 2002, Advanced Intelligent Mechatronics, 2001. Proceedings. 2001 IEEE/ASME International Conference on.

Mordatch et al., "Discovery of Complex Behaviors through Contract-Invariant Optimization" ACM Transactions on Graphics (TOG)—SIGGRAPH 2012 Conference.

Munn, S., et al., "Fixation-identification in Dynamic Scenes: Comparing an Automated Algorithm to Manual Coding," Proceedings of the 5th symposium on Applied Perception in Graphics and Visualization, 2008, pp. 33-42.

Nichols, A Reconfigurable Computing Architecture for Implementing Artificial Neural Networks on FPGA, Master's Thesis, The University of Guelph, 2003, pp. 1-235.

Niv, et al., Evolution of Reinforcement Learning in Uncertain Environments: A Simple Explanation for Complex Foraging Behaviors, International Society for Adaptive Behavior, 2002, vol. 10(1), pp. 5-24.

OpenCable Application Platform Specification, OCAP 2.0 Profile, OC-SP-OCAP2.0-I01-020419, Apr. 19, 2002.

OpenCable Application Platform Specifications, OCAP Extensions, OC-SP-OCAP--HNEXT-I03-080418, 2005-2008.

Opencable, Enhanced TV Binary Interchange, Format 1.0 OC-SP-ETV-BIF1.0-104-070921 Date: Sep. 21, 2007, 420 pages.

OpenCable Host Device, Core Functional Requirements, OC-SP-HOST-CFR-113-030707, Jul. 7, 2003.

Opencable, HOST-POD Interface Specification, OC-SP-HOSTPOD-IF-113-030707, Jul. 7, 2003.

OpenCable Specification, Home Networking Protocol 2.0, OC-SP-HNP2.0-I01-08418, 2007.

OpenCable Specifications, Home Networking Security Specification, OC-SP-HN-SEC-DO1-081027, draft (Oct. 27, 2008).

Ostojic, Srdjan, Nicolas Brunel, From Spiking Neuron Models to Linear-Nonlinear Models, Jan. 2011, vol. 7 (1), e1001056.

Pantjiaros C.A. P., et al., "Broadband Service Delivery: CY.T.A. ADSL Field Trial Experience", Electrotechnical Conference, 2000 MELECON, 2000 10th Mediterranean, May 29-31, 2000, Piscataway, NJ, USA, IEEE, vol. 1, May 29, 2000 (May 29, 2000), pp. 221-224, XP010518859, ISBN: 978-0-7803-6290-1.

Paugam-Moisy, et al., "Computing with Spiking Neuron Networks" Handbook of Natural Computing, 40 pages Springer, Heidelberg (2009).

Pavlidis et al. 'Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet URL: http://citeseerx.ist.psu.edu! viewdoc/download?doi= 0.1.1.5.4346&rep-repl&type-pdf.

Pham et al., "Affine Invariance of Human Hand Movements: a direct test" 2012.

PR2 User Manual, Oct. 5, 2012.

Primergy BX300 SWITCH BLADE user's manual, Fujitsu Corp., Sep. 30, 2002, first edition, pp. 1 to 20.

Ramachandran, et al., "The Perception of Phantom Limbs", The D.O. Hebb Lecture, Center for Brain and Cognition, University of California, 1998, 121, 1603-1630,28 pages.

Real System Media Commerce Suite Technical White Paper, Copyright 2011, Real Networks, Inc., 16 pages, (http://www.realnetworkis).

RealSystem Media Commerce Suite Technical White Paper, Copyrgt, 2001 RealNetworks, Inc., http://www.realnetworks.com, 16 pages.

Redux screenshot from http://www.redux.com, "Select a channel to start watching" @ 2014 Redux, Inc.014 Redux, Inc. All rights reserved; http://www.redux.com/; 2 pages.

Ruan, Chengmei, et al., Competitive behaviors of a spiking neural network with spike timing dependent plasticity, Biomedical Engineering and Informatics (BMEI), 2012 5th International Conference on DOI: 10.1109/BMEI.2012.6513088 Publication Year: 2012, pp. 1015-1019.

Sato et al., 'Pulse interval and width modulation for video transmission.' Cable Television, IEEE Transactions on 4 (1978): 165-173.

(56) References Cited

OTHER PUBLICATIONS

Schaal et al., An Example Application of Policy Improvement with Path Integrals (PI.sup.2), Jun. 9, 2010.

Schemmel, J., et al., Implementing synaptic plasticity in a VLSI spiking neural network model. In: Proceedings of the 2006 Intenational Joint Conference on Neural Networks (IJCNN'06), IEEE Press (2006) Jul. 16-21, 2006, pp. 1-6 [online], [retrieved on Aug. 24, 2012]. Retrieved from the Internet URL: http://www.kip.uniheidelberg.deNeroeffentlichungen/download.cgi/4620/ps/1774.pdf.

Shepard et al., "Evaluation of Smart Grid and Civilian UAV Vulnerability to GPS Spoofing Attacks", Northrop Grumman Information Systems, 2012 Ion GNSS Conference Nashville, TN, Sep. 19-21, 2012.

Siebenlist F., et al., "Global Grid Forum Specification Roadmap towards a Secure OGSA," Jul. 2002, pp. 1-22.

Simulink.RTM. model [online], [Retrieved on Dec. 10, 2013] Retrieved from &It:URL: http://www.mathworks.com/ products/simulink/index.html.

Sinyavskiy et al. 'Reinforcement learning of a spiking neural network in the task of control of an agent in a virtual discrete environment' Rus, J. Nonlin. Dyn., 2011, vol. 7, No. 4 (Mobile Robots), pp. 859-875, chapters 1-8 (Russian Article with English Abstract).

Sjostrom et al., 'Spike-Timing Dependent Plasticity' Scholarpedia, 5(2):1362 (2010), pp. 1-18.

Steele, The Human Touch Makes Robots Defter, Nov. 6, 2013, Cornell Chronicle. http://www.news.cornell.edu/stories/2013/11/human-touch-makes-robots-defter.

Stringer, et al., "Invariant Object Recognition in the Visual System with Novel Views of 3D Objects", 2002, 2585-2596, 12 pages.

Suzuki et al., Operation Direction to a Mobile Robot by Projection Lights, 2005 IEEE Workshop on Advanced Robotics and its Social Impacts, Jun. 12-15, 2005, pp. 160-165.

Swiercz, Waldemar, et al. "A new synaptic plasticity rule for networks of spiking neurons." Neural Networks, IEEE Transactions on 17.1 (2006): 94-105.

Szatmary et al.,, "Spike-timing Theory of Working Memory" PLOS Computational Biology, vol. 6, Issue 8, Aug. 19, 2010 [retrieved on Dec. 30, 2013]. Retrieved from the Internet: URL: http://www.ploscompbioLorg/article/info%3Adoi%2F10.1371%2Fjournal,pcbi.1000879<url:></url:>.

Tank D.W., et al., "Neural Computation by Concentrating Information in Time," Proceedings of the National Academy of Sciences of the United States of America, 1987, vol. 84 (7), pp. 1896-1900.

Thorpe, S.J., et al. (2001), Spike-based strategies for rapid processing. Neural Networks 14, pp. 715-725.

Thorpe, S.J., et al. (2004), SpikeNet: real-time visual processing with one spike per neuron, Neurocomputing, 58-60, pp. 857-864.

Todorov E., "Direct Cortical Control of Muscle Activation in Voluntary Arm Movements: a Model.," Nature Neuroscience, 2000, vol. 3 (4), pp. 391-398.

UTF-32, IBM, retrieved from http://publib.boulder.ibm.com/infocenter/iseries/v5r3/index.jsp?topic=%2Fnls%2Frbagsutf32.htm on Aug. 28, 2013.

Van Moffaert, A., et al.< gwmw class="ginger-module-highlighter-mistake-type-3" id="gwmw-15487095623201874158750">(</gwmw>"Digital Rights Management: DRM is a key enabler for the future growth of the broadband access market and the telecom/networking market in general", Alcatel Telecommunications Review, Alcatel, Paris Cedex FR, Apr. 1, 2003, XP007005930ISSN; 8 pages.

Victor, T., et al., "Sensitivity of Eye-movement Measurements to in-vehicle Task Difficulty," Transportation Research Part F: Traffic Psychology and Behavior, 2005, pp. 167-190.

Voutsas K., et al., A Biologically Inspired Spiking Neural Network for Sound Source Lateralization Neural Networks, IEEE Transactions on vol. 18, Issue: 6 DOI: 10.11 09/TNN.2007.899623, Publication Year: 2007, pp. 1785-1799.

Wade, J.J. , et al., SWAT: A Spiking Neural Network Training Algorithm for Classification Problems, Neural Networks, IEEE Transactions on vol. 21 , Issue: 11 DOI: 10.1109/TNN.2010.2074212 Publication Year: 2010 , pp. 1817-1830.

Wang 'The time dimension for scene analysis.' Neural Networks, IEEE Transactions on 16.6 (2005): 1401-1426.

Wennekers, T., Analysis of Spatia-temporal Patterns in Associative Networks of Spiking Neurons Artificial Neural Networks, 1999. 1CANN 99. Ninth International Conference on (Conf. Publ. No. 470) vol. 1 DOI:10.1049/cp:I9991116 Publication Year: 1999, vol. 1, pp. 245-250.

Won, W.J., et al., "Implementation of Road Traffic Signs Detection based on Saliency Map Model," IEEE Intelligent Vehicles Symposium, 2008, pp. 542-547.

Wu, QingXiang, et al., Edge Detection Based on Spiking Neural Network Model, ICIC 2007, LNAI 4682, pp. 26-34, 2007, Springer-Verlag, Berlin Heidelberg.

Wu, QingXiang, et al. "Remembering Key Features of Visual Images based on Spike Timing Dependent Plasticity of Spiking Neurons." Image and Signal Processing, 2009. CISP'09. 2nd International Congress on. IEEE, 2009.

Zhang, et al., "A Flexible Content Protection System for Media-on-Demand" Multimedia Software Engineering, 2002 Proceedings. Fourth International Symposium on Dec. 11-13, 2002, Piscataway, NJ, USAA, IEEE, Dec. 11, 2002, pp. 272-277, XP010632760ISBN: 978-0-7695-1857-2.

Savolainen T., et al., "IPv6 Addressing Strategies for IoT," IEEE Sensors Journal, 2013, vol. 13 (10), pp. 3511-3519.

Spagna S., et al., "Design Principles of an Operator-owned Highly Distributed Content Delivery Network," IEEE Communications Magazine, 2013, vol. 51 (4), pp. 132-140.

* cited by examiner

APPARATUS AND METHODS FOR CONTENT MANAGEMENT AND ACCOUNT LINKING ACROSS MULTIPLE CONTENT DELIVERY NETWORKS

PRIORITY AND RELATED APPLICATIONS

This application is a continuation of and claims priority to co-owned U.S. patent application Ser. No. 15/905,704 filed on Feb. 26, 2018 of the same title, issuing as U.S. Pat. No. 10,917,694 on Feb. 9, 2021, which is a continuation of and claims priority to co-owned U.S. patent application Ser. No. 12/834,801 filed on Jul. 12, 2010 of the same title, which issued as U.S. Pat. No. 9,906,838 on Feb. 27, 2018, each of which are incorporated herein by reference in its entirety. Additionally, this application is generally related to the subject matter of co-owned, U.S. patent application Ser. No. 12/536,724 filed on Aug. 6, 2009, entitled "SYSTEM AND METHOD FOR MANAGING ENTITLEMENTS TO DATA OVER A NETWORK", and issued as U.S. Pat. No. 8,341,242 on Dec. 25, 2012, co-owned U.S. Provisional Application Ser. No. 61/256,903 filed on Oct. 30, 2009 and entitled "METHODS AND APPARATUS FOR PACKETIZED CONTENT DELIVERY OVER A CONTENT DELIVERY NETWORK", which published as U.S. Patent Application Publication No. 2011/0103374 on May 5, 2011, and to co-owned U.S. patent application Ser. No. 12/834,796 filed concurrently herewith, entitled "APPARATUS AND METHODS FOR CONTENT DELIVERY AND MESSAGE EXCHANGE ACROSS MULTIPLE CONTENT DELIVERY NETWORKS", issued as U.S. Pat. No. 9,357,247 on May 31, 2016, each of which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of content and/or data delivery over one or more networks. More particularly, the present invention is related in one exemplary aspect to apparatus and methods for linking subscriber accounts across two or more networks for the delivery of content across these networks.

2. Description of Related Technology

Recent advances in digital information processing and technology have made a whole range of services and functions available for delivery to consumers at various types devices for very reasonable prices or subscription fees. These services and functions include digital content or programming (movies, etc.), digital video-on-demand (VOD), personal video recorder (PVR) and networked PVR (nPVR), Internet Protocol television (IPTV), digital media playback and recording, as well high speed Internet access (including so-called "Internet TV", where television programming is delivered over the Internet without QoS) and IP-based telephony (e.g., VoIP). Other services available to network users include access to, and recording of, digital music (e.g., MP3 files).

Currently, many of these services are provided to the user via a wide variety of different equipment environments and delivery paradigms including, inter alia, cable or satellite modems or QAMs, HFCu (i.e., Hybrid Fiber-copper distribution via indigenous POST/PSTN and/or coaxial wiring in a premises), optical fiber such as FTTC, FTTH, etc., Wi-Fi™ hubs, Ethernet hubs, gateways, switches, and routers, to a plurality of user equipment types. For example, content may be delivered to users at set-top boxes, personal (desktop) computers, laptop computers, other mini-computers (such as so-called "netbooks", mini-notebook computers), and/or other devices. Recent advances in consumer electronics have also led to the widespread introduction of a variety of portable media devices (PMDs) such as, inter alia, portable digital music devices and other so-called "MP3 players", cellular telephones/smartphones, handheld computers, and personal digital assistants (PDA), which allow users to store and playback audio and video files. Furthermore, many users today wish to view at least some content via the Internet and their mobile device.

Although a myriad of services, equipment, data formats and providers are available, current systems offer no mechanism for a managed network operator (e.g., MSO) to partner with service providers in order to allow users who are verified as subscribers of the MSO network to obtain and utilize content from the network (such as via a subscription, pay-per-view, etc.), and to be able to view this content via the Internet or another such external network or internetwork via partnered service provider websites or similar portals.

Another mechanism for providing video content to mobile devices is the Forward Link Only (FLO), such as that offered by Qualcomm Corporation as the MediaFLO® technology (also termed "FLO TV"). MediaFLO enables live, real time audio and video streams, as well as broadcast and scheduled video and audio clips and shows to be transmitted to the user's mobile device. The data transmission path in the MediaFLO system is one-way, from the tower to the device; there is no upstream communication. Hence, the MediaFLO system is not capable of providing enhanced features such as trick mode operations (fast-forward, rewind, pause, so called "start over", etc.) and/or advanced user interaction data collection. MediaFLO is also unable to provide premium or pay content, and instead has somewhat limited content offerings. Further, the MediaFLO system does not provide on-demand capabilities, but rather only provides broadcast (or live) and scheduled video.

Hence, methods and apparatus are needed which enable a partnered service provider to, pursuant to an on-demand or other request for protected content, autonomously or non-autonomously determine if an identified prospective viewer of Internet content already subscribes or otherwise has access rights to this content through the MSO, and if so provide the content (e.g., according to one or more delivery models associated with the user's subscription or use rights). Ideally, the aforementioned methods and apparatus would enable such content delivery while affording minimal user input, such as via a single sign-on mechanism which allows the user to log in once and have his/her accounts with both the service provider and the MSO linked. Ideally, the MSO subscriber may be provided with additional types/delivery modes of content (e.g., broadcast, on-demand, pay-per-view, premium, etc.), and/or be provided with content across different delivery platforms via the Internet according to the subscriber's service plan with the MSO. Such methods and apparatus would advantageously enable a user to receive these various types of content on any device and via any delivery paradigm (and not necessarily according to a fixed schedule), thereby enhancing the user experience.

SUMMARY OF THE INVENTION

The present invention addresses the foregoing needs by disclosing apparatus and methods for content management and account linking across entities of two or more networks.

In a first aspect of the invention, a method for providing protected content via a first network to a user of a second network is disclosed. In one embodiment, the method comprises: receiving at an entity of the second network a request for the protected content, the request comprising at least information identifying a requesting user and information identifying requested content; determining, based at least in part on the information identifying the requesting user, an identity of the requesting user as an authorized user of the second network; generating a unique identifier for the authorized user; and transmitting a response to the request to an entity of the first network, the response comprising the unique identifier.

The transmission of the response may in one variant, be configured to cause the entity of the first network to deliver the protected content to the authorized user. In another variant, the unique identifier is stored at the entity of the first network and is configured to enable use in a subsequent request, the subsequent request comprising a request for second protected content different than the first content.

In a second aspect of the invention, an apparatus in a content delivery network configured to authorize access to a selected one or more services at a packet network by at least one user device is disclosed. In one embodiment, the apparatus comprises: a first interface configured to receive: information identifying the at least one user device and a request for the access to the selected one or more services; a processor comprising at least one computer program, the computer program configured to: verify the information identifying the at least one user device as being associated with at least one subscriber of the content delivery network, generate a unique identifier specific to the subscriber, and generate a response to the request for the access to the selected one or more services; and a second interface configured to transmit: the unique identifier to at least one entity of the packet network for storage thereon, and the response to the request for the access to the selected one or more services.

In a third aspect of the invention, a method for providing protected content via a first content delivery network to an authorized user of a second content delivery network is disclosed. In one embodiment, the method comprises: receiving at an entity of the first network a request for the protected content from a user device, the request comprising at least information identifying the user device and information identifying the protected content; querying a plurality of records to determine a unique identifier of the user device, the unique identifier being previously provided by the second network; transmitting the unique identifier and the information identifying the protected content to an entity of the second network; receiving in response to the transmission of the unique identifier and the information identifying the protected content, a response from the entity of the second network; and delivering the protected content to the user device based at least in part on the response.

In a fourth aspect of the invention, a method of operating a packet network is disclosed. In one embodiment, the method comprises receiving from an IP-enabled device a request for content at an entity of the packet network, the content being protected in accordance with one or more policies specified by the operator of a managed content distribution network. The request comprises information uniquely associated with a subscriber of the managed network. Information stored at the entity received from the operator is accessed, the stored information enabling the entity to determine whether the request for content should be granted. When granting the request, a communication is issued to the managed network indicating that the content is being provided, and the content is provided to the requesting IP-enabled device over the packet network, the content being at least partly encapsulated using an IP protocol.

In an fifth aspect of the invention, a business and operation "rules" engine is disclosed. In one embodiment, the engine comprises one or more computer programs adapted to control various aspects of content and message exchange between two entities so as to achieve desired business or operation goals (or obey certain rules). Business methods based on e.g., the foregoing rules and content/message exchange are also disclosed.

In a sixth aspect of the invention, a computer-readable apparatus is disclosed. In one embodiment, the apparatus comprises a storage device having at least one program stored thereon, the program, when executed, facilitates providing protected content to subscribers of a managed (e.g., MSO) network via a content source accessible to the subscriber via the Internet or another external network.

These and other aspects of the invention shall become apparent when considered in light of the disclosure provided herein.

Figure 1:
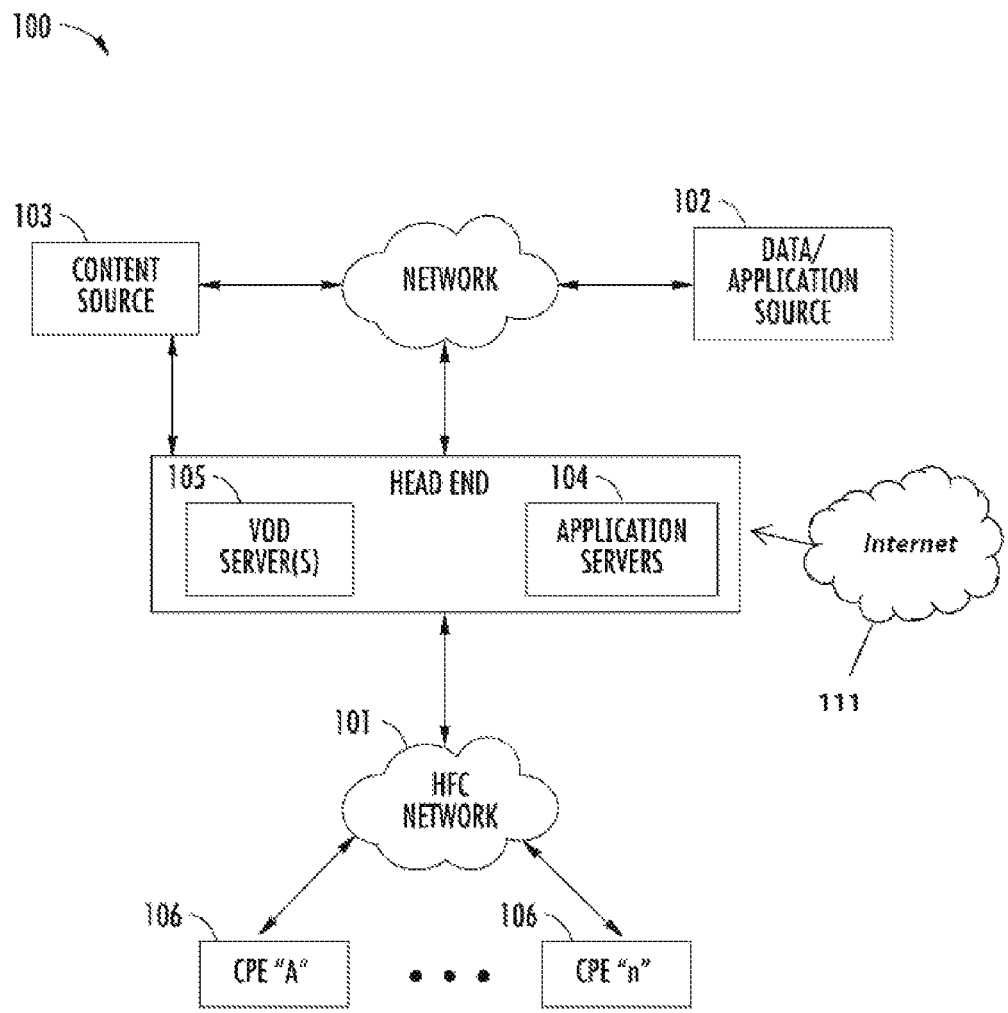
FIG. 1 is a functional block diagram illustrating an exemplary hybrid fiber network configuration useful with the present invention.

All Figures © Copyright 2010 Time Warner Cable, Inc. All rights reserved.

DETAILED DESCRIPTION OF THE INVENTION

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), and smartphones.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (Real-Video, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network.

As used herein, the term "display" means any type of device adapted to display information, including without limitation CRTs, LCDs, TFTs, plasma displays, LEDs, incandescent and fluorescent devices, or combinations/integrations thereof. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network.

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components. As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11a,b,g,n), WiMAX (802.16), PAN (e.g., 802.15), or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation, any of the variants of IEEE-Std. 802.11 or related standards including 802.11 a/b/g/n/v.

As used herein, the term "wireless" means any wireless signal, data, communication, or other interface including without limitation Wi-Fi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

The present invention discloses, inter alia, methods and apparatus for providing protected content to subscribers of a managed (e.g., MSO) network via a content source accessible to the subscriber via the Internet or another external network. In one embodiment, a user accesses a third party service provider (content source) website, and requests delivery of content (e.g., via on-demand type streaming, broadcast, high speed file download, etc.). If the particular content requested is protected content or content which is only accessible to certain types of subscribers, the service provider and/or MSO determines whether the requesting user is permitted to access the content. The process by which it is determined whether a user may access content includes (i) authenticating the user as a subscriber to the MSO, and (ii) determining whether the subscriber's service/subscription level permits viewing of the requested content (and optionally one or more use restrictions). The process is advantageously agnostic to the underlying networks involved in both the request and content delivery processes.

In one variant, the user is authenticated by requiring him/her to establish a login identity and password, and/or assigning the user a GUID. The user's MAC address or IP address may also be used in this process. This unique information is stored at an MSO entity, and when the user requests content, the user must log into the MSO; the relevant information is retrieved and compared to information that the user has provided in their login. If valid login information is entered (i.e., the information provided matches the stored information for that user GUID), then a session is created between the MSO and user.

The aforementioned authentication at the MSO may be facilitated by various entities associated with the service provider. For instance, the user may first log in to a service provider's website, such as by establishing a login identity and password which are stored at the service provider's site. Once logged in, the service provider may forward requests to view content to an appropriate MSO and provide a platform for the user to log in to the MSO site.

In another variant, the service provider and MSO accounts for a particular user may be linked or federated. In other words, a trust relationship is established between the service provider and MSO, which is used to verify subscriber information. According to this embodiment, a given user will have MSO-specific information regarding its identity (such as login information for the MSO, GUID, etc.), and/or information regarding its subscription level and other service details stored at the service provider site. Messages received from the MSO representing permission for the user to access content may also be stored at the service provider site. The service provider may later reference this information when subsequent requests for content are made by the user for content, thereby providing faster and more efficient service.

Methods for unlinking or de-federating a user's account in the service provider and MSO sites are also disclosed.

In other variants, the MSO enables the service provider to enforce security or rights management protection (e.g., DRM, encryption keys, etc.) on content authorized for delivery, such as by pre-positioning information enabling this protection (and specific to the requesting subscriber) at the service provider.

Similarly, another variant disclosed allows the service provider to pre-configure the requested content based on one or more configuration parameters associated with the requesting device (e.g., codec support, DRM support, display capabilities, etc.).

Business rules for the implementation of the aforementioned methods and for the delivery of content are also disclosed.

Detailed Description of Exemplary Embodiments

Exemplary embodiments of the apparatus and methods of the present invention are now described in detail. While these exemplary embodiments are described in the context of use with the aforementioned hybrid fiber coax (HFC) cable system, or satellite network architecture having an multiple systems operator (MSO), digital networking capability, IP delivery capability, and plurality of client devices/CPE, the general principles and advantages of the invention may be extended to other types of networks and architectures, whether broadband, narrowband, wired or wireless, or otherwise, the following therefore being merely exemplary in nature. For instance, the invention may be adapted for use on so-called hybrid fiber copper (HFCu) networks, or WiMAX (IEEE Std. 802.16) wireless networks.

It will also be appreciated that while described generally in the context of a consumer (i.e., home) end user domain, the present invention may be readily adapted to other types of environments (e.g., commercial/enterprise, government/military, etc.) as well. Myriad other applications are possible.

Also, while certain aspects are described primarily in the context of the well-known Internet Protocol (described in, inter alia, RFC 791 and 2460) and Session Initiation Protocol (SIP), it will be appreciated that the present invention may utilize other types of protocols (and in fact bearer networks to include other internets and intranets) to implement the described functionality.

Other features and advantages of the present invention will immediately be recognized by persons of ordinary skill in the art with reference to the attached drawings and detailed description of exemplary embodiments as given below.
Network—

FIG. 1 illustrates a typical content delivery network configuration with which the apparatus and methods of the present invention may be used. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. The headend is also connected through a gateway or other such interface (not shown) to unmanaged external internetworks such as the Internet 111. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the headend architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104.

Figure 1A:
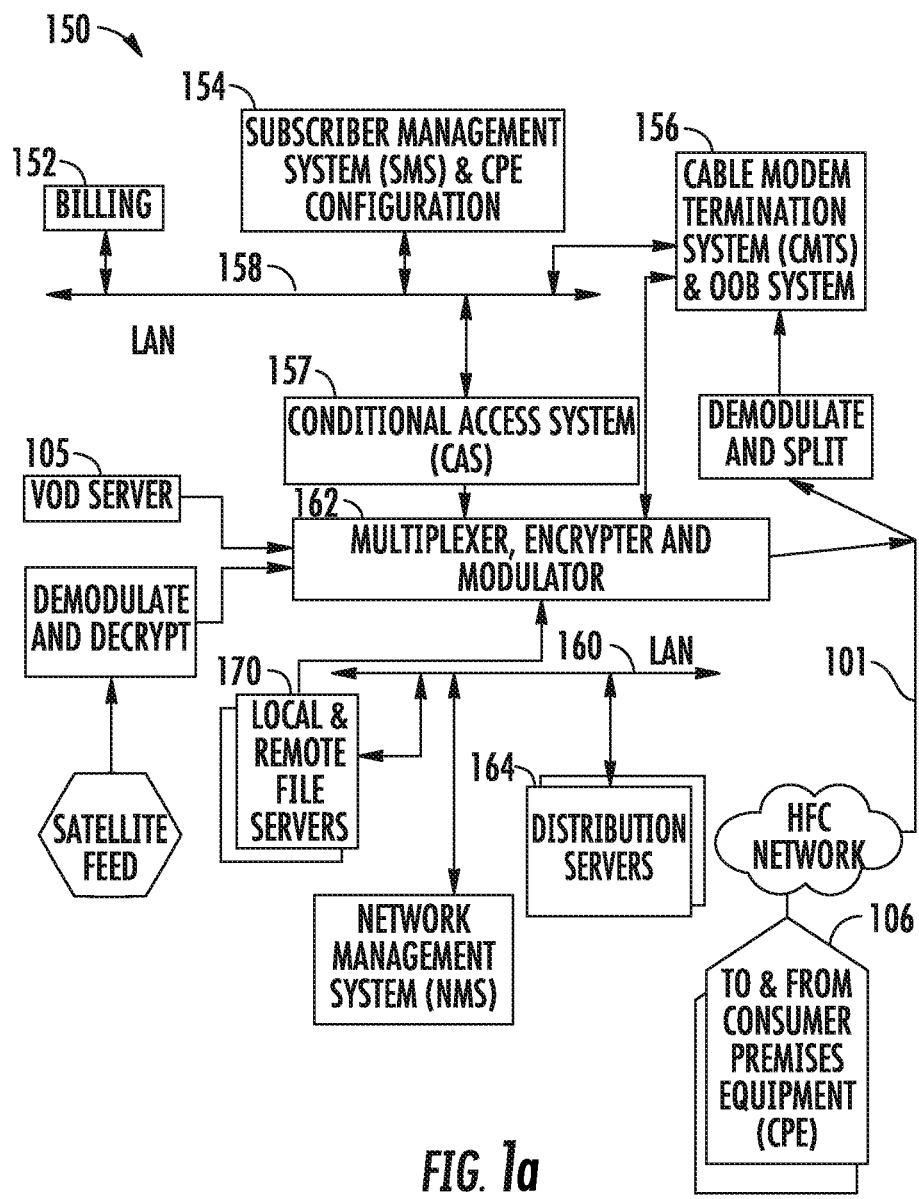
FIG. 1a is a functional block diagram illustrating one exemplary network headend configuration useful with the present invention.

Referring now to FIG. 1a, one exemplary embodiment of a headend architecture useful with the present invention is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1a is high-level, conceptual architecture and that each MSO may have multiple headends deployed using custom architectures.

The exemplary architecture 150 of FIG. 1a further includes a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend, as previously described and sent to neighborhood hubs (FIG. 1b) via a variety of interposed network components.

It will also be recognized, however, that the multiplexing operation(s) need not necessarily occur at the headend 150 (e.g., in the aforementioned MEM 162). As one alternative, a multi-location or multi-stage approach can be used, such as that described in U.S. Pat. No. 7,602,820, entitled "APPARATUS AND METHODS FOR MULTI-STAGE MULTIPLEXING IN A NETWORK" incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed-back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0 (and subsequent) specification provides for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

An optical transport ring (not shown) is also commonly utilized to distribute the dense wave-division multiplexed (DWDM) optical signals to each hub within the network in an efficient fashion.

Figure 1B:
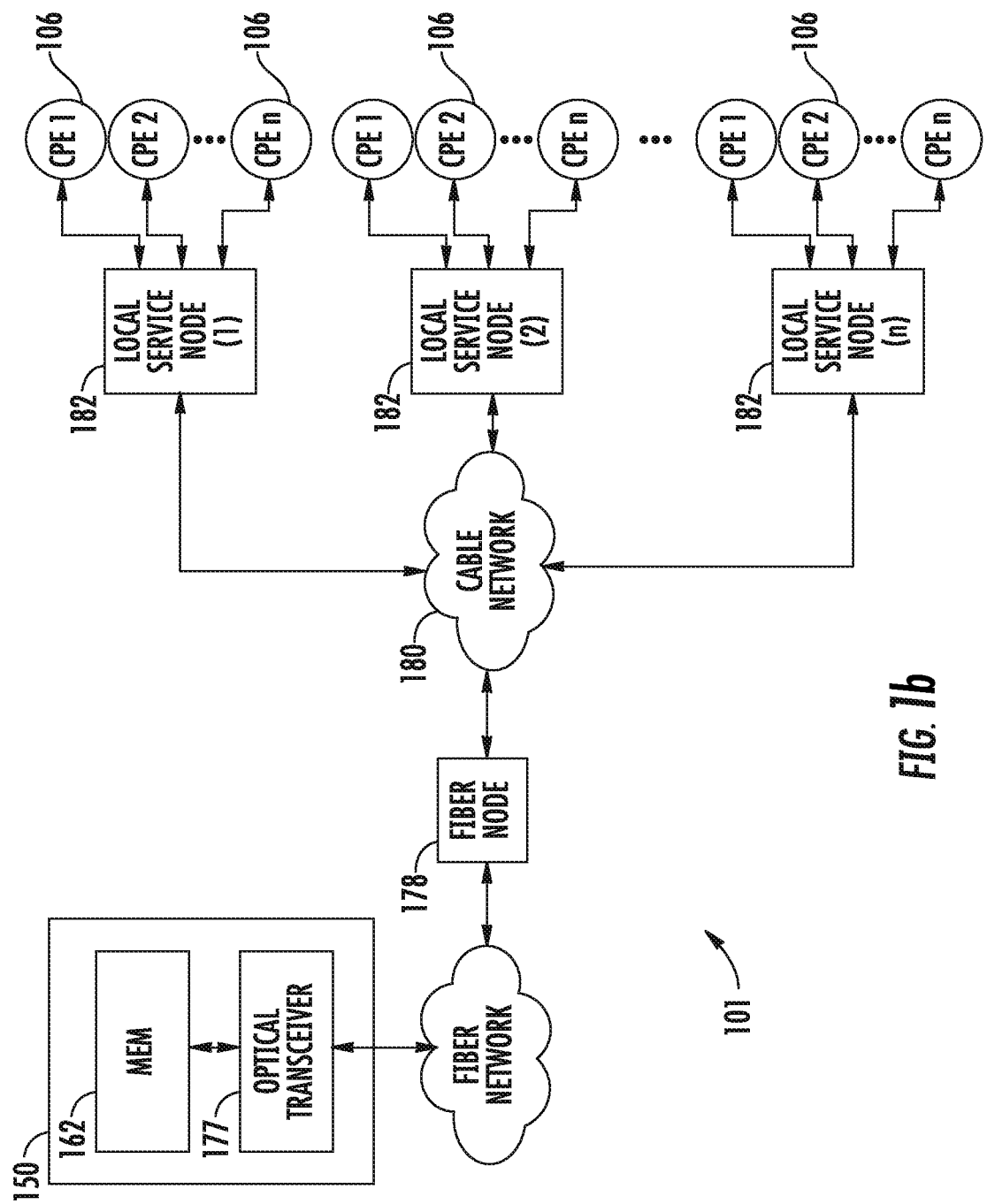
FIG. 1b is a functional block diagram illustrating one exemplary local service node configuration useful with the present invention.

In addition to on-demand and broadcast content (e.g., video programming), the system of FIGS. 1a and 1b (and 1c discussed below) also deliver Internet 111 data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels, such as via a multiplexed transport stream (MPTS). In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast. Delivery of the IP-encapsulated data may also occur over the non-DOCSIS QAMs, such as described below with respect to FIG. 1c.

The CPE 106 are each configured to monitor the particular assigned RF channel (such as via a port or socket ID/address, or other such mechanism) for IP packets intended for the subscriber premises/address that they serve.

Figure 1C:
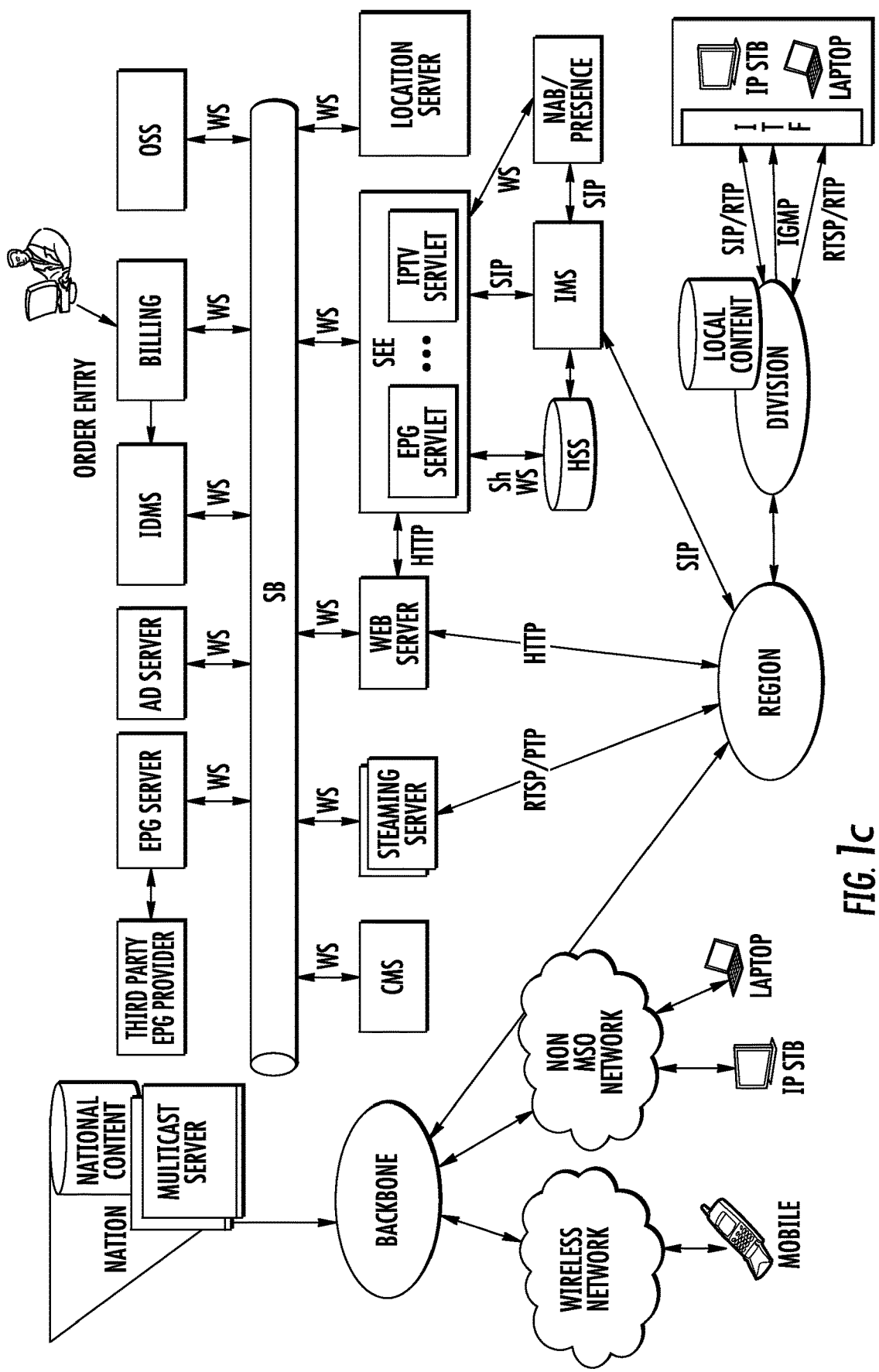
FIG. 1c is a functional block diagram illustrating one exemplary packetized content delivery network architecture useful with the present invention.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the present invention, a "packet optimized" delivery network is used for carriage of the packet content (e.g., IPTV content) when the request issues from an MSO network (see discussion of FIG. 2a below). FIG. 1c illustrates one exemplary implementation of such a network, in the context of an IMS (IP Multimedia Subsystem) network with common control plane and service delivery platform (SDP), as described in U.S. Provisional Patent Application Ser. No. 61/256,903 entitled "METHODS AND APPARATUS FOR PACKETIZED CONTENT DELIVERY OVER A CONTENT DELIVERY NETWORK", which published as U.S. Patent Application Publication No. 2011/0103374 on May 5, 2011, previously incorporated herein. Such a network provides significant enhancements in terms of common control of different services, implementation and management of content delivery sessions according to unicast or multicast models, quality-of-service (QoS) for IP-packetized content streams, etc.; however, it is appreciated that the various features of the present invention are in no way limited to any of the foregoing architectures.

Content Delivery Network Architecture—

The approach to providing access to protected content outside of an MSO network described in the present disclosure are based in the exemplary embodiment on a pre-defined set of transactions or assertions which are passed between the content provider (e.g., service provider or other third-party entity) and the managed network operator (e.g., MSO). The assertions are conducted between applications proprietary to both of the aforementioned organizations, yet externalized through a set of standards-based protocols. In one implementation of the invention, the protocols utilized include those defined by the Liberty Alliance Project, and/or by the Organization for the Advancement of Structured Information Standards (OASIS), although it will be recognized that other protocols may be used with equal success.

The Liberty Alliance, formed in 2001, created a set of open standards and guidelines for identity management with the fundamental concept of "identity federation" (or the linking of accounts within or across disparate organizations). The guidelines produced from the project, known as Liberty Alliance Identity Federation Framework (ID-FF) V1.2 specification, which is incorporated herein by reference in its entirety, define the process by which identities from trusted sources can be linked in order to reduce ongoing multiple logins, thus increasing identity assurance while reducing identity fraud. In 2003, the Liberty Alliance contributed their body of work to OASIS that was founded in 1993 under the name SGML Open. SGML Open's original charter was the creation of guidelines for interoperability among products supporting the Standard Generalized Markup Language (SGML), but in 1998 SGML Open changed its name and shifted its focus from SGML to Extensible Markup Language (XML), as it became widely adopted by the technology industry.

To date, specifications from OASIS have become the de facto standard for security and identification management between consenting business partners, which is represented through the Security Assertion Markup language (SAML) Specification (Version 2.0 released in 2005), which is incorporated herein by reference in its entirety. Early versions of SAML and the ID-FF were compatible; however, the two standards became incompatible based on component changes within SAML for greater consistency and component symmetry. Other key differences addressed in SAML v2.0 were encryption metadata and multi-endpoint support for a single protocol. Also, SAML v2.0 generalized the Liberty functionality to account for more options or use cases for expanded definition. However, it will be appreciated that the present invention is not limited to any particular standards or languages, the foregoing SAML and ID-FF being merely exemplary of the broader principles of the invention.

Figure 2:
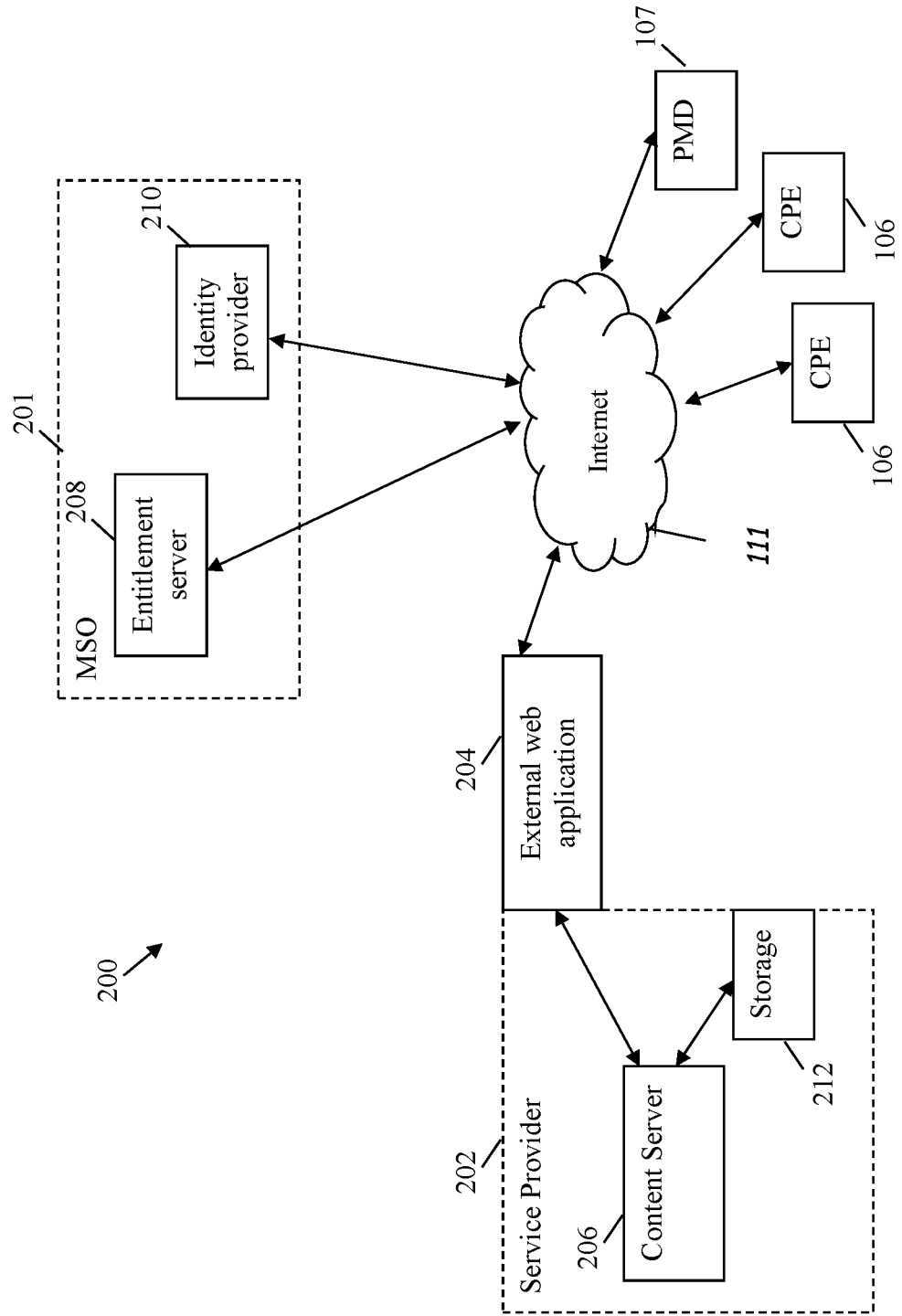
FIG. 2 is a functional block diagram illustrating a content delivery network architecture configured in accordance with one embodiment of the present invention.

Referring now to FIG. 2, a high-level block diagram of a content delivery network architecture 200 configured in accordance with one embodiment of the invention and for use in providing delivery of protected content to so-called "entitled" viewers is illustrated. As discussed herein, the network architecture 200 generally provides access to protected content outside of an MSO 201 network (e.g., via a service provider 202) to subscribers. The network 200 generally comprises one or more service providers 202, an MSO 202 and a plurality of client devices, such as CPE 106 and portable media device (PMD) 107.

The service providers 202 may for example include any broadcast provider (such as e.g., NBC, Turner Broadcasting, Viacom, etc.) which distributes content across one or more mediums, or through distribution agreements with the MSO 201. Subscribers include the individual consumers or users of video/audio/data services.

Subscribers request access to content via user devices such as e.g., consumer premises equipment (CPE) 106, personal media devices (PMD) 107, personal computers (PC), laptop computers, mobile devices, etc. The user devices may include any apparatus capable receiving audio/video/data services from the MSO 201 or service provider 202 via the Internet. Hence, two primary request/delivery models are envisaged (although others may be used as well, or combinations or variants of the foregoing): (i) request from an MSO-network device (e.g., CPE 106 such as an IP-enabled DSTB or premises gateway 113) to an Internet site (such as e.g., the external web application 204), for content to be returned back to the requesting MSO-network device (see FIG. 2a); and (ii) request from a non-MSO network device, for content to be returned back to the requesting non-MSO network device (see FIG. 2b).

An example of the former case (i) might be an IP-enabled DSTB or PC/DOCSIS cable modem registered with the MSO 201 that utilizes MSO infrastructure to access the Internet (and the third party service provider/source site), with content being streamed back to the requesting device over a comparable pathway. Here, the MSO network acts both as a "bearer" and "authorizer" network. Note that in one embodiment, although the subscriber is using (primarily) MSO infrastructure and requesting MSO protected content, the source of the content is actually a third party (e.g., web server), and hence the content is delivered in an essentially agnostic fashion (i.e., the MSO does not know that it is carrying its own content, but rather the protected content appears to be just any other third party content (and hence advantageously does not require any special routing, management, or other considerations).

An example of the latter case (ii) might be an IP-enabled mobile device (e.g., smartphone or laptop computer) which may or may not be registered with the MSO 201, and is being operated by an authorized MSO subscriber. The device may obtain access to the Internet via e.g., a service provider WLAN, cellular 3G/4G (e.g., LTE-A), WiMAX, or other such interface 250, whereby it may connect to the third party website and request content, the latter streamed to the device over a comparable return path when delivery is authorized. In this fashion, the MSO 201 network is not a bearer, but rather merely an authorizer.

Figure 2A:
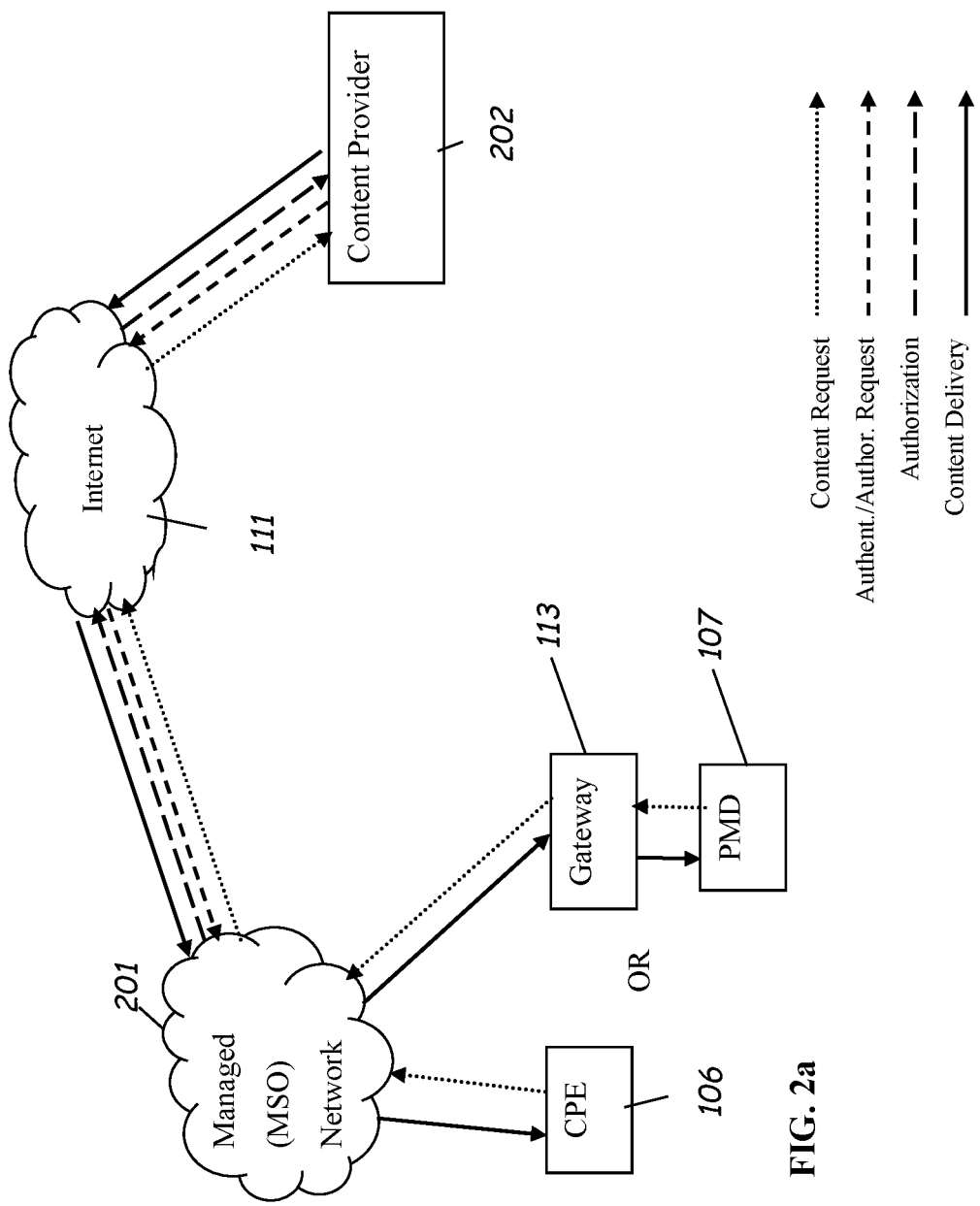
FIG. 2a is a functional block diagram illustrating a first exemplary use case of the content delivery network architecture of FIG. 2.
Figure 2B:
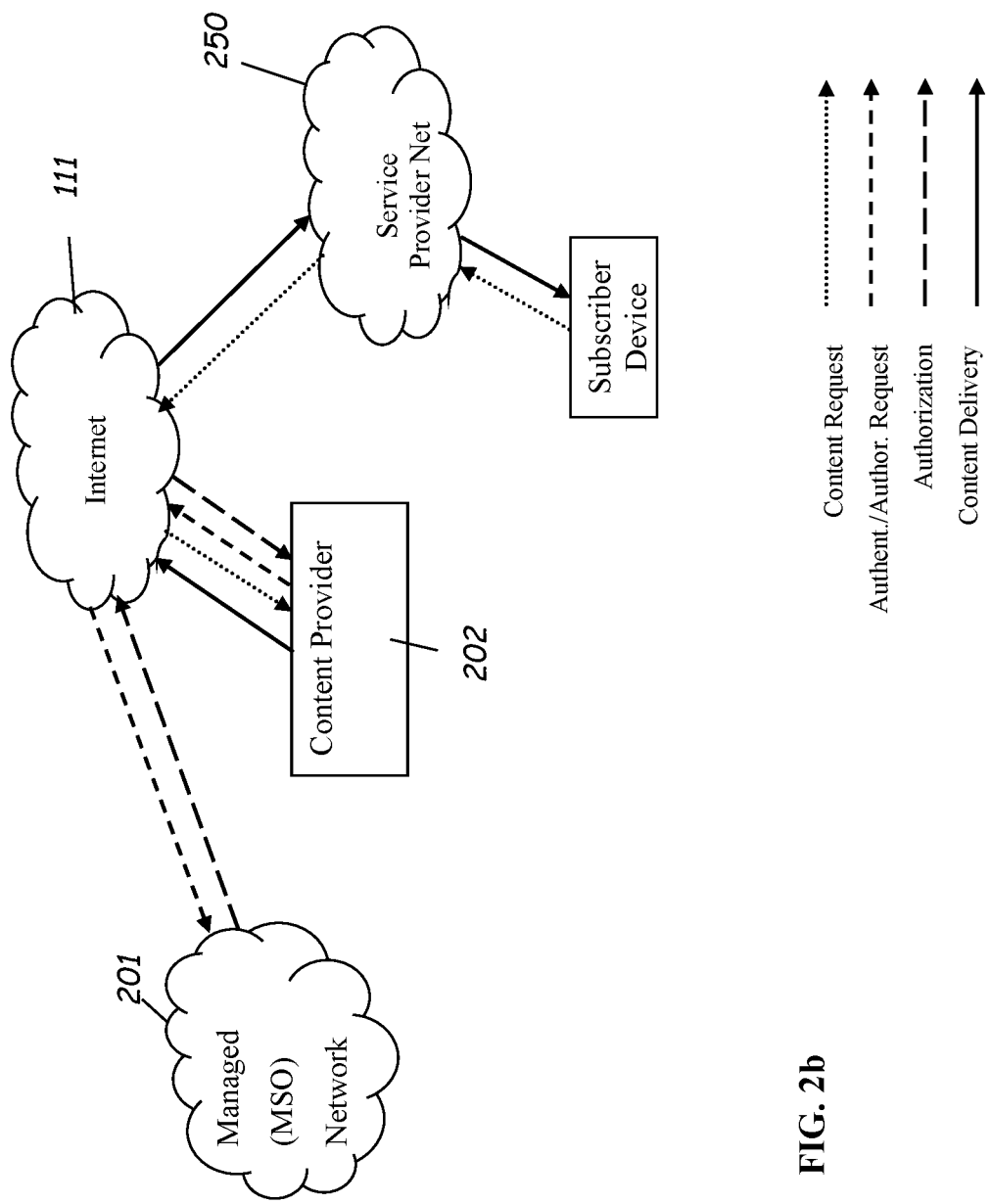
FIG. 2b is a functional block diagram illustrating a second exemplary use case of the content delivery network architecture of FIG. 2.
Figure 2C:
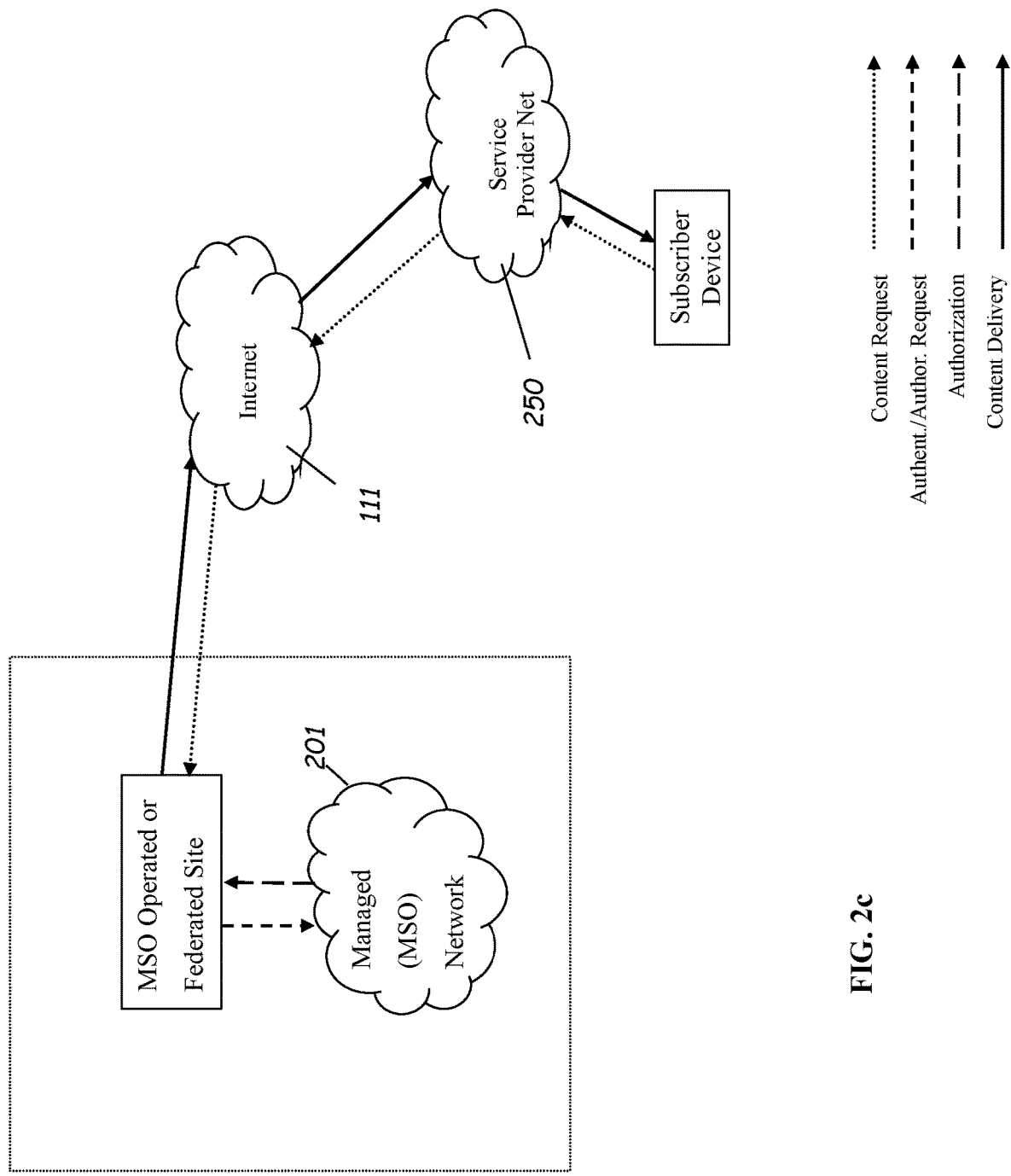
FIG. 2c is a functional block diagram illustrating a third exemplary use case of the content delivery network architecture of FIG. 2.

FIG. 2c illustrates yet another use case of the content delivery and message exchange network architecture of FIG. 2, wherein an MSO-operated (or "federated") site is used. The flow of various communications (and the protected content) under the foregoing exemplary scenarios are also illustrated in FIGS. 2a-2c, respectively. In various models, the subscriber request is received at: (i) the external web application 204 or third party server; and/or (ii) an MSO-maintained website. The subscriber (and/or device) requesting access to content is authenticated, and its authorization to receive the content is validated by an entitlement server 208 and identity provider 210; additional entities may be utilized as well. This authentication and authorization may take many forms, such as those described subsequently herein (e.g., authentication of the user and/or their device, authorization of the user to access content, etc.), as well as those discussed in previously referenced, co-owned U.S. patent application Ser. No. 12/834,796 filed concurrently herewith, entitled "APPARATUS AND METHODS FOR CONTENT DELIVERY AND MESSAGE EXCHANGE ACROSS MULTIPLE CONTENT DELIVERY NETWORKS", and issued as U.S. Pat. No. 9,357,247 on May 31, 2016. Alternatively, IEEE Std. 802.1x authentication, a RADIUS server, etc. of the type well known in the networking arts may be utilized for authentication and/or authorization.

Once the subscriber (and/or device) is authenticated and authorized, the content may be provided from the service provider content server 206 to the requesting device (e.g., CPE 106, PMD 107, etc.). The service provider may also designate a proxy to deliver the content (e.g., a fourth party with which the third party service provider has an existing relationship).

As indicated, before the protected content may be provided thereto (via the content server 206), the service provider 202 must authenticate the requesting device as being an MSO 201 subscriber and ensure the requesting subscriber is authorized to view the requested content. The authentication step (determining whether the requesting user is an MSO 201 subscriber) utilizes at least an MSO-based identity provider 210. The authorization step (determining the "entitlements" of the subscriber with respect to the requested content) utilizes at least an MSO-based entitlements server 208.

Two exemplary models by which a user's status as an MSO subscriber is authenticated are discussed herein, although other paradigms will be appreciated by those of ordinary skill given the present disclosure. The first model enables "linking" of the service provider's 202 subscriber identity to the MSO's 201 subscriber identity. This link allows the service 202 to avoid having to redirect the subscriber back to the MSO 201 for authentication once the accounts have been linked. The second method ("non-linking") is used in the event the service provider 202 does not maintain identities for its subscribers, and instead leverages only the MSO 201 identity provider 210 for authentication; i.e., if the service provider 202 does not support its own identity management system (IDMS). In one variant, the non-linked embodiment requires that the service provider 202 enforce an MSO 201 policy that authentications are session-based and cannot be persistent.

In one embodiment, the architecture 200 for providing delivery of protected content outside an MSO 201 network may include the components discussed in co-owned U.S. patent application Ser. No. 12/834,796, entitled "APPARATUS AND METHODS FOR CONTENT DELIVERY AND MESSAGE EXCHANGE ACROSS MULTIPLE CONTENT DELIVERY NETWORKS", and issued as U.S. Pat. No. 9,357,247 on May 31, 2016, which was previously incorporated herein by reference in its entirety.

As noted above, the requested/provided content may comprise traditional broadcast content as well as on-demand content. Other types of content may also be provided. For example, so called "quick clips" content (described in co-owned U.S. Pat. No. 7,174,126 issued Feb. 6, 2007 and entitled "TECHNIQUE FOR EFFECTIVELY ACCESSING PROGRAMMING LISTING INFORMATION IN AN ENTERTAINMENT DELIVERY SYSTEM" incorporated herein by reference in its entirety), so-called "start-over" content (described in co-owned U.S. Patent Publication No. 2005/0034171 entitled "TECHNIQUE FOR DELIVERING PROGRAMMING CONTENT BASED ON A MODIFIED NETWORK PERSONAL VIDEO RECORDER SERVICE" incorporated herein by reference in its entirety), so-called "lookback" content (as described in co-owned U.S. patent application Ser. No. 10/913,064 filed Aug. 6, 2004 and entitled "TECHNIQUE FOR DELIVERING PROGRAMMING CONTENT BASED ON A MODIFIED NETWORK PERSONAL VIDEO RECORDER SERVICE" incorporated herein by reference in its entirety), and/or so-called "remote DVR" content (as discussed in co-owned U.S. Pat. No. 7,457,520 issued Nov. 25, 2008 and entitled "TECHNIQUE FOR PROVIDING A VIRTUAL DIGITAL VIDEO RECORDER SERVICE THROUGH A COMMUNICATIONS NETWORK" incorporated herein by reference in its entirety) may be delivered. Still further, enhanced access to premium based content which is not available to non-subscribers, or which cannot be delivered across traditional transport may also be provided, such as e.g., behind the scenes outtakes, alternate endings, actor interviews, etc.

As will be discussed in greater detail below, the aforementioned network architecture further enables upstream communication between the user devices (CPE 106 and/or PMD 107) and service provider 202 and MSO 201. Accordingly, entities at the service provider 202 and/or MSO 201 may collect usage data from the devices (whether actively via upstream messages or signaling, or passively based on user request/trick mode or other types of behavior), as well as provide the user with trick mode capabilities with respect to the content (e.g., fast forward, rewind, pause, etc.) where applicable.

Delivery of content to the CPE 106 and/or PMD 107 occurs within the MSO network (i.e., under the paradigm of FIG. 2a) in one embodiment, as discussed in previously incorporated co-owned U.S. Provisional Application Ser.

No. 61/256,903 filed on Oct. 30, 2009 and entitled "METHODS AND APPARATUS FOR PACKETIZED CONTENT DELIVERY OVER A CONTENT DELIVERY NETWORK". As discussed therein, a substantially session-based and packetized content delivery approach (e.g., using the well-known Internet Protocol) which allows for temporal, device, and location flexibility in the delivery of the content, and transportability/migration of user sessions (i.e., allows a user to receive any content they desire, delivered at any time and at any location, and on any device they choose), as well as service/content personalization (e.g., on a per-session/user basis) and blending (integration). This approach uses a common or unified delivery architecture in providing what were heretofore heterogeneous services supplied by substantially different, and often vendor-specific, networks.

Moreover, the foregoing apparatus and methods provide for enhanced content access, reproduction, and distribution control (via e.g., a DRM-based approach and other security and content control measures), as well as quality-of-service (QoS) guarantees which maintain high media quality and user experience, especially when compared to prior art "Internet TV" paradigms. In one exemplary implementation, the network may be based on an IMS (IP Multimedia System, such as e.g., that defined in relevant 3GPP standards) which includes SIP session protocols, as well as a Service Delivery Platform (SDP).

In another implementation (FIG. 2b), the network comprises both "managed" and "unmanaged" (or off-network) services, so that a network operator can utilize both its own and external infrastructure to provide content delivery to its subscribers in various locations and use cases.

In one variant of this approach, network services are sent "over the top" of other provider's infrastructure, thereby making the service provider network substantially transparent (i.e., the protected content requests and other communications are passed over the service provider network and the Internet as if they are any other traffic). In another variant, a cooperative approach between providers is utilized, so that features or capabilities present in one service provider's network (e.g., authentication of mobile devices to an AP or RAN) can be leveraged by another provider operating in cooperation therewith.

In another embodiment, requested content may be authorized via the content and data distribution architecture 200, and provided to the CPE 106 and/or PMD 107 as described in co-owned U.S. patent application Ser. No. 11/258,229 filed on Oct. 24, 2005 and entitled "METHOD AND APPARATUS FOR ON-DEMAND CONTENT TRANSMISSION AND CONTROL OVER NETWORKS", which is incorporated herein by reference in its entirety. As discussed therein, data may be provided according to download or "on-demand" paradigms. In one embodiment, the network comprises a cable television network connected with a CSP (cellular service provider) or wireless service provider (WSP), and on-demand content delivery is accomplished via a "point-to-point" approach wherein a session is established between a content receiving entity (such as a cellular telephone) and a distributing entity (e.g., a VOD server). Session establishment and data flow control are advantageously implemented using protocols and bandwidth that are typically used for (i) providing on-demand services to subscribers within the cable network, and (ii) delivery and control of streaming multimedia to client mobile devices.

Yet other mechanisms and architectures for providing content to PMDs 107 and/or CPE 106 located in or out of a managed network may be used consistent with the invention as well, the foregoing being merely exemplary of the broader principles.

As will be discussed in greater detail below, the architecture 200 utilizes information obtained from or stored at an MSO-maintained authorization server (not shown) to determine whether a requesting user device is authorized to receive the content. In one embodiment, the provision of content and use thereof are effectively controlled by the supplying web or service provider content server 206 (or any intermediary MSO-operated infrastructure). For example, once a user is authorized to receive content, the server 206 serves the content to the user device over the prescribed delivery path/model.

In another embodiment, various restrictions to the provision of content to a user at a display device associated with the user device are determined by the device (e.g., CPE 106, PMD 107, etc.) itself, as discussed in co-owned U.S. patent application Ser. No. 12/716,131 filed on Mar. 2, 2010, entitled "APPARATUS AND METHODS FOR RIGHTS-MANAGED CONTENT AND DATA DELIVERY", and issued as U.S. Pat. No. 9,342,661, which is incorporated herein by reference in its entirety. As discussed therein, a downloadable or transferrable rights profile coupled with a "smart" media player application are given. The rights profile contains information regarding the specific rights of a device and/or a subscriber to access content. It is via the rights profile that the device (via the media player and its associated rights management application) determines whether to provide content to a subscriber.

In one implementation of the architecture of FIGS. 2a-2c, one or more entities useful in delivery of content to the CPE 106 or PMD 107 may be adapted to utilize information regarding the CPE 106 or PMD 107 capabilities (e.g., such as in the event a capabilities profile is received from these devices) to perform de-encapsulation/re-encapsulation of content where necessary, as is disclosed in co-owned U.S. patent application Ser. No. 12/582,619 filed on Oct. 20, 2009, entitled "GATEWAY APPARATUS AND METHODS FOR DIGITAL CONTENT DELIVERY IN A NETWORK", and issued as U.S. Pat. No. 9,027,062 on May 5, 2015, which is incorporated herein by reference in its entirety. As discussed therein, one or more entities of the service provider 202 or MSO 201 (or located elsewhere) may be configured to process content including de-encapsulating the content from a first media file container format and subsequently re-encapsulating the content to a second media file container format which is known to be compatible with the requesting device. For example, content which is delivered from a host server or other content source may be encapsulated in e.g., MP4, if the receiving CPE 106 is not capable of reading the MP4 files, the content server (or other entity) may re-encapsulate the content to e.g., MPEG-2 or to another format that the receiving CPE 106 is capable of reading.

In another exemplary embodiment, the receiving device may comprise a converged premises device (CPD) and/or a media bridge. The CPD may for example be of the type described in co-owned U.S. patent application Ser. No. 11/378,129 filed Mar. 16, 2006, entitled "METHODS AND APPARATUS FOR CENTRALIZED CONTENT AND DATA DELIVERY", and issued as U.S. Pat. No. 8,347,341 on Jan. 1, 2013, incorporated herein by reference in its entirety. As discussed therein, the CPD comprises a WLAN (e.g., Wi-Fi) and/or PAN (e.g., Bluetooth or 802.15) wireless interface. Packetized (e.g., IP) traffic may be exchanged between the CPD and a PMD 107 via, e.g. the WLAN/PAN interface. Hence, in one embodiment, the PMD 107 may request content from the CPD.

In yet another embodiment, the user device may comprise a media bridge, which may, for example, be of the type disclosed in co-owned U.S. patent application Ser. No. 12/480,597 filed Jun. 8, 2009, entitled "MEDIA BRIDGE APPARATUS AND METHODS", and issued as U.S. Pat. No. 9,602,864 on Mar. 21, 2017, incorporated herein by reference in its entirety. As discussed therein, the media bridging apparatus acts as a connection between a PMD 107 (which may include e.g., an iPod, handheld computer, smartphone, PDA, etc.) and a user's home network. This bridging apparatus may be used, for example, to convert content stored on the PMD 107 to a format capable of being presented on a user's set-top box or other client device. The bridging apparatus may also be utilized for transmitting content to the PMD 107 (such as by converting the content to a format capable of being stored/presented on the PMD 107) provided the user of the PMD 107 is authorized to receive the content.

As noted above, in one embodiment, the MSO 201 may utilize the components discussed in co-owned U.S. patent application Ser. No. 12/834,796, entitled "APPARATUS AND METHODS FOR CONTENT DELIVERY AND MESSAGE EXCHANGE ACROSS MULTIPLE CONTENT DELIVERY NETWORKS", and issued as U.S. Pat. No. 9,357,247 on May 31, 2016, including e.g., a technology services group (TSG) authorization infrastructure and an advance technology group (ATG) authentication infrastructure. As discussed therein, the authorization infrastructure and authentication infrastructure may comprise at least an MSO-based common login application (CLA), a service oriented architecture (SOA), an enterprise identity system (EIS) and an identity provider. The aforementioned infrastructures communicate with one or more service providers 202 prior to enabling delivery therefrom of requested content to a subscriber.

As shown in FIG. 2, the service provider 202 may further comprise a storage entity 212. In the event account federation is utilized, the storage entity 212 may be used to store records relating to the subscribers and/or the client devices. For example, the storage entity 212 may store a user-specific global unique identifier (GUID) or other information which may be used to recognize the subscriber within the service provider 202 network and/or within the appropriate MSO 201.

Communication between the various entities of the network may, in one embodiment, utilize the entitlements description language set forth in the previously referenced co-owned U.S. patent application Ser. No. 12/834,796, entitled "APPARATUS AND METHODS FOR CONTENT DELIVERY AND MESSAGE EXCHANGE ACROSS MULTIPLE CONTENT DELIVERY NETWORKS", and issued as U.S. Pat. No. 9,357,247 on May 31, 2016.

Authentication without Linked Accounts—

Figure 3:
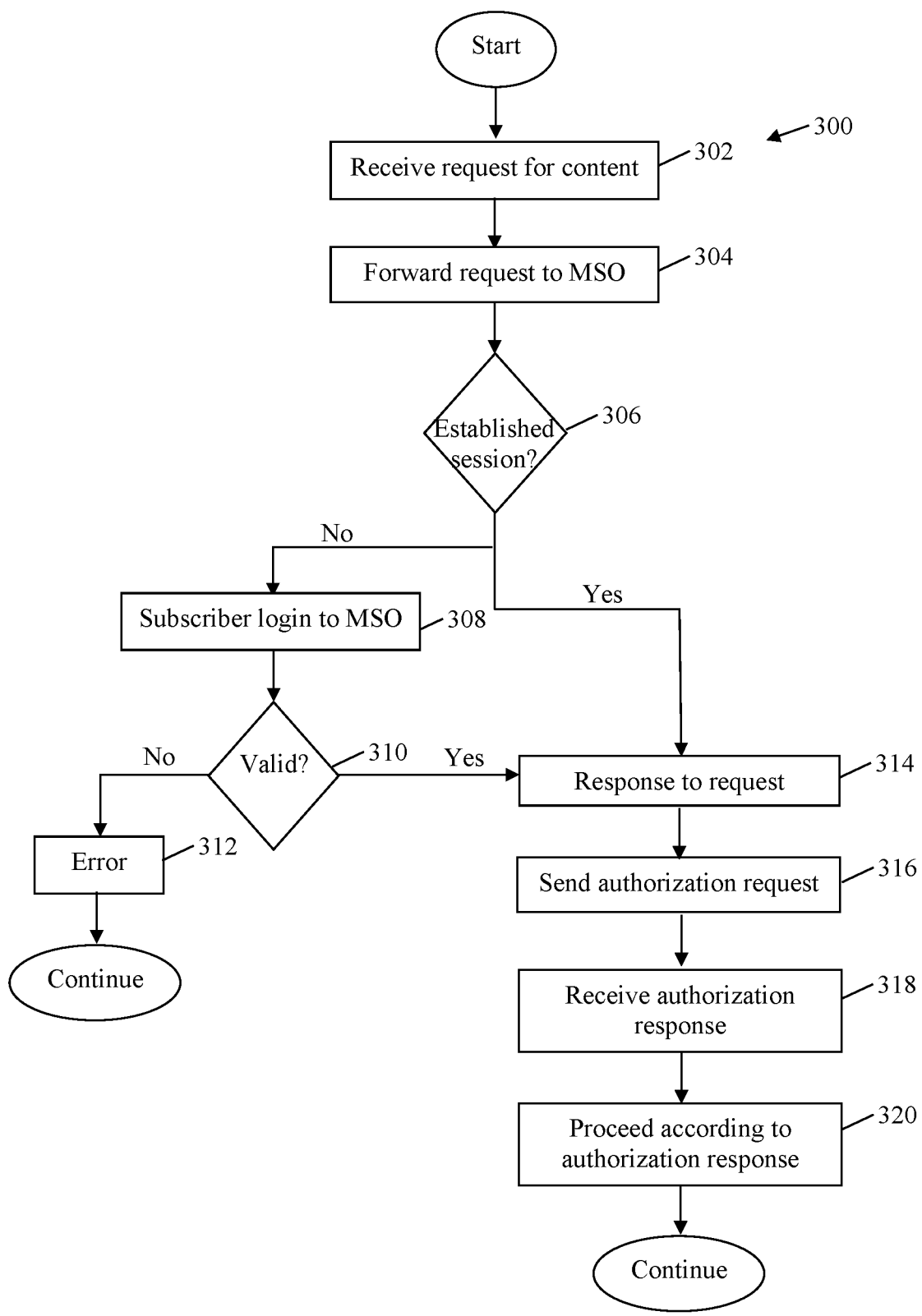
FIG. 3 is a logical flow diagram illustrating an exemplary method for providing content delivery across one or more content delivery networks according to the present invention.

Referring now to FIG. 3, an exemplary method for authenticating a user without utilizing account linking or federation is illustrated. As indicated above, the method of FIG. 3 is useful in the instance the service provider 202 does not support any form of identity management (e.g., have an IDMS) and simply relies on the MSO 201 to handle the login process for access to protected content.

Per step 302 of the method, a request for access to protected content is received from the subscriber at the external node (e.g., web application 204).

When the request is received, the service provider 202 forwards the request to the MSO-based identity provider 210. In one embodiment, the service provider 202 may format the request to comprise an Extensible Hypertext Markup Language (XHTML) form which comprises a Hypertext Transfer Protocol (HTTP) POST message that POSTs to the identity provider server 210 containing the following elements:

SAMLRequest—containing a value of AuthnRequest
    RelayState—optional
        © Copyright 2010 Time Warner Cable, Inc. All rights reserved.

In one embodiment, the service provider 202 and identity provider 210 use HTTP POST binding. An exemplary identity provider 210 POST URL may be as follows:

https://ids.rr.com/nidp/saml2/sso

At step 306, the identity provider 210 determines whether a login session has been created. If the session exists, the content is provided to the user. In other words, as will be discussed in greater detail below, if the subscriber has already logged onto the MSO login page (and/or the user GUID has been stored at the service provider 202), the MSO will immediately be made aware of the user's credentials, and that the user is authorized to receive the content. If no login session has been created, there is no security context for the subscriber, and the subscriber is redirected to the MSO login page (step 308). At the login page, the subscriber logs-in using for example, a user identifier and password combination or other means for validating the subscriber's digital identity. Methods and apparatus for creating a digital identity are discussed in previously incorporated co-owned U.S. patent application Ser. No. 12/834,796 entitled "APPARATUS AND METHODS FOR CONTENT DELIVERY AND MESSAGE EXCHANGE ACROSS MULTIPLE CONTENT DELIVERY NETWORKS", and issued as U.S. Pat. No. 9,357,247 on May 31, 2016.

Per step 310, the login credentials are validated. If the entered credentials are not valid (e.g., do not match stored information for the subscriber, and/or no stored information for the subscriber can be found), an error message is presented to the subscriber (step 312). If the credentials are valid, the identity provider 210 returns a response to the request at step 314.

In one embodiment, an XHTML form is returned to a browser which returns the following to the external service provider 202:

SAMLRepsonse—contains a value of Response type
    RelayState—if provided in the initial request
        © Copyright 2010 Time Warner Cable, Inc. All rights reserved.

Since the service provider 202 in the embodiment of FIG. 3 does not maintain an IDMS, the subscriber must log into the MSO 201 (via the identity provider 210) for every new web session.

Next, per step 316, in response to receiving the response, the service provider 202 sends an authorization request to the MSO-based entitlement server 208. In one embodiment, the entitlements server 208 may be of the type discussed in previously incorporated U.S. patent application Ser. No. 12/536,724 filed on Aug. 6, 2009, entitled "SYSTEM AND METHOD FOR MANAGING ENTITLEMENTS TO DATA OVER A NETWORK", and issued as U.S. Pat. No. 8,341,242 on Dec. 25, 2012. In an alternative embodiment, the entitlements server 208 may correspond in functionality to the SOA and other entities of the authorization infrastructure discussed in previously referenced U.S. patent application Ser. No. 12/834,796 entitled "APPARATUS AND METHODS FOR CONTENT DELIVERY AND MES- SAGE EXCHANGE ACROSS MULTIPLE CONTENT DELIVERY NETWORKS", and issued as U.S. Pat. No. 9,357,247 on May 31, 2016.

At step 318, a response to the authorization request is received. The response reflects whether the service details for the particular subscriber permit the subscriber to access the requested content. For example, if it is determined (at the entitlements server 208) that a subscriber is a so-called "basic" subscriber, and the request is for content which is classified as "premium" content, then the service details for the subscriber do not permit the subscriber to access the content. When this occurs, the response to the authorization request will indicate a denial of service. The "deny" message indicates that the subscriber was found not to have rights to the resource (i.e., active account but not active service). Alternatively, another type of message may be generated, such as one that instructs the subscriber how to upgrade to be able to obtain the content, or provide a one-time payment to access the content, etc.

If the service details match the requirements for the requested content, a "permit" message is transmitted to the service provider 202 at step 318. For example, if the service details indicate that the subscriber is currently purchasing a premium level of service, and the requested content is within the premium package, the subscriber will be permitted access to the content. The "permit" message indicates that the subscriber was found to have rights to the resource (i.e., active account and active service).

In another variant, a rights "profile" or other data structure may be sent along with (e.g., as part of) or pursuant to the "permit" message, so as to inform the service provider of any access or use restrictions (e.g., limited number of views, allowable viewing window, restriction on trick mode or start over functions, limitations on copying/distribution, etc.). These rights/restrictions can be used by the service provider to configure the requested content for delivery, such as by embedding DRM data or watermarking in the content before delivery, encrypting it, etc.

Lastly, at step 320, the service provider 202 may proceed according to the authorization response. For example, if service is denied, the service provider 202 provides a pre-defined message to the subscriber indicating the reason and/or instructions or a link for online help to aid in resolving the denial. If service is permitted, the protected content may be delivered to the subscriber (consistent with any use restrictions or policies).

Figure 4:
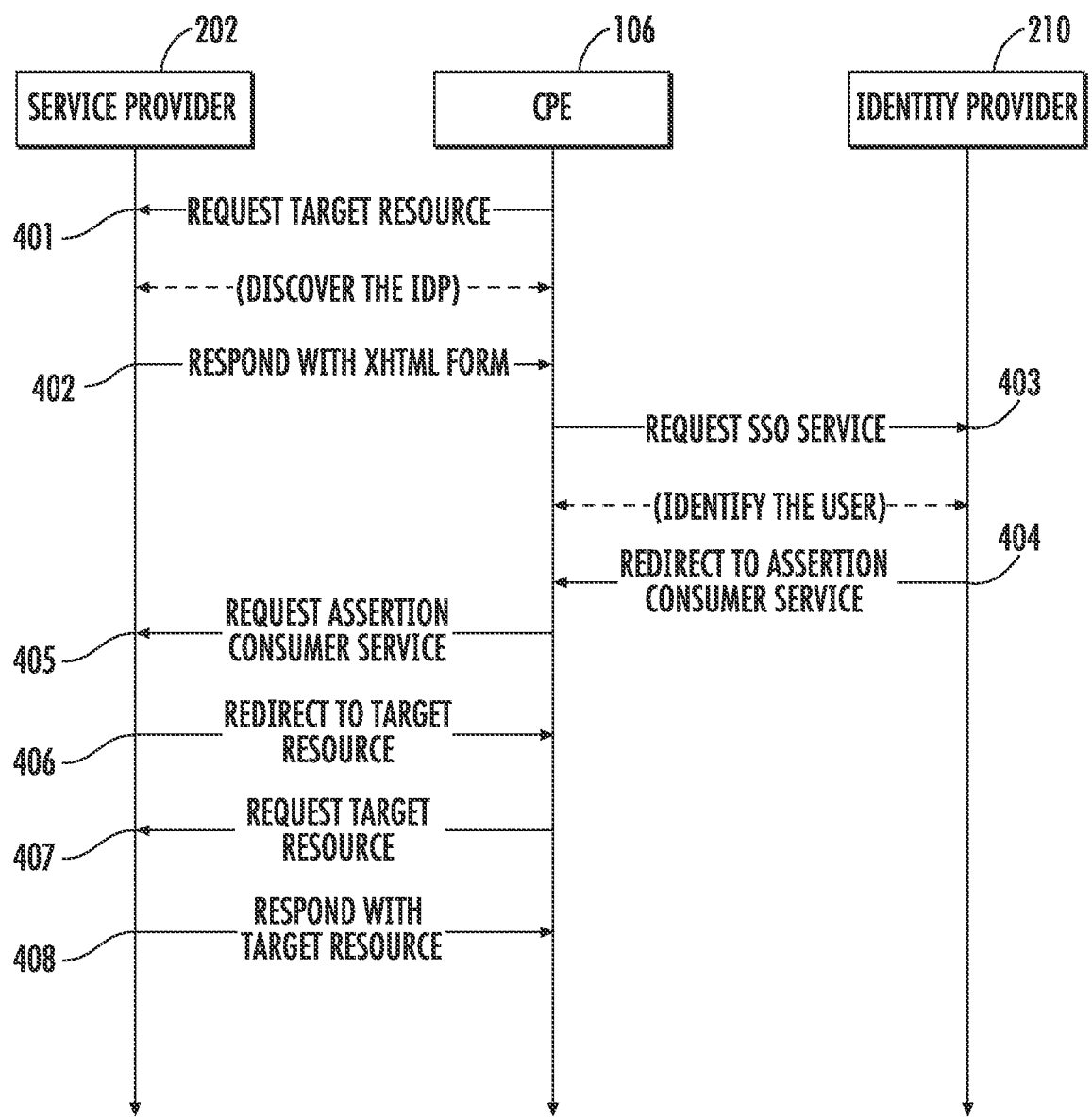
FIG. 4 is a diagram illustrating an exemplary communication flow for providing content delivery across one or more content delivery networks according to the present invention.

FIG. 4 illustrates an exemplary communication flow (ladder diagram) for providing content delivery across one or more content delivery networks in the instance account linking is not used, according to one embodiment of the invention. As illustrated, the CPE 106 (or PMD 107 or other client device) requests a target resource from the service provider 202 (step 401). The request may, for example, be as follows:

http://sp.example.com/myresource

At this point, the service provider 202 performs a security check on behalf of the target resource. If a valid security context at the service provider already exists, the requested resource may be provided. However, if a valid security context is not yet established, the service provider 202 responds to the CPE 106 request (402). In one embodiment, the response comprises an XHTML form. For example, the following may be provided:

```
<form method="post" action="https://idp.example.org/SAML2/SSO/POST"
...>
    <input type="hidden" name="SAMLRequest" value="request" />
    <input type="hidden" name="RelayState" value="token" />
    ...
    <input type="submit" value="Submit" />
</form>
```
© Copyright 2010 Time Warner Cable, Inc. All rights reserved.

In one embodiment, the RelayState token is an opaque (e.g., obfuscated) reference to state information maintained at the service provider 202. In a further embodiment, the value of the SAMLRequest parameter is a base64 encoding of the following <sampl:AuthnRequest> element:

```
<samlp:AuthnRequest
    xmlns:samlp="urn:oasis:names:tc:SAML:2.0:protocol"
    xmlns:saml="urn:oasis:names:tc:SAML:2.0:assertion"
    ID="identifier_1"
    Version="2.0"
    IssueInstant="2004-12-05T09:21:59Z"
    AssertionConsumerServiceIndex="0">
    <saml:Issuer>https://sp.example.com/SAML2</saml:Issuer>
    <samlp:NameIDPolicy
        AllowCreate="true"
        Format="urn:oasis:names:tc:SAML:2.0:nameid-format:transient"/>
    <samlp:RequestedAuthnContext comparison="exact">
saml:AuthnContextDeclRef>secure/SPfederatedlogin/user/password/uri</
saml:AuthnContextDeclRef>
    </samlp:RequestedAuthnContext>
</samlp:AuthnRequest>
```
© Copyright 2010 Time Warner Cable, Inc. All rights reserved.

Before the <samlp:AuthnRequest> element is URL-encoded and inserted into the XHTML form, it may first be deflated and base64-encoded (in that order).

When the CPE 106 receives the response, it requests to sign on to the network of the identity provider 210 (i.e., the MSO network) at step 403. In one embodiment, the sign on comprises a so-called "single sign-on (SSO)" service, wherein the subscribers need only to sign or log in once in order to obtain access to protected content. The subscriber's single sign on may be restricted to a prescribed period of time (e.g., 24 hours, etc.). For example, the user may issue a POST request to the SSO service at the identity provider 210 as follows:

```
POST/SAML2/SSO/POST HTTP/1.1
Host: ids.rr.com
Content-Type: application/x-www-form-urlencoded
Content-Length:nnn
SAMLRequest=request&RelayState=token
```
© Copyright 2010 Time Warner Cable, Inc. All rights reserved.

In one embodiment, the values of the SAMLRequest and RelayState parameters are taken from the XHTML form (discussed above). The identity provider 210 processes the <samlp:AuthnRequest> element (by URLdecoding, base64-decoding and inflating the request, in that order) and performs a security check. If the user does not have a valid security context, the identity provider identifies the user (discussed elsewhere herein).

Information is transmitted between the CPE 106 and the identity provider 210 to validly identify and authenticate the user. A separate step for authorizing the user may also be utilized. The identity provider validates the request and responds with a document containing an XHTML form which may, in one embodiment, be similar to the following:

```
<form method="POST" enctype=
"application/x-www-form-urlencoded"
action="https://sp.example.com/nidp/saml2/
spassertion_consumer">
...>
    <input type="hidden" name=
    "SAMLResponse" value="response" />
    <input type="hidden" name=
    "RelayState" value="token" />
...
    <input type="submit" value="Submit" />
</form>
        © Copyright 2010 Time Warner Cable, Inc. All rights reserved.
```

In one embodiment, the value of the RelayState parameter is the same as noted above, and the value of the SAMLResponse parameter is the base64 encoding of the following <samlp:Response> element, and within the Response is the <saml:AttributeStatement> containing the value of the customer GUID, as follows:

```
<samlp:Response xmlns:samlp=
"urn:oasis:names:tc:SAML:2.0:protocol"
xmlns:saml="urn:oasis:names:tc:SAML:2.0:assertion"
Destination="https://sp.example.com/nidp/saml2/spassertion_consumer"
```

Next, the identity provider 210 redirects the CPE 106 to the assertion consumer service (step 404). The assertion consumer service is in the exemplary embodiment an application process which validates SAML responses. The identity provider sends a document to the service provider that indicates whether the CPE is or is not authenticated, along with other information about the CPE. The assertion consumer service is a sub-process of the service provider which receives documents (assertions), validates the digital signatures therein, decrypting, and consuming data contained in the document. The CPE may then be passed on to the service provider application. The assertion consumer service responds to the identity service provider from the service provider. The CPE 106 may then request assertions from the service provider 202 (step 405). For example, a user agent running on the CPE 106 (or PMD 107 or client) may issue a POST request to the assertion consumer service at the service provider 202 as follows:

```
POST /SAML2/SSO HTTP/1.1
Host: sp.example.com
Content-Type: application/x-www-form-urlencoded
Content-Length:nnn
SAMLResponse=response&RelayState=token
        © Copyright 2010 Time Warner Cable, Inc. All rights reserved.
```

The values of the SAMLResponse and RelayState parameters in the above example may be taken from the XHTML form discussed above.

The assertion consumer service processes the response, creates a security context at the service provider 202, and redirects the CPE 106 to the target resource at step 406. The CPE 106 then requests the target resource at the service provider 202 (again) at step 407. In one embodiment, the request is as follows:

https://sp.example.com/myresource

Since a security context exists, the service provider 202 returns the requested resource to the CPE 106 (step 408).

Authentication with Linked Accounts—

In one embodiment, a single subscriber may be authenticated only once (e.g., the aforementioned "single sign-on SSO"), the process creating a link between the MSO 201 information for the subscriber and the service provider 202 information for the same subscriber (i.e., federating the accounts). According to this embodiment, the subscriber will not have to be authenticated each time they attempt to view content, but rather they are authenticated only once. The model may utilize, for example, SAML 2.0 for the authentication.

When a customer attempts to access secure content from the external web application 204, the service provider 202 makes a request to the identity provider 210 to determine whether the user has an authentication session. If needed the service provider 202 requires login and check for an association to an MSO 201, and may further check the entitlement levels (such as according to the methods discussed in co-owned U.S. patent application Ser. No. 12/536,724 entitled "SYSTEM AND METHOD FOR MANAGING ENTITLEMENTS TO DATA OVER A NETWORK", and issued as U.S. Pat. No. 8,341,242 on Dec. 25, 2012, previously incorporated herein. If no association is present, then the service provider 202 requests that the user "links" the user's service provider 202 identity with the user's MSO 201 identity. The response from the MSO identity provider 210 contains the customer's (subscriber's) identification (GUID) and a pseudonym for linking the identities. The service provider 202 stores the pseudonym along with the GUID for this customer in a persistent profile maintained thereon, rather than in a cookie on the subscriber's browser. The service provider 202 then makes a request to the entitlement server 208 to obtain the entitlements for the subscriber using the GUID.

Figure 5:
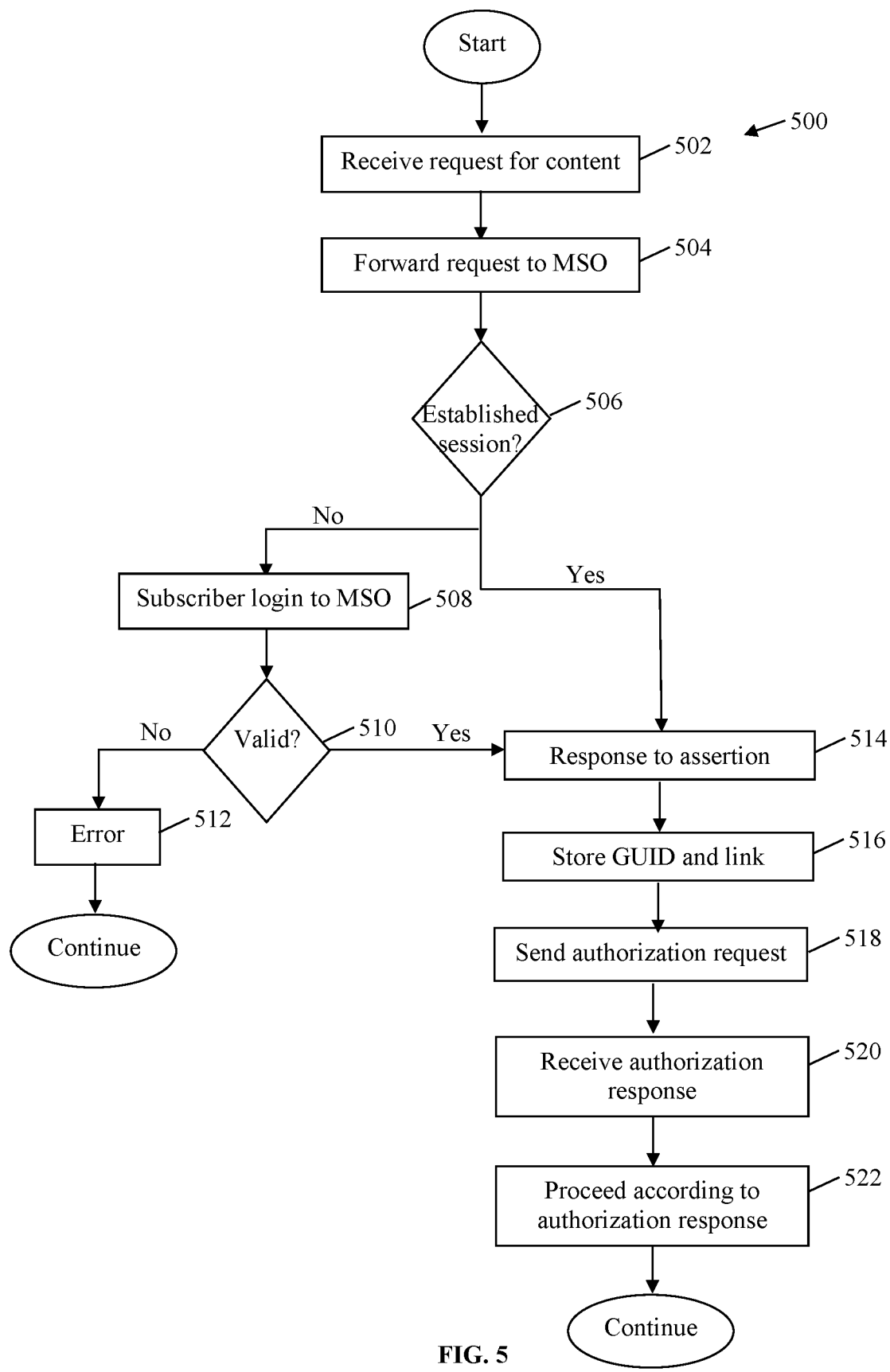
FIG. 5 is a logical flow diagram illustrating an exemplary method for linking subscriber accounts across one or more content delivery networks according to the present invention.

To accomplish the aforementioned account federation, the service provider 202 must employ at least a basic mechanism for identity management (such as e.g., an IDMS). An exemplary method for the delivery of protected content to a user via a service provider 202 which utilizes federation is illustrated in FIG. 5.

As shown, per step 502, the customer (via his/her CPE 106 or PMD 107) requests secure resources from the external web application 204. In one embodiment, the customer must first log into the service provider 202 in order to request access to the protected content (not shown). The type of login (e.g., password and user ID combination, challenge question, user-specific graphic or icon, etc.), the information required at login, and the creation of a login identity for the service provider 202 are each controlled by the service provider 202 itself. For example, the service provider 202 may require the subscriber to identify him/herself by e.g., providing an email address and password combination, whereas the MSO login (information) may be unique and completely unrelated.

At step 504, the service provider 202 responds with an XHTML form that POSTs to the identity provider 210. In one embodiment, the message contains the following fields:

SAMLRequest containing a NameIDPolicy type of persistent

RequestedAuthnContext for the URI used to identify this service provider

RelayState (optional)

© Copyright 2010 Time Warner Cable, Inc. All rights reserved.

In one embodiment the service provider 202 and identity provider 210, in the deployment of the SAML 2.0 Web Browser SSO profile both utilize the HTTP POST binding. An exemplary identity provider 210 POST URL may be as follows:

IDP POST URL: https://ids.rr.com/nidp/saml2/sso

If it is determined that a session already exists (not shown), the content may be provided to the user. The session would already exist, in one embodiment, if the subscriber has already logged onto the MSO login page, and/or if the subscriber GUID has already been stored at the service provider 202 (and was provided with the request). In these situations, as discussed elsewhere herein, the MSO will automatically be made aware of the user's credentials and that the user is authorized to receive the content.

If, at step 506, the identity provider 210 determines that no security context is in scope (i.e., no session has been established), the user is routed to a login page associated with the MSO 201 (step 508). At the login page, the user enters his/her credentials and their validity is determined (step 510). If the credentials entered are not valid, an error message will be displayed to the user (step 512). Alternatively, if the user as not yet established login credentials with the MSO 201, the user may be provided with an opportunity to do so (e.g., to generate a digital signature) as discussed in previously incorporated U.S. patent application Ser. No. 12/834,796 entitled "APPARATUS AND METHODS FOR CONTENT DELIVERY AND MESSAGE EXCHANGE ACROSS MULTIPLE CONTENT DELIVERY NETWORKS", and issued as U.S. Pat. No. 9,357,247 on May 31, 2016.

Although separate logins are required under this embodiment for the service provider 202 and the MSO 201, it will be appreciated that the user may use the same or similar information to log into both sites. For example, both the service provider 202 and the MSO 201 may permit the user to use an email address as a username. Accordingly, a single subscriber may use the same username (email address) to log into both sites.

Upon verification of the credentials (step 510), the identity provider 210 returns a response. In one embodiment, the identity provider response comprises an XHTML form sent to the browser containing:

SAMLResponse containing a pseudonym and GUID

RelayState (if provided in the initial request discussed above)

© Copyright 2010 Time Warner Cable, Inc. All rights reserved.

Next, the browser sends the request to an assertion consumer service at the service provider 202 (as discussed above), the service provider 202 requests user credentials (if necessary) and stores the GUID and pseudonym of the linked account (step 516). A renewed request is then sent to original target resource. An authorization (and/or entitlement) request is then made by the service provider 202 (step 518), and a response is received (step 520).

Lastly, at step 522, the resource is provided to the user.

Figure 6:
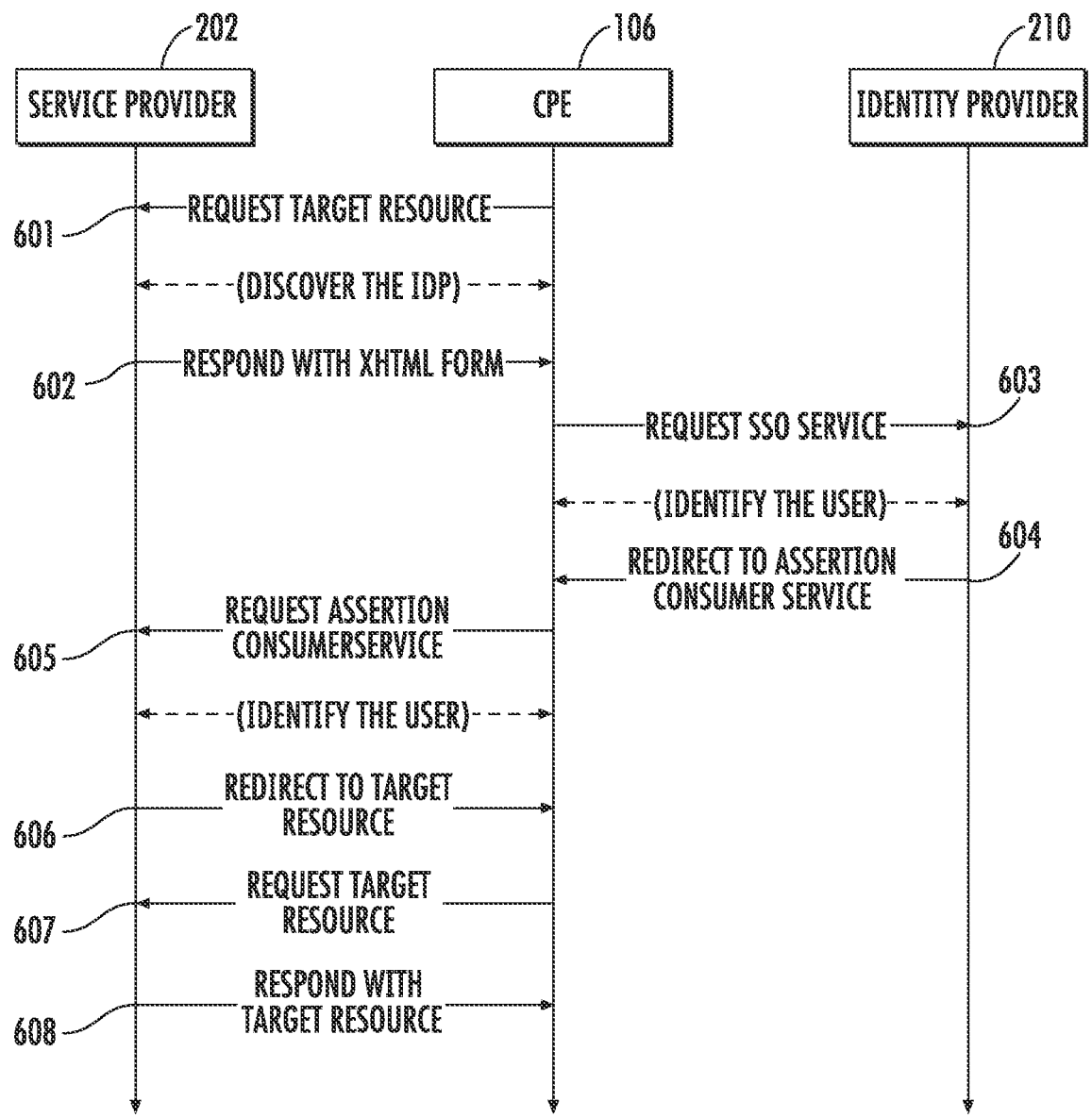
FIG. 6 is a diagram illustrating an exemplary communication flow for linking subscriber accounts across one or more content delivery networks according to the present invention.

FIG. 6 illustrates an exemplary communication flow (ladder diagram) for providing content delivery across one or more content delivery networks in the instance account linking is used. As illustrated, the message flow begins at step 601 with a request for a secured resource at the service provider 202. The CPE 106, PMD 107 or other client device (via e.g., an HTTP user agent) requests a target resource at the service provider 201. In one embodiment, the request is as follows:

https://sp.example.com/myresource

The service provider 201 then performs a security check on behalf of the target resource. If a valid security context at the service provider already exists, the requested resource may be provided. However, if a valid security context is not yet established, the service provider 201 responds with a document containing an XHTML form (step 602):

---

```
<form method="post" action=
"https://idp.example.org/SAML2/SSO/POST"
...>
    <input type="hidden" name=
    "SAMLRequest" value="request" />
    <input type="hidden" name=
    "RelayState" value="token" />
    ...
    <input type="submit" value="Submit" />
</form>
```
© Copyright 2010 Time Warner Cable, Inc. All rights reserved.

---

In the above XHTML form, the RelayState token is an opaque reference to state information maintained at the service provider 202, and the value of the SAMLRequest parameter is the base64 encoding of the following <samlp:AuthnRequest> element:

---

```
<samlp:AuthnRequest
    xmlns:samlp="urn:oasis:names:tc:SAML:2.0:protocol"
    xmlns:saml="urn:oasis:names:tc:SAML:2.0:assertion"
    ID="identifier_1"
    Version="2.0"
    IssueInstant="2004-12-05T09:21:59Z"
    AssertionConsumerServiceIndex="0">
    <saml:Issuer>https://sp.example.com/SAML2</saml:Issuer>
    <samlp:NameIDPolicy
        AllowCreate="true"
        Format="urn:oasis:names:tc:
        SAML:2.0:nameid-format:persistent"/>
    <samlp:RequestedAuthnContext comparison="exact">
<saml:AuthnContextDeclRef>secure/
SPfederatedlogin/user/password/uri</
saml:AuthnContextDeclRef>
    </samlp:RequestedAuthnContext>
</samlp:AuthnRequest>
```
© Copyright 2010 Time Warner Cable, Inc. All rights reserved.

---

In one embodiment, before the <samlp:AuthnRequest> element is URL-encoded and inserted into the XHTML form (above), it is first deflated and base64-encoded (in that order).

Next, the CPE 106 (or PMD 107) issues a POST request to the identity provider 210 (step 603). In one embodiment the POST request is as follows:

POST/SAML2/SSO/POST HTTP/1.1

Host: ids.rr.com

Content-Type: application/x-www-form-urlencoded

Content-Length:nm

SAMLRequest=request&RelayState=token

©2010 Time Warner Cable, Inc. All rights reserved

In the above embodiment, the values of the SAMLRequest and RelayState parameters may be taken from the XHTML form discussed above. The identity provider 210 processes the <samlp:AuthnRequest> element (by URLdecoding, base64-decoding and inflating the request, in that order) and performs a security check. If the user does not have a valid security context, the identity provider identifies the user (as discussed elsewhere herein).

Next, the identity provider 210 validates the request and responds with a document containing an XHTML form, such as that presented below:

```
<form method="POST" enctype="application/x-www-form-urlencoded"
action="https://sp.example.com/nidp/saml2/spassertion_consumer">
...>
  <input type="hidden" name=
  "SAMLResponse" value="response" />
  <input type="hidden" name=
  "RelayState" value="token" />
  ...
  <input type="submit" value="Submit" />
</form>
  © Copyright 2010 Time Warner Cable, Inc. All rights reserved.
```

In the above example, the value of the RelayState parameter is the same as that previously discussed, and the value of the SAMLResponse parameter is the base64 encoding of the following <samlp:Response> element, and within the Response is the <saml:AttributeStatement> containing the value of the customer GUID:

```
<saml:Attribute Statement> containing the value of the customer GUID:
  <samlp:Response xmlns:samlp=
  "urn:oasis:names:tc:SAML:2.0:protocol"
  xmlns:saml="urn:oasis:names:
  tc:SAML:2.0:assertion"
  Destination="https://sp.example.com/
  nidp/saml2/spassertion_consumer"
  ID="idfghgcHuJ.2GxV6FpTwSUmyLcB38"
  InResponseTo=
  "idBYATWWoPEdJEHL60QxVNquwV6jU"
  IssueInstant="2009-01-22T13:51:46Z"
  Version="2.0"><saml:Issuer>https://
  twcidp.eng.rr.com/nidp/saml2/metadata
  </saml:Issuer><samlp:Status><samlp:StatusCode
  Value="urn:oasis:names:tc:SAML:
  2.0:status:Success"/></samlp:Status>
  <saml:Assertion ID=
  "iduQtIUg3EXARC7IKMrjgvF4-rMiE"
  IssueInstant="2009-01-22T13:51:47Z"
  Version="2.0"><saml:Issuer>https://
  twcidp.eng.rr.com/nidp/saml2/metadata
  </saml:Issuer><ds:Signature
  xmlns:ds="http://www.w3.org/2000/09/xmldsig#">
  ...
  ...
  <saml:AuthnStatement AuthnInstant="2009-01-22T13:51:47Z"
  SessionIndex=
  "10F09FE88CABF6C223222A22E3F75F59"
  SessionNotOnOrAfter="2009-01-
  22T14:06:47Z"><saml:AuthnContext>
  <saml:AuthnContextDeclRef>secure/
  federatedlogin/user/password/uri</saml:
  AuthnContextDeclRef></saml:AuthnContext
  ></saml:AuthnStatement> <saml:
  AttributeStatement><saml:Attribute
  xmlns:xsd="http://www.w3.org/2001/XMLSchema"
  xmlns:xsi="http://www.w3.org/
  2001/XMLSchema-instance"
  Name="/op:OP/op:CustomizableStrings/
  op:CustomizableString1"
  NameFormat="urn:oasis:names:tc:
  SAML:2.0:attrnameformat:
  basic"><saml:AttributeValue type="xs:string">
  5D8269B8-7DD5-6017-0AA6-
  4AE5F9780F9E</saml:AttributeValue>
  </saml:Attribute></saml:AttributeState
    © Copyright 2010 Time Warner Cable, Inc. All rights reserved.
```

Next, the identity provider 210 redirects the CPE 106 to the assertion consumer service (step 604). The client (e.g., CPE 106) may issue a POST request to the assertion consumer service at the service provider 202 (step 605). In one example, the request is as follows:

POST/SAML2/SSO HTTP/1.1
Host: sp.example.com
Content-Type: application/x-www-form-urlencoded
  Content-Length:nm
  SAMLResponse=response&RelayState=token
  ©Copyright 2010 Time Warner Cable, Inc. All rights reserved In the above embodiment, the values of the SAMLResponse and RelayState parameters may be taken from the XHTML form previously discussed.

The assertion consumer service processes the response, creates a security context at the service provider and redirects the CPE 106 (or PMD 107) to the target resource (step 606). The CPE 106 then requests the target resource at the service provider (again) at step 607. In one embodiment, the request appears as follows:

https://sp.example.com/myresource

As noted above, in one embodiment the entitlements of the requesting user may be determined, such as is described in previously referenced co-owned, co-pending U.S. patent application Ser. No. 12/536,724 filed on Aug. 6, 2009 and entitled "SYSTEM AND METHOD FOR MANAGING ENTITLEMENTS TO DATA OVER A NETWORK".

Next, since a security context exists, the service provider 202 returns the resource to the CPE 106 (step 608).

Account Decoupling (De-Federation)—

As noted above, the service provider 202 may in certain embodiments utilize a separate IDMS, and may link a subscriber account contained therein to an MSO 201 subscriber account for the same subscriber or entity. Once an account has been linked, there may be conditions (whether based on policy or by the election of the user) which require that the link between the accounts be terminated. For example, if the subscriber is no longer a customer of a first MSO, and instead now is a customer of a second MSO, unlinking or de-federation will be necessary. In one embodiment, the termination is executed by the service provider 202 sending a termination request to the identity provider 210 (e.g., MSO) over a Simple Object Access Protocol (SOAP) back channel, or via another available communications channel.

Figure 7:
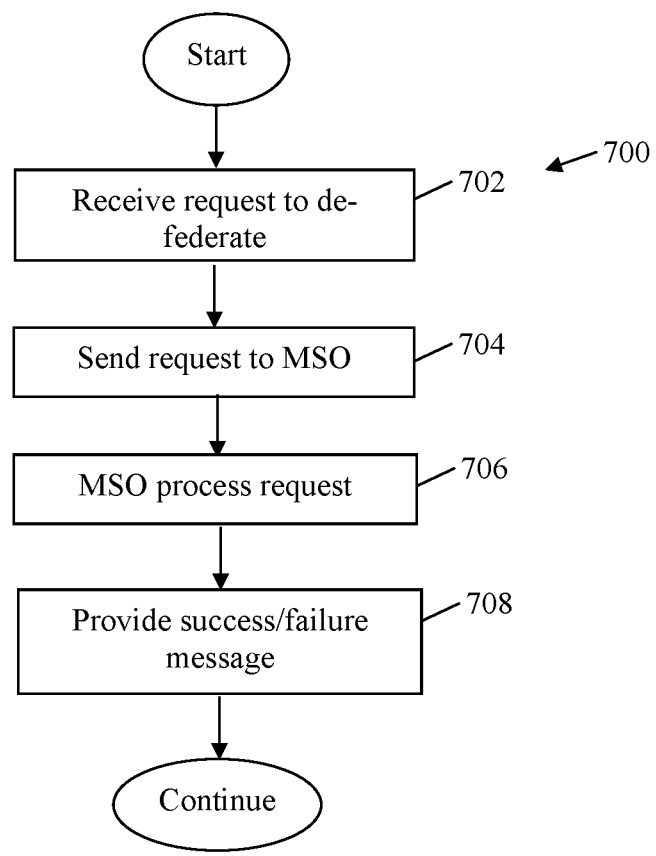
FIG. 7 is a logical flow diagram illustrating an exemplary method for unlinking a subscriber account according to the present invention.

FIG. 7 illustrates one embodiment of an exemplary method which may generally be used for decoupling or unlinking a subscriber account according to the present invention.

As shown, per step 702 a request to de-federate the account is received from the subscriber (or other instigator) at the service provider 202. In response to receiving the subscriber request, the service provider 202 develops a request to be sent to the MSO 201 (step 704). In one embodiment, the service provider 202 utilizes the Name Identifier Management Protocol (as discussed in the previously referenced SAME 2.0 specification) to generate and send the request to the identity provider 210 or other designated entity, for example, an <ManageIDNameRequest> containing the subscriber's pseudonym may be sent.

The identity provider 210 (and/or other MSO 201 entities) processes the request at step 706. The identity provider 210 then returns a "success" or "failure" message comprising the <ManageIDNameResponse> with the appropriate status code therein, at step 708. For example, if the request is processed successfully, a verification code is returned to the service provider 202 comprising a <ManageIDNameResponse> with a code verifying the success of the unlinking. If the de-federation is successful, any future attempts by the subscriber to view protected content will be denied. If the request is not processed successfully, a failure message comprising a <ManageIDNameResponse> with a code indicating the failure of the unlinking is returned. The service provider 202 may initiate another request if the response provided by the MSO 201 indicates failure to unlink the accounts.

Figure 8:
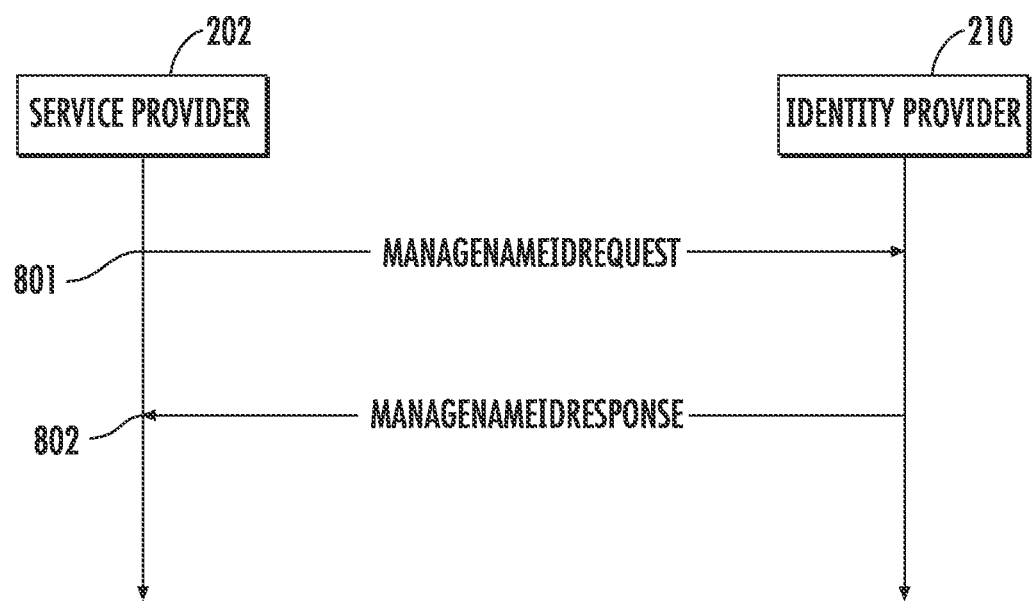
FIG. 8 is a diagram illustrating an exemplary communication flow for unlinking a subscriber account according to the present invention.

Referring now to FIG. 8, an exemplary communication flow between the service provider 202 and the identity provider 210 is illustrated. As shown, the service provider 202 sends to the identity provider 210 a <ManageIDNameRequest> defining that the persistent identifier (previously established) must no longer be used at step 801. In one embodiment, the request is carried in a SOAP message which is transported using HTTP, as defined by the SAML SOAP binding. The request is also digitally signed by the service provider. An exemplary request is illustrated below:

```
<SOAP-ENV:Envelope xmlns:SOAP-
ENV="http://schemas.xmlsoap.org/soap/envelope/">
    <SOAP-ENV:Body>
        <saml:Issuer>
        https://sp.example.com/nidp/saml2/metadata
        </saml:Issuer>
        <ds:Signature xmlns:ds="http://
        www.w3.org/2000/09/xmldsig#">
            <ds:SignedInfo>
                <ds:CanonicalizationMethod
Algorithm="http://www.w3.org/2001/10/xml-exc-c14n#"/>
                <ds:SignatureMethod
Algorithm="http://www.w3.org/2000/09/xmldsig#rsa-sha1"/>
                <ds:Reference
URI="#idioAMRYUXbAhxlAdA0nCVN9jlt84">
                    <ds:Transforms>
                        <ds:Transform
Algorithm="http://www.w3.org/2000/09/xmldsig#enveloped-signature"/>
                        <ds:Transform
Algorithm="http://www.w3.org/2001/10/xml-exc-c14n#"/>
                    </ds:Transforms>
                    <ds:DigestMethod
Algorithm="http://www.w3.org/2000/09/xmldsig#sha1"/>
                </ds:DigestValue>
                </ds:Reference>
            </ds:SignedInfo>
            <ds:SignatureValue>
            ...REMOVED FOR BREVITY ...
            </ds:SignatureValue>
                <ds:X509Certificate>
                ...REMOVED FOR BREVITY ...
                </ds:X509Certificate>
            </ds:X509Data>
            </ds:KeyInfo>
        </ds:Signature>
        saml:NameID Format="urn:oasis:
        names:tc:SAML:2.0:nameidformat:
persistent" NameQualifier="https://ids.eng.rr.com/
nidp/saml2/metadata" SPNameQualifier=
"https://sp.example.com/nidp/saml2/metadata">
        k1H7+36rgRfM2az7hNSh+ 4PRo/OL36X78div7A ==
        </saml:NameID>
        samlp:Terminate/>
    </samlp:ManageNameIDRequest>
    </SOAP-ENV:Body>
</SOAP-ENV:Envelope>
```
© Copyright 2010 Time Warner Cable, Inc. All rights reserved.

Next, at step 802, a response is received from the identity provider 210. In one embodiment, the response is carried within a SOAP over HTTP message and is digitally signed. An exemplary response is illustrated below:

```
<samlp:ManageNameIDResponse ID=
"idxRslo7vdwTn6YnlTjB9pUnjsBkg"
InResponseTo=
"idioAMRYUXbAhxlAdA0nCVN9jlt84"
IssueInstant="2009-01-
```

-continued

```
26T16:42:50Z" Version="2.0"
xmlns:saml="urn:oasis:names:
tc:SAML:2.0:assertion"
xmlns:samlp="urn:oasis:names:
tc:SAML:2.0:protocol">
    <saml:Issuer>
    https://ids.eng.rr.com/nidp/saml2/metadata
    </saml:Issuer>
    <ds:Signature xmlns:ds="http://
    www.w3.org/2000/09/xmldsig#">
        <ds:SignedInfo>
            <ds:CanonicalizationMethod
Algorithm="http://www.w3.org/
2001/10/xml-exc-c14n#"/>
            <ds:SignatureMethod
Algorithm="http://www.w3.org/
2000/09/xmldsig#rsa-sha1"/>
            <ds:Reference URI=
            "#idxRslo7vdwTn6YnlTjB9pUnjsBkg">
                <ds:Transforms>
                    <ds:Transform
Algorithm="http://www.w3.org/2000/
09/xmldsig#enveloped-signature"/>
                    <ds:TransformAlgorithm=
"http://www.w3.org/2001/10/xmlexc-c14n#"/>
                </ds:Transforms>
                <ds:DigestMethod
Algorithm="http://www.w3.org/
2000/09/xmldsig#sha1"/>
                <ds:DigestValue>
                EPq52hQmKDDnijT5lhO0gdVR7LA=
                </ds:DigestValue>
            </ds:Reference>
        </ds:SignedInfo>
        <ds:SignatureValue>
        ...REMOVED FOR BREVITY ...
        </ds:SignatureValue>
        <ds:KeyInfo>
            <ds:X509Data>
                <ds:X509Certificate>
                ...REMOVED FOR BREVITY ...
                </ds:X509Certificate>
            </ds:X509Data>
        </ds:KeyInfo>
    </ds:Signature>
    <samlp:Status>
        <samlp:StatusCode
Value="urn:oasis:names:tc:
SAML:2.0:status:Success"/>
    </samlp:Status>
</samlp:ManageNameIDResponse>
```
© Copyright 2010 Time Warner Cable, Inc. All rights reserved.

Usage Data Collection and Billing Mechanisms—

In yet another embodiment, various data collection entities may be utilized at e.g., the MSO 201 and/or content/service provider 202 which are configured to collect data regarding content usage at the CPE, PMD or other client device. For example, the collection entities may be configured to store data records relating to the content requested by individual ones of the devices. In this manner, the collection entities may develop statistics relating to the frequency of requests from individual users, the types of content requested (such as genre, premium, pay-per-view, etc.), etc. The collection entities may also be configured to receive upstream communications from the devices regarding interactions of the user with the requested content. For example, the collection entities may create data records relating to the trick mode operations employed by the users, including the periods during which the trick modes are operated (such as e.g., during advertisements, etc.).

The usage data may, in one embodiment, be further used for billing purposes. For example, in one billing paradigm a user may be charged a premium for utilization of the herein described services based on the number of content hours watched or received, and/or the types of content being requested. In one embodiment, while certain content may be provided at no additional costs to a subscriber in conjunction with the subscriber's subscription plan with the MSO, other content (such as premium content, pay-per-view content, on-demand content, content outside of the subscriber's subscription plan, etc.) may be provided to the subscriber for additional cost. The aforementioned data collection mechanisms may then be utilized to generate billing records for the subscriber's content requests. In another embodiment, the number of requests and/or the actual time (in hours, minutes, etc.) spent accessing (or watching) the requesting content is recorded and used for generating billing records. The generated billing records are transmitted to e.g. a billing system which generates bills to the customer for accessing content outside of, or in addition to, his/her subscription plan.

It is further appreciated that the foregoing methods for providing content to a requesting subscriber (e.g., the methods of FIGS. 3 and 5) may also include providing one or more confirmation screens to the subscriber indicating a price associated with the requested content, and requiring the subscriber's affirmative permission to charge that price to the subscriber's account with the MSO. In one embodiment, the permission may be in the form of a simple button press, alternatively, the subscriber may be required to enter an access code or other indicator of the subscriber's intent to have the associated costs billed to their account.

Security and Other Content Configuration—

In yet another embodiment, digital rights management (DRM) or other forms of rights/content protection (e.g., use of encryption keys, cryptographic residue or hashing for integrity protection, etc.) may be used consistent with delivery of the content. For instance, in one implementation, the necessary cryptographic data (e.g., keys) are pre-positioned at the service provider 202 to enable the service provider 202 to enforce security rights on content authorized for delivery. In this manner, the MSO 201 can maintain control over the content although it has left the boundaries of the MSO network. The service provider 202 may apply DRM or other rights management mechanisms to the requested content prior to delivery to the subscriber according to MSO policy. The DRM or other rights management mechanism may be generic, or alternatively specific to the requesting subscriber. For instance, each subscriber is assigned an encryption key (e.g., public/private key pair, or asymmetric key) that is always applied to content provided thereto, the encryption key(s) being linked to the subscriber such as by GUID. For example, a user may be assigned a key pair for its content requests; the content source then encrypts any requested for content from that user with the user's specific key pair.

In addition, integrity protection (such as via a one-way hashing algorithm of the type well known in the art) may optionally be applied to the content during transmission so as to assure that it has not been tampered with or otherwise compromised.

In another embodiment, the service provider 202 may further pre-configure the requested content based on one or more configuration parameters associated with the requesting device. For example, the MSO 201 may provide information to the service provider 202 (or the client device may provide this information directly to the content/service provider) indicating the capabilities of each of the devices associated with a particular subscriber. The information may e.g., identify the device by MAC address or other unique identifier, and identify the user by GUID. The service provider 202 stores this information and, when a request is received from a particular device, the service provider 202 automatically pre-configures the content for delivery thereto based on what is known about the particular requesting device. For example, the service provider 202 may be informed of e.g., the available codecs, DRM, display capabilities, etc. that are available at a user device. The service provider 202 may configure the content according to these known capabilities, such as by changing the display resolution, bitrate, encoding scheme, QoS policies applied, encapsulation protocol, etc.

The delivery of capabilities information (e.g., by the MSO 201) prior to any content requests enables more efficient delivery of content without the user experiencing incompatibilities or non-optimized viewing of the requested content. Moreover, where the MSO pre-positions the configuration information, negotiation between the service provider 202 and the device(s) individually (and/or with the MSO 201 at each content request) are advantageously obviated.

Single Log Out (SLO)—

The single log out (SLO) process is utilized where a non-linked customer has established a session at the service provider 202, and the customer elects to log out of the service provider 202 site. In order to accomplish the log out, the service provider 202 sends a log out request to the identity provider 210 in order to ensure that the identity provider 210 destroys the authenticated session on its side (i.e., at the MSO 201) thereby ensuring maximum security for the customer.

In the exemplary embodiment, the service provider 202 is responsible for displaying the success of the log out request after the browser is returned to the service provider 202 following a successful SLO.

Figure 9:
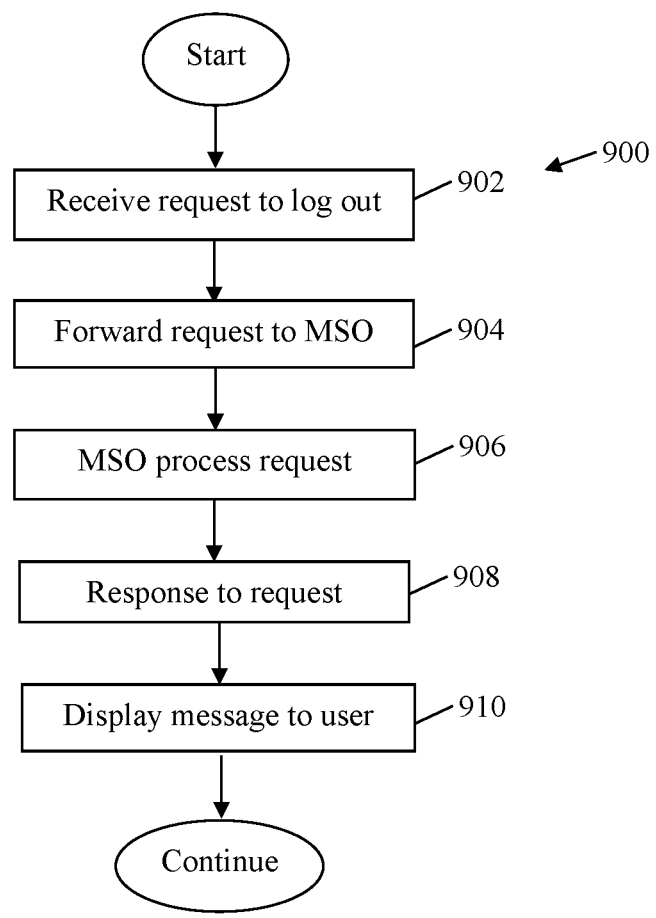
FIG. 9 is a logical flow diagram illustrating an exemplary method for ending a content delivery session facilitated via one or more content delivery networks according to the present invention.

FIG. 9 illustrates an exemplary embodiment of the method for SLO. Per step 902, the customer elects to log out of the service provider's site. The request is forwarded to the MSO at step 904. In other words, the service provider 202 responds with an XHTML form that POSTs to the identity provider 210 (such as at a SLO service maintained thereon). In one implementation, the XHTML form comprises a SAMLRequest with the following fields:

LogoutRequest

Transient NameID pseudonym

Session Index—optional

© Copyright 2010 Time Warner Cable, Inc. All rights reserved.

Next, at step 906, the identity provider 210 (and/or other MSO 201 entities) processes the request. A response to the request is returned at step 908. In one embodiment the response to the request comprises an XHTML form to the browser redirecting the browser to the service provider SLO return URL. The XHTML form may, for example, contain a SAMLResponse with the following field(s):

LogoutResponse

Status

Per step 910, the service provider 202 displays a message that the session has been successfully logged out.

Figure 10:
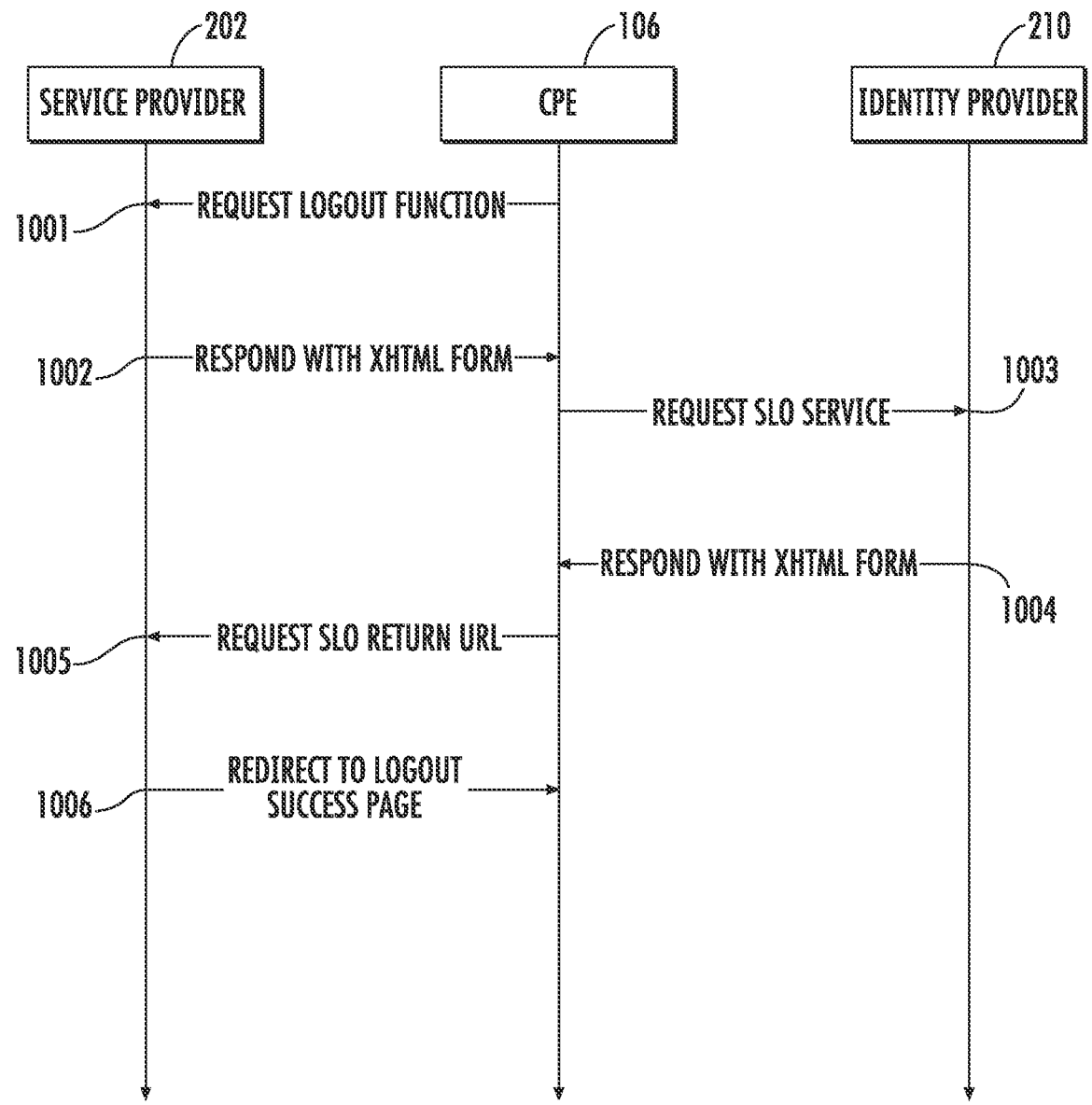
FIG. 10 is a diagram illustrating an exemplary communication flow for ending a content delivery session facilitated via one or more content delivery networks according to the present invention.

Referring now to FIG. 10, an exemplary message flow between the service provider 202, CPE 106 (and/or PMD 107) and identity provider 210 is illustrated. As shown, the customer (via a user agent running on his/her CPE 106, PMD 107, or other client) requests the logout link in the service provider 202 site to terminate their session (step 1001). At step 1002, the service provider 202 responds with a document which in one embodiment contains an XHTML form, such as:

```
<form method="POST" enctype="application/x-www-form-urlencoded"
action="https://twcidp.eng.rr.com/nidp/saml2/slo">
  <input type="hidden" name="SAMLRequest"
  value="PHNhbWxwOkx.../>
</form>
© Copyright 2010 Time Warner Cable, Inc. All rights reserved.
```

In the above embodiment, the value of the SAMLRequest parameter may be the base64 encoding of the following <samlp:LogoutRequest> element:

```
<samlp:LogoutRequest xmlns:samlp=
"urn:oasis:names:tc:SAML:2.0:protocol"
xmlns:saml="urn:oasis:names:
tc:SAML:2.0:assertion"
Destination="https://ids.rr.com/nidp/saml2/slo"
ID="idIqkPGaaUhuxzpwd8EbMoNs4WnIs"
IssueInstant="2009-03-23T17:07:21Z"
Version="2.0"><saml:Issuer>
https://sp.example.com/saml2/
metadata</saml:Issuer><ds:Signature
xmlns:ds="http://www.w3.org/2000/09/xmldsig#">
<ds:SignedInfo>
<ds:CanonicalizationMethod Algorithm=
"http://www.w3.org/2001/10/xml-exc-c14n#"/>
<ds:SignatureMethod Algorithm=
"http://www.w3.org/2000/09/xmldsig#rsa-sha1"/>
<ds:Reference URI=
"#idIqkPGaaUhuxzpwd8EbMoNs4WnIs">
<ds:Transforms>
<ds:Transform Algorithm="http://www.w3.org/
2000/09/xmldsig#enveloped-signature"/>
<ds:Transform Algorithm="http://www.w3.
org/2001/10/xml-exc-c14n#"/>
</ds:Transforms>
<ds:DigestMethod Algorithm=
"http://www.w3.org/2000/09/xmldsig#sha1"/>
<ds:DigestValue>
pAmFDNUTl7TAzVcNRFBTZ8SRng8=
</ds:DigestValue>
</ds:Reference>
</ds:SignedInfo>
<ds:SignatureValue>
ZUE29+Ppi+/==
</ds:SignatureValue>
<ds:KeyInfo>
<ds:X509Data>
<ds:X509Certificate>
MIIFNzCCBB+ ==
</ds:X509Certificate>
</ds:X509Data>
</ds:KeyInfo>
</ds:Signature><saml:NameID Format=
"urn:oasis:names:tc:SAML:2.0:nameidformat:
transient" NameQualifier="https://ids.rr.com/
nidp/saml2/metadata"
SPNameQualifier=
"https://sp.example.com/saml2/metadata">
ktEBMsAYiJGslOG2yZznu8Gb6
LXPleO9t57pqg==<saml:NameID>
</samlp:LogoutRequest>
© Copyright 2010 Time Warner Cable, Inc. All rights reserved.
```

Before the <samlp:LogoutRequest> element is URL-encoded and inserted into the XHTML form, it is first deflated and base64-encoded (in that order).

Next, the user agent (running on the CPE 106 and/or PMD 107) issues a POST request to the identity provider 210 at step 1003. In one embodiment, the request is structured as follows:

POST/nidp/saml2/slo HTTP/1.1
Host: ids.rr.com
Content-Type: application/x-www-form-urlencoded
    Content-Length:nm
SAMLRequest=request&RelayState=token
    ©2010 Time Warner Cable, Inc. All rights reserved In the above embodiment, the values of the SAMLRequest parameter may be taken from the XHTML form previously discussed. The SLO service (running at the identity provider 210 and/or other MSO 201 entity) processes the <samlp:LogoutRequest> element (by URL-decoding, base64-decoding and inflating the request, in that order) and performs session terminate process.

Next, the SLO service validates the request and responds with a document containing an XHTML form (step 1004). An exemplary XHTML form is as follows:

```
<form method="POST" enctype="application/x-www-form-urlencoded"
action="https://sp.example.com/saml2/spslo_return">
    <input type="hidden" name="SAMLResponse"
value="PHNhbWxwOkxvZ291dFJl.../>
    </form>
    © Copyright 2010 Time Warner Cable, Inc. All rights reserved.
```

In the above example, the value of the SAMLResponse parameter may be the base64 encoding of the following <samlp:LogoutResponse> element, and within the LogoutReponse is the <samlp:StatusCode> stating the success or failure of the request:

```
<samlp:LogoutResponse xmlns:samlp=
"urn:oasis:names:tc:SAML:2.0:protocol"
xmlns:saml="urn:oasis:names:
tc:SAML:2.0:assertion"
Destination="https://sp.example.com/
saml2/spslo_return"
ID="iduqo4LnN1QCiNZwQkXasCYg79k4"
InResponseTo=
"idIqkPGaaUhuxzpwd8EbMoNs4WnIs"
IssueInstant="2009-03-23T17:07:21Z"
Version="2.0"><saml:Issuer>https://
ids.rr.com/nidp/saml2/metadata
</saml:Issuer><ds:Signature
xmlns:ds="http://www.w3.
org/2000/09/xmldsig#">
<ds:SignedInfo>
<ds:CanonicalizationMethod Algorithm=
"http://www.w3.org/2001/10/xml-exc-c14n#"/>
<ds:SignatureMethod Algorithm=
"http://www.w3.org/2000/09/xmldsig#rsa-sha1"/>
<ds:Reference URI="#iduqo4LnN1QCiNZ-
wQkXasCYg79k4">
<ds:Transforms>
<ds:TransformAlgorithm=
"http://www.w3.org/2000/09/
xmldsig#enveloped-signature"/>
<ds:Transform Algorithm=
"http://www.w3.org/2001/10/xml-exc-c14n#"/>
</ds:Transforms>
<ds:DigestMethod Algorithm=
"http://www.w3.org/2000/09/xmldsig#sha1"/>
<ds:DigestValue>dwP26GAgmj3Ck92ZNs/
7RYsw4ko=</ds:DigestValue>
</ds:Reference>
</ds:SignedInfo>
<ds:SignatureValue>
B4B7q7m7RwcZ+ ==
</ds:SignatureValue>
<ds:KeyInfo>
<ds:X509Data>
<ds:X509Certificate>
MIIFNzCCBB+ ==
</ds:X509Certificate>
```

```
</ds:X509Data>
</ds:KeyInfo>
   </ds:Signature><samlp:Status><samlp:StatusCode
   Value="urn:oasis:names:tc:
SAML:2.0:status:Success"/>
</samlp:Status></samlp:LogoutResponse>
      © Copyright 2010 Time Warner Cable, Inc. All rights reserved.
```

Next, the SLO return URL is requested at the service provider 202 (step 1005), and the service provider 202 displays the successful logout request (step 1006).

Cancel Login—

If/when a subscriber is sent to the identity provider 210 login page to authenticate (as discussed above), the subscriber can decide to cancel the authentication transaction. Canceling the transaction may be necessary for any reason, and this facility generically allows a SAML response to be sent back to the service provider 202 so the transaction can be ended. For example, the login cancel may be triggered when the customer no longer wants their identity with the MSO 201 to be linked to that of the service provider 202, or in the instance where the service provider 202 has deleted the user's identity from its system.

Figure 11:
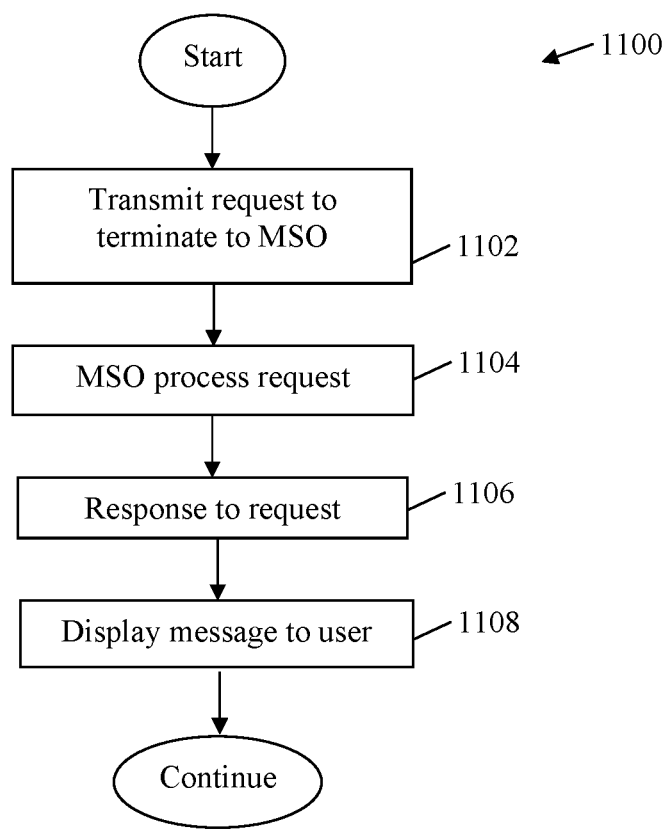
FIG. 11 is a logical flow diagram illustrating an exemplary method for terminating a session startup facilitated via one or more content delivery networks according to the present invention.

FIG. 11 illustrates a method for the cancellation of a login according to one embodiment of the present invention. As illustrated per step 1102, the "terminate" request is sent to the identity provider 210, and/or other entities of the MSO 201. In one implementation, the terminate request uses the aforementioned Name Identifier Management Protocol, specifically using the <ManageNameIDRequest>.

At step 1104, the MSO 201 processes the request, and at step 1106 returns a response. In one embodiment, the response comprises a <ManageIDNameResponse> containing a suitable status code response. The response is for example carried within a SOAP over HTTP message and is digitally signed. The response message is then displayed to the user (step 1108)

Figure 12:
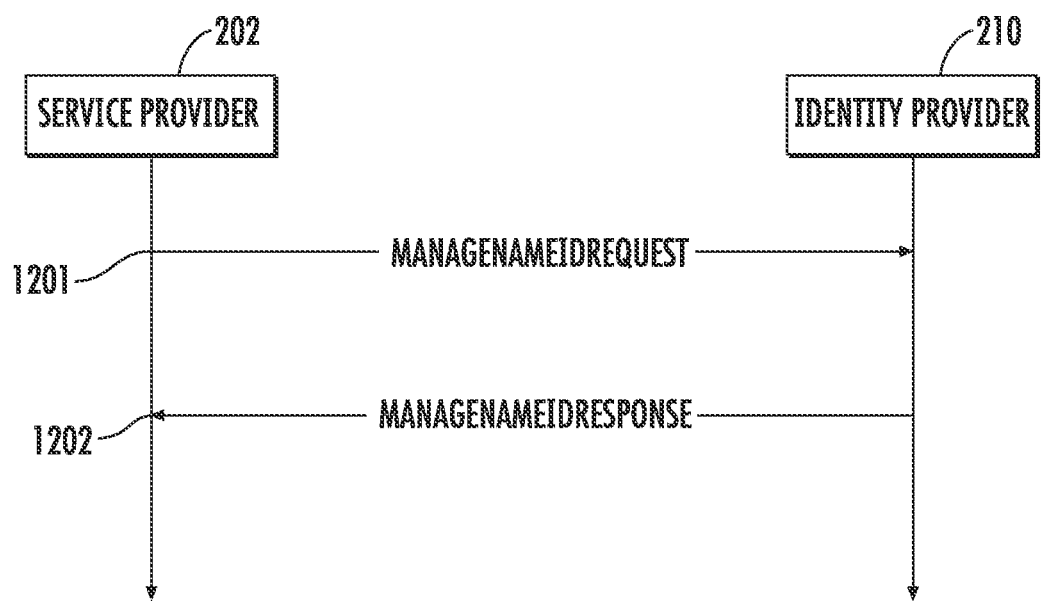
FIG. 12 is a diagram illustrating an exemplary communication flow for ending a content delivery session facilitated via one or more content delivery networks according to the present invention.

FIG. 12 illustrates the interaction between the service provider 202 and the identity provider 210, as discussed above, for the cancellation of a login. As shown, the service provider 202 sends to the identity provider 210 a <ManageIDNameRequest> defining that the persistent identifier (previously established) must no longer be used (step 1201). The request is carried in a SOAP message which is transported using HTTP, as defined by the SAML SOAP binding. The request may also be digitally signed by the service provider 202. The following illustrates an exemplary request:

```
<SOAP-ENV:Envelope xmlns:SOAP-
ENV="http://schemas.xmlsoap.org/soap/envelope/">
  <SOAP-ENV:Body>
    <saml:Issuer>
    https://sp.example.com/nidp/saml2/metadata
    </saml:Issuer>
    <ds:Signature xmlns:ds=
    "http://www.w3.org/2000/09/xmldsig#">
      <ds:SignedInfo>
        <ds:CanonicalizationMethod
Algorithm="http://www.w3.org/2001/10/xml-exc-c14n#"/>
        <ds:SignatureMethod
Algorithm="http://www.w3.org/2000/09/xmldsig#rsa-sha1"/>
        <ds:Reference URI=
        "#idioAMRYUXbAhxlAdA0nCVN9jlt84">
          <ds:Transforms>
            <ds:Transform
Algorithm="http://www.w3.org/2000/09/xmldsig#
enveloped-signature"/>
            <ds:Transform
Algorithm="http://www.w3.org/2001/10/xml-exc-c14n#"/>
          </ds:Transforms>
          <ds:DigestMethod
Algorithm="http://www.w3.org/2000/09/xmldsig#sha1"/>
          </ds:DigestValue>
        </ds:Reference>
      </ds:SignedInfo>
      <ds:SignatureValue>
      ...REMOVED FOR BREVITY ...
      </ds:SignatureValue>
        <ds:X509Certificate>
        ...REMOVED FOR BREVITY ...
        </ds:X509Certificate>
      </ds:X509Data>
    </ds:KeyInfo>
    </ds:Signature>
    <saml:NameID Format="urn:oasis:names:
    tc:SAML:2.0:nameidformat:
persistent" NameQualifier=
"https://twcidp.eng.rr.com/
nidp/saml2/metadata" SPNameQualifier=
"https://sp.example.com/nidp/saml2/metadata">
k1H7+36rgRfM2az7hNSh+
4PRo/OL36X78div7A==
    </saml:NameID>
    <samlp:Terminate/>
  </samlp:ManageNameIDRequest>
</SOAP-ENV:Body>
</SOAP-ENV:Envelope>
      © Copyright 2010 Time Warner Cable, Inc. All rights reserved.
```

Lastly, at step 1202, a response is received from the identity provider 210. As above, the response is carried within a SOAP over HTTP message and is digitally signed in one embodiment.

Exemplary User Device—

Generally, the exemplary user devices (e.g., CPE 106 and/or PMD 107) useful with the present invention will include e.g., a network interface (including an interface for accessing the Internet via the designated bearer medium; e.g., MSO network, non-managed network, etc.), a processor and associated storage, and optionally a plurality of back end interfaces for communication with other devices. The user device can assume literally any discrete form factor, including those adapted for settop/desktop, hand-held, or wall-mounted use, or alternatively may be integrated in whole or part (e.g., on a common functional basis) with other devices if desired. Additionally, the user device may include other elements and interfaces such as for example an interface for the HomePlug A/V standard which transmits digital data over power lines, a PAN (e.g., 802.15), Bluetooth, or other short-range wireless interface for localized data communication, etc.

In one embodiment, the network interface receives content and/or data via one or more RF tuners configured to receive content from an HFC network 101. The RF tuner(s) may comprise traditional video RF tuner(s) adapted to receive video signals over, e.g., a QAM. For example, the RF tuner(s) may comprise one or more tuners, a demodulator, decryption module, and demultiplexer of the type well known in the art, although other configurations may be used. A wideband tuner arrangement such as that described in co-owned U.S. patent application Ser. No. 11/013,671 entitled "METHOD AND APPARATUS FOR WIDEBAND DISTRIBUTION OF CONTENT" filed Dec. 15, 2004, issued as U.S. Pat. No. 9,723,267 on Aug. 1, 2017, and incorporated herein by reference in its entirety, may also be utilized, such as where the content associated with one or more program streams is distributed across two or more QAMs. Additionally, the RF tuner(s) may incorporate functionality to modulate, encrypt/multiplex as required, and transmit digital information for receipt by upstream entities such as the CMTS.

Alternatively, the network interface may comprise any other means for receiving content from a network. For instance, the device may comprise a Wi-Fi or WiMAX enabled smartphone or laptop with connectivity to the relevant wireless service provider, which ultimately connects to the unmanaged network (e.g., Internet).

Digital data received via the network interface may include for example MPEG-2 or H.264 encoded programming data that is forwarded to a television or other device monitor via a video interface. Programming data may also be stored on the storage unit for later distribution by way of the video interface, or using a Wi-Fi interface, Ethernet interface, FireWire (IEEE Std 1394), USB/USB2, or any number of other such options.

Programming and other types of data including pictures, video, music or MP3 files, software applications, metadata files, etc. may also be received by way of the various digital interfaces in the user device. These data may be stored locally (e.g., in the storage unit) or even on a device or network agent in communication with the user device, for later use by a user as is discussed in co-owned U.S. patent application Ser. No. 11/378,129 entitled "METHODS AND APPARATUS FOR CENTRALIZED CONTENT AND DATA DELIVERY", issued as U.S. Pat. No. 8,347,341 on Jan. 1, 2013, and previously incorporated herein.

During operation of the user device, a client application (located in the storage unit) is run on the microprocessor. The client application follows appropriate protocol for sending requests for content and receiving requested content as well as for providing additional information to the network to facilitate authentication and federation (discussed above) by providing information regarding the subscriber/user and/or device to the network entities discussed above. For example, the client application may provide subscriber account information and/or login information upstream in order for the identity provider 210, service provider 202, and other entities to identify the subscriber and provide content based on what is known (at the MSO 201 and/or service provider 202) about the subscriber.

While the foregoing embodiments of the invention have been described primarily with respect to the network-side elements (i.e., content/service provider 202, MSO 201, etc.), it will be appreciated that other implementations of the invention may utilize a specially adapted CPE 106 or client device (e.g., PMD 107) used by the subscriber in generating the request for protected content. For example, the CPE or client software application or stack component may obtain and format request messages or other messages (e.g., logins) for certain external web applications 204 according to a prescribed configuration. In one such implementation, a subscriber accesses a designated external web application 204, wherein the website 204 passes the subscriber its programmer GUID or other identifying information. The client application then uses this information to recognize the site as "MSO affiliated", and thereby necessarily being compliant with the aforementioned protocols discussed above. The client application then formats and requests for protected content or other messages between the subscriber device and that website 204 according to the supported protocols, such as by including MAC address, subscriber GUID, etc. In this fashion, the website 204 is relieved of some of the burden of such formatting, and one or more subsequent messages between the two entities may be obviated (i.e., the website does not have to go back and ask the client device for each requisite piece of information it requires to process the subscriber's request).

In another embodiment, the various restrictions (if any) to the provision of content to a user at a display or rendering device associated with the user device are determined by the device (e.g., CPE 106, PMD 107, etc.) itself, as discussed in co-owned U.S. patent application Ser. No. 12/716,131 filed on Mar. 2, 2010 entitled "APPARATUS AND METHODS FOR RIGHTS-MANAGED CONTENT AND DATA DELIVERY", and issued as U.S. Pat. No. 9,342,661 on May 17, 2016, which is incorporated herein by reference in its entirety. As discussed therein, a downloadable or transferable rights profile coupled with a "smart" media player application are given. The rights profile contains information regarding the specific rights of a device and/or a subscriber to access content. It is via the rights profile that the device (via the media player and its associated rights management application) determines whether to provide content to a subscriber, and/or what restrictions or privileges to apply. Hence, in the present context, the MSO might generate a rights profile and pass this profile (or information indicating which of a plurality of pre-positioned profiles to apply) to the service provider 202 for transmission to the smart media player on the client device.

In addition, the client application may be configured to collect information regarding the user's actions with respect to content, and pass this upstream (whether to the service provider 202 or the MSO 201). For example, the client application may record button presses, playback events, trick mode events, etc. and pass this information to MSO 201 entities which may use the information to make various business decisions including e.g., secondary content insertion decisions.

Methods and apparatus for providing such secondary content insertion may be of the type discussed in co-owned U.S. patent application Ser. No. 11/441,476 filed on May 24, 2006, entitled "SECONDARY CONTENT INSERTION APPARATUS AND METHODS", and issued as U.S. Pat. No. 9,386,327 on Jul. 5, 2016, which is incorporated herein by reference in its entirety, and may be utilized to provide dynamic secondary content insertion (e.g., replacement of dated or geographically inappropriate advertisements or promotions), and thereby allow the MSO 201 or other network operator to adjust the secondary content to make it more applicable to the remote user's context (e.g., location, hardware/software environment, date/time, etc.). Additionally, the apparatus and methods discussed in co-owned U.S. patent application Ser. No. 11/198,620 filed on Aug. 4, 2005, entitled "METHOD AND APPARATUS FOR CONTEXT-SPECIFIC CONTENT DELIVERY", and issued as U.S. Pat. No. 9,286,388 on Mar. 15, 2016, which is incorporated herein by reference in its entirety, may be utilized consistent with the present invention. As discussed therein, contextually-related "secondary" content (e.g., advertising messages, useful informational links, etc.) may be provided in association with other primary content selected by the user.

Anonymity—

As noted above, certain data (including collected data, etc.) may be particular to or identified with a particular subscriber, user, or user device. Accordingly, such data may, in addition to being obfuscated as described above, also be anonymized by inter alia, the use of a cryptographic hash to protect the privacy of the identified subscriber, user, and/or device. In one embodiment, the techniques for providing anonymity utilizing a cryptographic hash described in co-owned, co-pending U.S. patent application Ser. No. 11/186, 452 filed Jul. 20, 2005 and entitled "METHOD AND APPARATUS FOR BOUNDARY-BASED NETWORK OPERATION", which is incorporated herein by reference in its entirety, may be utilized in conjunction with the present invention. As disclosed therein, the identity of a subscriber device or subscriber is anonymized by using a cryptographic hash coupled with an optional "opaque" variable which carries information relating to the subscriber device of the hash with which it is associated. The hash and opaque variable frustrate de-encryption or reverse-engineering of the individual subscriber's identity or specific location. Alternative methods of providing anonymization may also be utilized consistent with the present invention.

While complete anonymization (i.e., there is no way of tracing or identifying the source) is generally not applicable to information which must be used to uniquely identify an individual and/or device, partial anonymization such as that described above is readily used with the present invention. For example, it may be desirable to perform a one-way hash of a user's IP address or MAC address so that someone surreptitiously obtaining the information cannot determine the source data (actual address), but the hash algorithm produces a known deterministic result with the same "seed", and hence the hash output can be used to uniquely identify a given user/device, such as by matching that hashed output with known outputs from the same algorithm corresponding to existing subscribers/devices. This hashing is to be distinguished from encryption, wherein the original source data (address) can in fact be recovered and read when the encrypted data is decrypted (such as via a public/private encryption key pair).

Business/Operational Rules Engine—

In another aspect of the invention, a so-called "decision" engine may be disposed at e.g., the identity provider 210, entitlement server 208, service provider 202, content server 206, CPE 106, or other location (e.g., rendered as one or more computer programs disposed thereon). This engine comprises, in an exemplary embodiment, one or more software routines adapted to control the authentication/authorization and content delivery processes in order to achieve one or more goals relating to operations or business (e.g., profit or revenue or subscriber retention). Included within these areas are network optimization and reliability goals, increased maintenance intervals, increased subscriber or user satisfaction/longevity, increased subscription base, higher profit (e.g., from increased advertising revenues, more subscriber "views" of given content, greater flexibility in the types and locations of platforms from which the subscriber may access content, and so forth).

These decision rules may comprise a separate entity or process, and may also be fully integrated within other processing entities (such as the applications running on the aforementioned entities and/or the client application), and controlled via e.g., a GUI displayed on a device connected to the relevant server, network entity, or even CPE 106. In effect, the rules engine comprises a supervisory entity which monitors and selectively controls content access and delivery operation at a higher level, so as to implement desired operational or business rules. The decision engine can be considered an overlay of sorts to the more fundamental algorithms used to accomplish required network operation.

For example, the identity provider 210, entitlement server 208, service provider 202, content server 206, and/or CPE 106 may invoke certain operational protocols or decision processes based on information or requests received from the CPE 106 or PMD 107, conditions existing within the network, demographic data, geographic data, etc. However, these processes may not always be compatible with higher-level business or operational goals, such as maximizing profit or system reliability. Hence, when imposed, the business/operational rules can be used to dynamically (or manually) control access to and delivery of content. The decision rules may be, e.g., operational or business-oriented in nature, and may also be applied selectively in terms of time of day, duration, specific local areas, or even at the individual user level (e.g., via specific identification of the CPE or client device via TUNER ID, IP address, MAC address, or the like, or via a user-based login or "entitlements" profile of the type previously described herein).

For example, one decision rule implemented by the decision engine may comprise providing protected content from the third party (e.g., service provider 202) according to a tiered system. Content under such an approach might be selected in part on the revenue such delivery will bring to the MSO 201 based on the content source.

Various billing models for the delivery of protected content may also be incorporated into the rules engine. The rules engine may include for instance various policies which provide information that is utilized by e.g., billing entities to generate billing records. For example, the engine may include rules for applying a pricing structure to requested content. In one embodiment, the rules may indicate a pre-selected amount of content hours and/or particular content which is offered to certain subscribers without a fee. Additional fees may be charged for premium content, content which is outside a subscriber's subscription plan, pay-per-view content, and/or for content exceeding a prescribed time threshold (e.g., content hours requested above those hours which are included in the subscriber's subscription plan). Hence, when content is requested the rules engine may consult the pricing structure and generate a record of a cost to be charged to the customer. The record may be used to generate a bill as well as to inform the customer of the additional costs. The rules engine may further be constructed so that the content is delivered only after the customer has given permission for the additional charges. The ability of the MSO to make an "upsell"; i.e., offer the consumer an opportunity to purchase a higher tier subscription and/or pay-per-use subscriptions.

The various billing rules may further take into account the customer's subscription level. For example, certain customers may be afforded access to certain types of content at no additional charges, whereas other customers may be required to pay additional fees to receive the content. Suppose for example a customer has a "basic" subscription which includes content which is broadcast on Channel X, but does not include content which is broadcast on Channel E If the subscriber requests content which is broadcast on Channel X, the rules engine consults the pricing structure (and other rules), and determines that the subscriber is within his/her subscription plan in requesting the content, and does not apply a price (e.g., generate information to be used in generating a billing record). If that subscriber instead requests content which is broadcast on Channel Y, the rules engine consults the pricing structure (and other rules) and determines that the subscriber is outside of his/her subscription plan, and thus applies a price model to the content. The rules engine may further inquire for permissions given the determined price, and pass the pricing information to a billing entity.

Additionally content may be established with the rules engine as free, or have a set price. For example, free on-demand (FOD) content may be indicated at the rules engine as never having a price associated therewith, whereas VOD, movies on-demand (MOD), and pay-per-view content may be associated with a pricing structure. In another variant, a subscriber may be entitled to a certain number of requests and/or a time limit for receiving content. For example, a customer's subscription plan may be associated with a certain number or hours of content access (e.g., unlimited, 1 request per month, 10 hours of content downloads, etc.). As discussed above, the rules engine applies a pricing structure (as applicable) upon user request.

In yet another variant, the use rights or features provided with the requested (protected) content may be varied as a function of e.g., subscriber subscription level, time of day, requesting device capability, etc. For instance, a request received from a premium level, or "Gold", subscriber might be serviced with a content stream that includes complete "trick mode" functionality (i.e., FF, REW, Pause, etc.), or for broadcasts a "start over" functionality, whereas a lower tier subscriber's request might not include one or any of these capabilities. The number of plays can be limited as well; e.g., Gold subscribers receive unlimited plays, while lower tiers receive only one or a finite number of plays of the content. As noted above, these rules or functional restrictions can be relayed from the MSO 201 to the service provider 202 via messaging conducted pursuant to a particular subscriber request, or alternatively can be pre-positioned within the service provider site as a decision rule set.

Moreover, the quality of content provided can be varied as needed or desired. For instance, use of different encodings or bitrates (e.g., HD versus SD), QoS parameters, latency, etc. can be employed depending on the subscriber (individually), the general classification of the subscriber (e.g., Gold), time of day, available resources, revenue/profit implications of each option, etc.

It will also be recognized that both the MSO 201 and the third party (e.g., service provider 202) may employ different business or operation decision rules to one another. For example, the MSO 201 might establish preferential rules or classes for the various service providers 202, such that service provided to these different providers 202 is differentiated in some fashion. In one such case, those providers 202 paying the MSO 201 a fee, or with which the MSO 201 has a pre-existing business relationship, may be given preferential service and capabilities.

The MSO 201 and/or service provider 202 may also structure a business relationship whereby one "pays" the other via some sort of consideration for servicing of requests. For example, an MSO might pay a given provider $X for each valid MSO subscriber request serviced by the provider, since the MSO is in effect leveraging the programmer's infrastructure to extend the reach of its capabilities for the MSO customers (i.e., extension of the "four any's" model described in co-owned U.S. Provisional Application Ser. No. 61/256,903 entitled "METHODS AND APPARATUS FOR PACKETIZED CONTENT DELIVERY OVER A CONTENT DELIVERY NETWORK" previously incorporated herein. Conversely, the provider might pay the MSO consideration for each MSO subscriber request serviced, or an advertisement click-through basis, etc. in that if the MSO instructs its subscribers to use the provider's site preferentially over others, this may generate additional revenue (such as via the aforementioned click-throughs) for the provider or its advertisers.

As noted above, certain information may be collected and utilized to provide targeted advertisements to the CPE. For example, the methods and apparatus of co-owned U.S. patent application Ser. No. 11/441,476 filed on May 24, 2006, entitled "SECONDARY CONTENT INSERTION APPARATUS AND METHODS", issued as U.S. Pat. No. 9,386,327 on Jul. 5, 2016 and/or co-owned, co-pending U.S. patent application Ser. No. 11/198,620 filed on Aug. 4, 2005, entitled "METHOD AND APPARATUS FOR CONTEXT-SPECIFIC CONTENT DELIVERY", and issued as U.S. Pat. No. 9,286,388 on Mar. 15, 2016, each of which is incorporated herein by reference in its entirety, may be utilized to provide dynamic secondary content insertion (e.g., replacement of dated or geographically inappropriate advertisements or promotions) and/or contextually-related "secondary" content (e.g., advertising messages, useful informational links, etc.). Still further, collected information regarding a user's viewing habits may be utilized to provide content recommendations as discussed in co-owned U.S. patent application Ser. No. 12/414,576 filed Mar. 30, 2009, entitled "RECOMMENDATION ENGINE APPARATUS AND METHODS", and issued as U.S. Pat. No. 9,215,423 on Dec. 15, 2015, which is incorporated herein by reference in its entirety.

Content, user interface and/or advertisement personalization may also be provided.

Many other approaches and combinations of various operational and business paradigms are envisaged consistent with the invention, as will be recognized by those of ordinary skill when provided this disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A computerized method for providing access to digitally rendered content via a first multiple systems operator (MSO) network to a computerized client device associated with a second MSO network, the computerized method comprising:

based at least on data relating to a first request originating from the computerized client device for digitally rendered content, receiving, at a computerized entity of the first MSO network, second data from a computerized entity of the second MSO network, the second data (i) indicating that the computerized client device is authorized to access, via the first MSO network, the digitally rendered content, and (ii) comprising a unique identifier generated for the computerized client device by the computerized entity of the second MSO network; and storing, by the computerized entity of the first MSO network, the unique identifier in a computerized storage apparatus of the first MSO network;

wherein the storing by the computerized entity of the first MSO network, the unique identifier in the computerized storage apparatus of the first MSO network enables the computerized entity of the first MSO network to provide the computerized client device with the access to the digitally rendered content or different content of one or more subsequent requests (i) irrespective of whether the one or more subsequent requests are received within a same session as the first request, and (ii) without further communication with the computerized entity of the second MSO network.

2. The computerized method of claim 1, wherein the receiving of the second data from the computerized entity of the second MSO network comprises receiving the unique identifier associated with encryption data pre-positioned at least one entity of the first MSO network; and the computerized method further comprises utilizing the pre-positioned encryption data for encryption based on the one or more subsequent requests originating from the computerized client device for the digitally rendered content or the different content, the encryption being specific to at least one of the computerized client device or user associated therewith, the pre-positioned encryption data enabling the computerized entity of the second MSO network to maintain integrity of one or more content delivery services outside of the second MSO network and within the first MSO network.

3. The computerized method of claim 1, further comprising:
receiving, from the computerized client device, third data representative of a second request to de-federate an account associated therewith;
based on the second request, transmitting at least a portion of the data indicating the second request to the computerized entity of the second MSO network;
based at least on the transmitted at least portion of the data indicating the request, receiving data representative of a verification code from the computerized entity of the second MSO network, the verification code verifying the de-federation of the account with respect to the computerized entity of the second MSO network; and
based on the verification code, causing removal of the unique identifier from the computerized storage apparatus of the first MSO network.

4. The computerized method of claim 1, further comprising, based at least on the data relating to the first request originating from the computerized client device for the digitally rendered content, causing the computerized client device to redirect to a website of the second MSO network utilized for receiving one or more credentials associated with the computerized client device or a user thereof.

5. Computerized network apparatus configured to enable provision of access to digitally rendered content via a service provider network to a computerized client device associated with a managed content distribution network, the computerized network apparatus comprising:
server apparatus comprising:
digital processor apparatus;
network interface apparatus in data communication with the processor apparatus; and
storage apparatus in data communication with the digital processor apparatus, the storage apparatus comprising at least one computer program configured to, when executed on the digital processor apparatus, cause the computerized network apparatus to:
receive, from the computerized client device, data representative of a first request for digitally rendered content;
based at least on the received data representative of the first request, transmit data representative of a second request to a computerized entity of the managed content distribution network for authorization of the computerized client device to access, via the service provider network, the digitally rendered content;
receive data from the computerized entity of the managed content distribution network, the data received from the computerized entity (i) indicating that the computerized client device is authorized to access, via at least the service provider network, the digitally rendered content, and (ii) comprising a unique identifier generated for the computerized client device by the computerized entity of the managed content distribution network;
store the unique identifier in a computerized storage apparatus of the service provider network; and
enable the computerized client device to access, via the service provider network, the digitally rendered content, wherein the access of the digitally rendered content comprises use of at least a portion of a network infrastructure of the managed content distribution network and protection by the computerized entity of the managed content distribution network, yet wherein the access of the digitally rendered content is agnostic to at least the computerized entity of the managed content distribution network.

6. The computerized network apparatus of claim 5, wherein the storage of the unique identifier in the computerized storage apparatus of the service provider network enables the computerized client device to access, via the service provider network, other digitally rendered content requested after the first request without having to redirect subsequent requests to the computerized entity of the managed content distribution network for authentication.

7. The computerized network apparatus of claim 5, wherein the at least one computer program is further configured to, when executed on the digital processor apparatus:
receive, from the computerized entity of the managed content distribution network, data representative of a request to remove the unique identifier from the computerized storage apparatus of the service provider network; and
based at least on the data representative of the request to remove, cause removal of the unique identifier from the computerized storage apparatus of the service provider network.

8. The computerized network apparatus of claim 5, wherein:
the unique identifier comprises a user-specific global unique identifier (GUID).

9. The computerized network apparatus of claim 5, wherein the at least one computer program is further configured to, when executed on the digital processor apparatus:
associate cryptographic data to the unique identifier for use in one or more subsequent requests for either the digitally rendered content or other content from a user of the computerized client device, the cryptographic data pre-positioned by the computerized entity of the managed content distribution network at the computerized network apparatus in order for the computerized entity of the managed content distribution network to maintain integrity of the digitally rendered content or the other content outside of the service provider network and within the managed content distribution network.

10. Computer readable apparatus comprising a non-transitory storage medium, the non-transitory storage medium comprising at least one computer program having a plurality of instructions, the plurality of instructions configured to, when executed on a digital processing apparatus, cause a computerized apparatus of a non-managed network to:
   receive data representative of a request for digitally rendered content from a computerized client device;
   query a data structure maintained at a computerized storage apparatus of the non-managed network to identify a unique identifier associated with the computerized client device, the unique identifier previously provided to the computerized apparatus of the non-managed network by a computerized entity of a managed network, wherein storage of the unique identifier at the computerized storage apparatus of the non-managed network links a first identity of a user of the computerized client device, the first identity associated with the non-managed network, to a second identity of the user of the computerized client device, the second identity associated with the managed network; and
   cause delivery of the digitally rendered content to the computerized client device based at least in part on the identification of the unique identifier.

11. The computer readable apparatus of claim 10, wherein the delivery of the digitally rendered content comprises delivery of digital content in a source-agnostic fashion via use of network infrastructure of the managed network and protection by the computerized entity of the managed network, the computerized apparatus of the non-managed network comprising a source of the digital content.

12. The computer readable apparatus of claim 10, wherein the unique identifier being previously provided to the computerized apparatus of the non-managed network by the computerized entity of the managed network is based at least on one or more valid user credentials input by a user of the computerized client device.

13. The computer readable apparatus of claim 10, wherein the delivery of the digitally rendered content is further based on content protection data pre-positioned at the non-managed network by the computerized entity of the managed network to maintain integrity of the digitally rendered content outside of the managed network and within the non-managed network.

14. The computer readable apparatus of claim 10, wherein the plurality of instructions are further configured to, when executed on the digital processing apparatus, cause the computerized apparatus of the non-managed network to:
   receive and store data relating to one or more configuration parameters associated with the computerized client device; and
   pre-configure, based at least on the one or more configuration parameters, the digitally rendered content according to one or more capabilities of the computerized client device.

15. The computer readable apparatus of claim 14, wherein the one or more capabilities are determined based on use of data relating to a subscription level, the data relating to the subscription level configured to enable the computerized entity of the non-managed network to determine at least one of an encoding or a bitrate for the digitally rendered content during the pre-configuration.

16. The computer readable apparatus of claim 10, wherein the plurality of instructions are further configured to, when executed on the digital processing apparatus, cause the computerized apparatus of the non-managed network to:
   receive and store data relating to a prescribed quality of service (QoS) level; and wherein:
   the delivery of the digitally rendered content comprising delivery of the digitally rendered content in accordance with the QoS level;
   the non-managed network comprises an unmanaged packet network; and
   the managed network comprises a managed content distribution network specifying the QoS level.

17. The computer readable apparatus of claim 10, wherein the plurality of instructions are further configured to, when executed on the digital processing apparatus, cause the computerized apparatus of the non-managed network to:
   receive data relating to one or more user actions with respect to digital content previously delivered to the computerized client device; and
   wherein the delivery of the digitally rendered content comprises delivery of digitally rendered content recommended to the computerized client device based at least in part on an algorithmic analysis of the data relating to the one or more user actions.

18. The computer readable apparatus of claim 10, wherein the plurality of instructions are further configured to, when executed on the digital processing apparatus, cause the computerized apparatus of the non-managed network to:
   query the data structure maintained at the computerized storage apparatus of the non-managed network to identify one or more use or access restrictions; and
   wherein the delivery of the digitally rendered content to the computerized client device comprises enforcement of the one or more use or access restrictions.

19. The computer readable apparatus of claim 18, wherein the enforcement of the one or more use or access restrictions comprises restriction on one or more trick mode or start over functions.

20. The computer readable apparatus of claim 10, wherein:
   the receipt of the data representative of the request for the digitally rendered content from the computerized client device comprises receipt of the data representative of the request via a web computer application program that is not maintained by the computerized entity of the managed network; and
   the delivery of the digitally rendered content to the computerized client device comprises access of the digitally rendered content via the web computer application program.

\* \* \* \* \*